United States Patent
Willson, Jr.

(10) Patent No.: US 9,244,483 B1
(45) Date of Patent: Jan. 26, 2016

(54) EXCESS-FOURS PROCESSING IN DIRECT DIGITAL SYNTHESIZER IMPLEMENTATIONS

(75) Inventor: Alan N. Willson, Jr., Pasadena, CA (US)

(73) Assignee: Pentomics, Inc., Pasadena, CA (US)

( * ) Notice: Subject to any disclaimer, the term of this patent is extended or adjusted under 35 U.S.C. 154(b) by 917 days.

(21) Appl. No.: 13/205,525

(22) Filed: Aug. 8, 2011

Related U.S. Application Data

(63) Continuation-in-part of application No. 11/938,252, filed on Nov. 9, 2007, now Pat. No. 8,131,793.

(60) Provisional application No. 60/857,778, filed on Nov. 9, 2006.

(51) Int. Cl.
*G06F 1/03* (2006.01)
*G06F 1/035* (2006.01)

(52) U.S. Cl.
CPC .............. *G06F 1/0328* (2013.01); *G06F 1/035* (2013.01)

(58) Field of Classification Search
CPC ......... G06F 1/03; G06F 1/022; G06F 1/0328; G06F 1/0353
USPC ........................................................ 708/271
See application file for complete search history.

(56) References Cited

U.S. PATENT DOCUMENTS

| | | | |
|---|---|---|---|
| 4,896,287 A | 1/1990 | O'Donnell et al. | |
| 5,276,633 A * | 1/1994 | Fox et al. | 708/276 |
| 5,673,212 A * | 9/1997 | Hansen | 708/271 |
| 5,737,253 A | 4/1998 | Madisetti et al. | |
| RE36,388 E * | 11/1999 | Fox et al. | 708/276 |
| 5,991,788 A | 11/1999 | Mintzer | |
| 7,203,718 B1 | 4/2007 | Fu et al. | |
| 7,228,325 B2 | 6/2007 | Willson, Jr. et al. | |
| 7,440,987 B1 | 10/2008 | Song et al. | |
| 7,532,989 B1 | 5/2009 | Torosyan | |
| 7,539,716 B2 * | 5/2009 | Torosyan | 708/271 |
| 8,131,793 B2 | 3/2012 | Willson, Jr. | |
| 2006/0167962 A1 | 7/2006 | Torosyan | |
| 2014/0195579 A1 | 7/2014 | Willson, Jr. | |

OTHER PUBLICATIONS

Ken Gentile, Direct Digital Synthesis Primer, Analog Devices, May 2003, pp. 1-50.*

(Continued)

*Primary Examiner* — Chuong D Ngo
(74) *Attorney, Agent, or Firm* — Sterne, Kessler, Goldstein & Fox PLLC

(57) ABSTRACT

Systems and methods for a split phase accumulator having a plurality of sub phase accumulators are provided. Each sub phase accumulator receives a portion of a frequency control word. The first sub phase accumulator includes a first register and the remaining sub phase accumulators include a register and an overflow register. At each discrete point in time, the first sub phase accumulator is configured to be responsive to the first portion of the frequency control word at that discrete point in time and to the first sub phase accumulator value at the immediately previous discrete point in time, and each of the remaining sub phase accumulators is configured to be responsive to a value of its corresponding portion of the frequency control word at that discrete point in time and to the same second sub phase accumulator value at the immediately previous discrete point in time.

25 Claims, 29 Drawing Sheets

(56) References Cited

OTHER PUBLICATIONS

Lionel Cordesses, Direct Digital Synthesis: A Tool for Periodic Wave Generation (Part 1), IEEE Signal Processing Magazine, Jul. 2004, pp. 50-54.*
Lionel Cordesses, Direct Digital Synthesis: A Tool for Periodic Wave Generation (Part 2), IEEE Signal Processing Magazine, Sep. 2004, pp. 110-112 and 117.*
Vankka, J., and Halonen, K., "Direct Digital Synthesizers: Theory, Design, Applications," Boston: Kluwer Academic Publishers, 2001, 218 pages.
Ahn, Y. et al., "VLSI design of a CORDIC-based derotator," in Proc. IEEE Int. Symp. Circuits Syst., vol. 2, May 1998, pp. 449-452.
Analog Devices, CMOS 200 MHz Quadrature Digital Upconverter: AD9856, Rev. C, 2005, 36 pages.
Avizienis, A., "Signed-digit number representation for fast parallel arithmetic," IRE Trans. Electron. Comp., vol. EC-10, pp. 389-400, 1961.
Booth, A.D., "A signed binary multiplication technique," Quart. J. Mech. Appel. Math., vol. 4, 1951, pp, 236-240.
Bull, D.R. and Horrocks D.H., "Primitive operator digital filters," Proc. Inst. Elect. Eng., vol. 138, pt. G, pp. 401-412, Jun. 1991.
Chen, C.L. and Willson, Jr., A.N., "A trellis search algorithm for the design of FIR filters with signed-powers-of-two coefficients," IEEE Trans. Circuits and Systems-II, vol. 46, No. 1, pp. 29-39, Jan. 1999.
Ching, A.Y., "A 12-bit direct digital frequency synthesizer/mixer in 0.8 μm CMOS," M.S. thesis, Univ. California, Los Angeles, 1999, 50 pages.
DeCaro, D. et al., "A 380 MHz direct, digital synthesizer/mixer with hybrid CORDIC architecture in 0.25-mm CMOS" IEEE J. Solid-State Circuits, vol. 42, No. 1, pp. 151-160, Jan. 2007.
DeCaro, D. et al., "A 380MHz, 150mW direct digital synthesizer/mixer," in 0.25mm CMOS, in IEEE Int. Solid-State Circuits Conf. Dig. Tech. Papers, Feb. 2006, 10 pages.
Dempster, A.G. and Macleod, M.D., "Constant integer multiplication using minimum adders," IEE Circuits Devices Syst., vol. 141, pp. 407-413, Oct. 1994.
Dempster, A.G. and Macleod, M.D., "Multiplication by two integers using the minimum number of adders," in Proc. IEEE Int. Symp. Circuits Syst., May 23-26, 2005, pp. 1814-1818.
Dempster, A.G. and Macleod, M.D., "Use of minimum-adder multiplier blocks in FIR digital filters," IEEE Trans. Circuits and Systems-II, vol. 42, No. 9, pp. 569-577, Sep. 1995.
Fu, D. and Willson, Jr., A.N., "A high-speed processor for digital sine/cosine generation and angle rotation," in Proc. 32nd Asilomar Conf. Signals, Syst. Comput., vol. 1, Nov. 1998, pp. 177-181.
Fu, D. and Willson, Jr., A.N., "A two-stage angle-rotation architecture and its error analysis for efficient digital mixer implementation," IEEE Trans. Circuits and Systems-I, vol. 53, No. 3, pp. 604-614, Mar. 2006.
Fu, D., "Efficient synchronization architectures for multimedia communications," Ph.D. dissertation, Univ. California, Los Angeles, 2000, 176 pages.
Gentile, K., "Digital upconverter IC tames complex modulation," Microwaves & RF Magazine, Aug. 2000, 6 pages.
Golub, et al., "Matrix Computations," Baltimore: Johns Hopkins Press, 1996.
Gustafsson, O. et al., "Multiplier blocks using carry-save adders," in Proc. IEEE Int. Symp. Circuits Syst., vol. 2, May 23-26, 2004, pp. 473-476.
Hartley. R., "Subexpression sharing in filters using canonic signed digit multipliers," IEEE Trans. Circuits and Systems-II, vol. 43, No. 10, pp. 677-688, Oct. 1996.
Koren, I., "Computer Arithmetic Algorithms," 2nd ed., Natick, MA: A.K. Peters. 2002.
Macleod, M.D. and Dempster, A.G., "A common subexpression elimination algorithm for low-cost multiplierless implementation of matrix multipliers," Electron. Lett., vol. 40, No. 11, pp. 651-652, May 2004.
Madisetti, A. et al., "A100-MHz, 16-b, direct digital frequency synthesizer with a 100-dBc spurious-free dynamic range," IEEE J. Solid-State Circuits, vol. 34, No. 8, pp. 1034-1043, Aug. 1999.
Madisetti A., "VLSI architectures and IC implementations for bandwidth efficient communications," Ph.D. dissertation, Univ. California, Los Angeles, 1996, 151 pages.
Samueli, H., "An improved search algorithm for the design of multiplierless FIR filters with powers-of-two coefficients," IEEE Trans. Circuits and Systems, vol. 36, No. 7, pp. 1044-1047, Jul. 1989.
Song, et al., "A Quadrature Digital Synthesizer/Mixer Architecture Using Fine/Coarse Coordinate Rotation to Achieve 14-b Input, 15-b Output, and 100-dBc SFDR," IEEE J. Solid-State Circuits, vol. 39, No. 11, Nov. 2004, pp. 1853-1861.
Tan, L. and Samueli, H., "A 200-MHz quadrature frequency synthesizer/mixer in 0.8-mm CMOS," IEEE J. Solid-State Circuits, vol. 30, No. 3, pp. 193-200, Mar. 1995.
Torosyan, A. et al., "A 300-MHz quadrature direct digital synthesizer/mixer in 0.25-mm CMOS," IEEE J. Solid-State Circuits, vol. 38, No. 6, pp. 875-887, Jun. 2003.
Torosyan, A. et al., "A 300-MHz quadrature direct digital synthesizer/mixer in 0.25-mm CMOS," in IEEE Int. Solid-State Circuits Conf. Dig. Tech. Papers, Feb. 2002, pp. 132-133.
Volder, J., "The cordic trigonometric computing technique," IEEE Trans. Computers, vol. EC-8, pp. 330-334, Sep. 1959.
Wang, S. et al., "Hybrid Cordic algorithms," IEEE Trans. Computers, vol. 46, pp. 1202-1207, Nov. 1997.
Willson, et al., "A Direct Digital Frequency Synthesizer with Minimized Tuning Latency of 12ns," IEEE ISSCC Dig. Tech. Papers, Feb. 2011, pp. 138-139.
Wu, Y. et al., "A 415 MHz. direct digital quadrature modulator in 0.25-mm CMOS," in Proc. IEEE Custom Integrated Circ. Conf., May 21-24, 2003, pp. 287-290.
Xu, F. et al., "Efficient algorithms for common subexpression elimination in digital filter design," in Proc. IEEE Int. Conf. Acoust. Speech, Signal Processing, vol. 5, May 17-21, 2004, pp. 137-140.
Xu, F., "On designing high-performance signal processing algorithms for a ring-structured multiprocessor," Ph.D. dissertation, Univ. California, Los Angeles, 2001.
Lu, et al., "A 700-MHz 24-b pipelined accumulator in 1.2-μm CMOS for application as a numerically controlled oscillator," IEEE J. Solid-State Circuits, vol. 28, 878-886, Aug. 1993.
Betowski, et al., "Considerations for phase accumulator design for direct digital frequency synthesizers," IEEE Int. Conf. Neural Networks & Signal Proc., Nanjing, China, Dec. 14-17, 2003.
"1 GSPS Direct Digital Synthesizer with 14-bit DAC," AD9912 Data Sheet, Analog Devices, Inc., 2007-2010.
"2.7 GHz DDS-Based AgileRFTM Synthesizer," AD9956 Data Sheet, Analog Devices, Inc, 2004.
Torosyan, A., "Direct Digital Frequency Synthesizers: Complete Analysis and Design Guidelines," University of California, Los Angeles, 2003.

* cited by examiner

FIG. 1 --Prior Art--

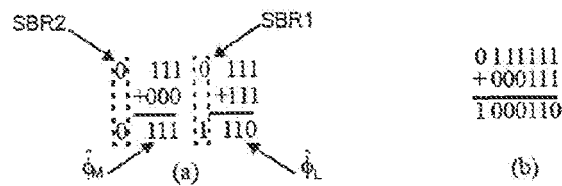
FIG. 24
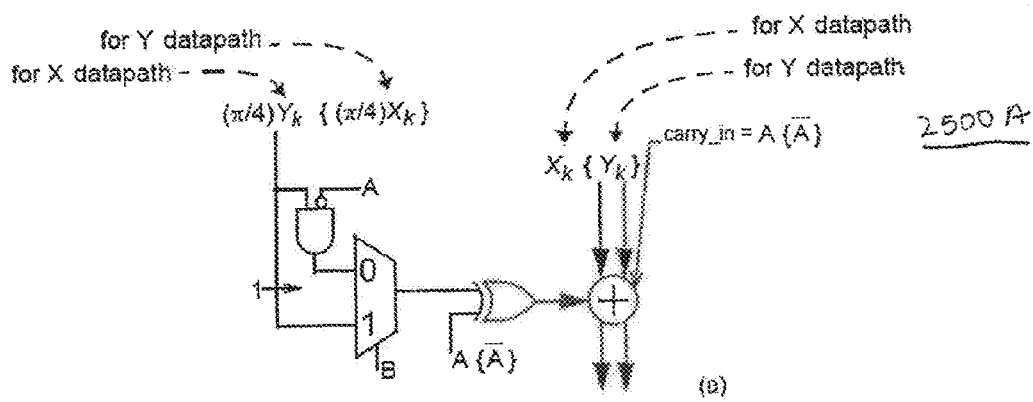
2500A
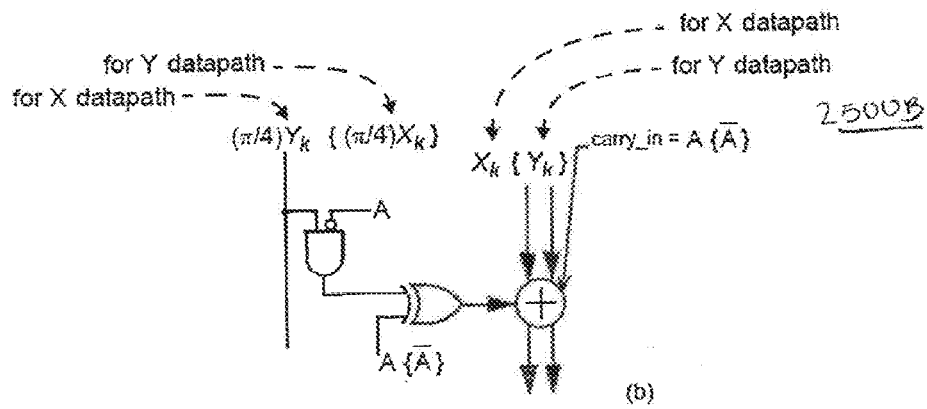
2500B
FIG. 25

EXCESS-FOURS PROCESSING IN DIRECT DIGITAL SYNTHESIZER IMPLEMENTATIONS

CROSS-REFERENCE TO RELATED APPLICATIONS

This application is a continuation-in-part of application Ser. No. 11/938,252, filed Nov. 9, 2007, entitled "Efficient Angle Rotation Configured for Dynamic Adjustment" which claims benefit to Application No. 60/857,778, filed on Nov. 9, 2006, both of which are incorporated herein by reference in their entirety.

FIELD OF THE INVENTION

This application relates generally to direct digital synthesizers and particularly to direct digital synthesizer implementing excess-fours processing.

BACKGROUND OF THE INVENTION

Direct digital synthesizers, commonly referred to as DDS or DDFS, are widely used in digital devices. A direct digital frequency synthesizer (DDS) can be considered a special case of a digital mixer. While the mixer rotates an arbitrary point in the plane by an angle specified by the normalized rotation angle, θ, the DDS always rotates a fixed point, which can be considered to be the point (1, 0).

The phase accumulator in a DDS employs a relatively long phase word (e.g., the word length M=32 bits for the examples we have been using here, and M=48 bits has been used in commercial products described in "1 GSPS Direct Digital Synthesizer with 14-Bit DAC," AD9912 Data Sheet, Analog Devices, Inc., 2007-2010 and "2.7 GHz DDS-Based AgileRF™ Synthesizer," AD9956 Data Sheet, Analog Devices, Inc., 2004). When incrementing the phase accumulator by adding a frequency control word (FCW) to it, a long carry-ripple delay can be problematic. For example, the use of Artisan library cells for TSMC 0.18-μm CMOS can require a carry-ripple delay that is sufficiently long as to make running the phase accumulator at a desired 250-MHz speed expensive in terms of power dissipation. A well-known technique for increasing the frequency at which a DDS phase accumulator can be updated is to employ some form of pipelining of the phase accumulator.

When pipelined, a 32-bit phase accumulator can run at 250-MHz in TSMC 0.18-μm CMOS. In addition to the increased hardware expense incurred by the pipelining circuitry, one residual problem remains: the inherent pipeline-induced delay and/or complexity when one desires to instantaneously change the frequency being generated—by changing FCW. (Instantaneous frequency changing is one of the very desirable capabilities of a DDS; indeed, such a feature is perhaps unique to a DDS, in comparison with other types of oscillators.) When changing to a new FCW value, in a pipelined-phase-accumulator system, it can be a problem that the least-significant part of the phase accumulator must be incremented in a previous output-data cycle to that in which the most-significant part of the phase accumulator is incremented, and solving this and related problems can require additional and more complicated circuitry and/or performance compromises.

What is therefore needed is a DDS that solves the phase accumulator speed-up problem.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 24A depicts sums partitioned into two groups and 24B depicts sums with no partitioning, according to embodiments of the present invention.

FIG. 25A depicts an excess two sub-stage processor and FIG. 25B depicts an excess one sub-stage processor, according to embodiments of the present invention.

Figure 1:
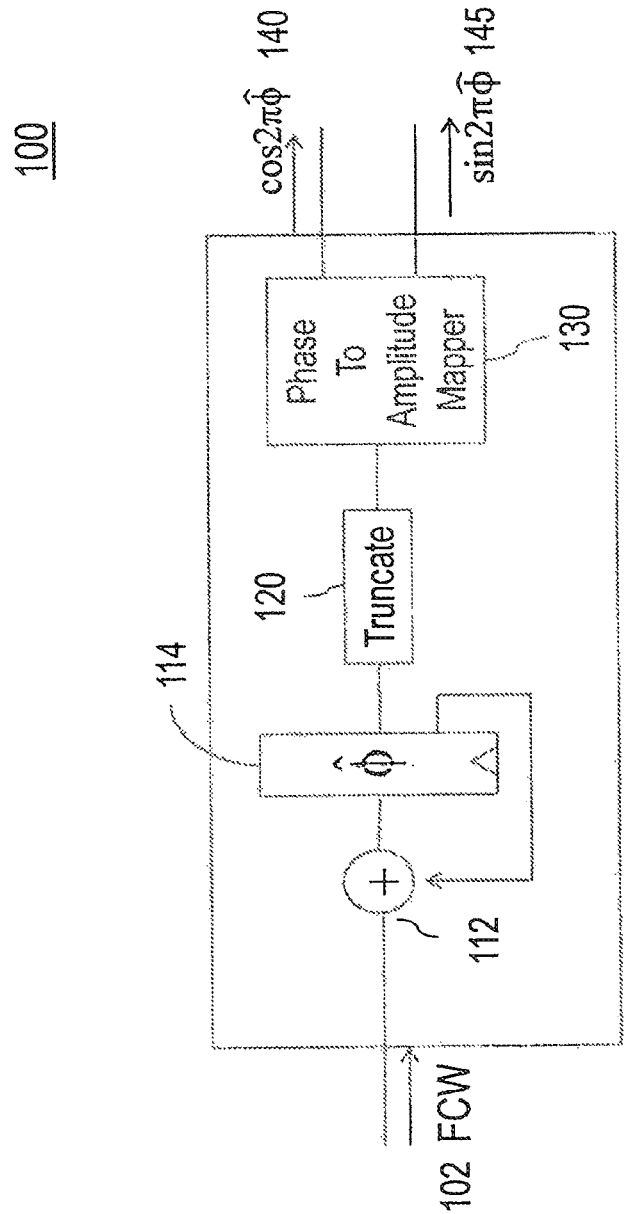
FIG. 1 depicts the basic structure of a direct digital synthesizer.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Embodiments of the present invention integrating excess-fours processing into direct digital synthesizer implementations improves upon many facets of the implementation and operation of a direct digital synthesizer (DDS)—sometimes referred to as a direct digital frequency synthesizer (DDFS), or as a numerically controlled oscillator (NCO). Perhaps the most significant is the improved operation of the DDS phase accumulator. Issues related to the "too-long carry ripple" of a DDS phase accumulator have been discussed and dealt with in the literature for virtually as long as the DDS has been in existence.

The solution to this problem is obtained by use of the excess fours processing.

1.0 DIRECT DIGITAL SYNTHESIZER (DDS)

FIG. 1 depicts the basic structure of a DDS 100. Many DDS systems provide two outputs, where both $\sin 2\pi\hat{\phi}$ and $\cos 2\pi\hat{\phi}$ are generated simultaneously for each $\hat{\phi}$ value. Alternatively, a single-output DDS may produce either $\cos 2\pi\hat{\phi}$ or $\sin 2\pi\hat{\phi}$. As illustrated in FIG. 1, DDS 100 takes as input a frequency control word (FCW) 102 and generates a cosine output 140, a sine output 145, or both sine 145 and cosine 140 outputs. When the DDS generates just a sine output, it is referred to as a sine DDS. When the DDS generates just a cosine output, it is referred to as a cosine DDS. When a DDS generates both sine and cosine outputs, it is referred to as a quadrature DDS.

DDS 100 includes an adder 112, a phase accumulator 114, a truncate module 120, and a phase to amplitude mapper 130. In embodiments, adder 112 is an unsigned overflowing adder that is repeatedly incremented by the M-bit FCW 102. The output of the adder, $\hat{\phi}$, is stored in the phase accumulator 114. The phase accumulator 114 in embodiments is an M-bit register. The sequence of phase values that results from the repeated incrementing of the FCW is a sequence of unsigned numbers lying within the interval [0, 1), specifying a sequence of points on the unit circle, each point corresponding to a radian-valued angle that lies within the interval [0, 2π) where "[" is used to indicate inclusion of the end point in the interval and ")" is used to indicated exclusion of the end point from the interval.

Figure 2:
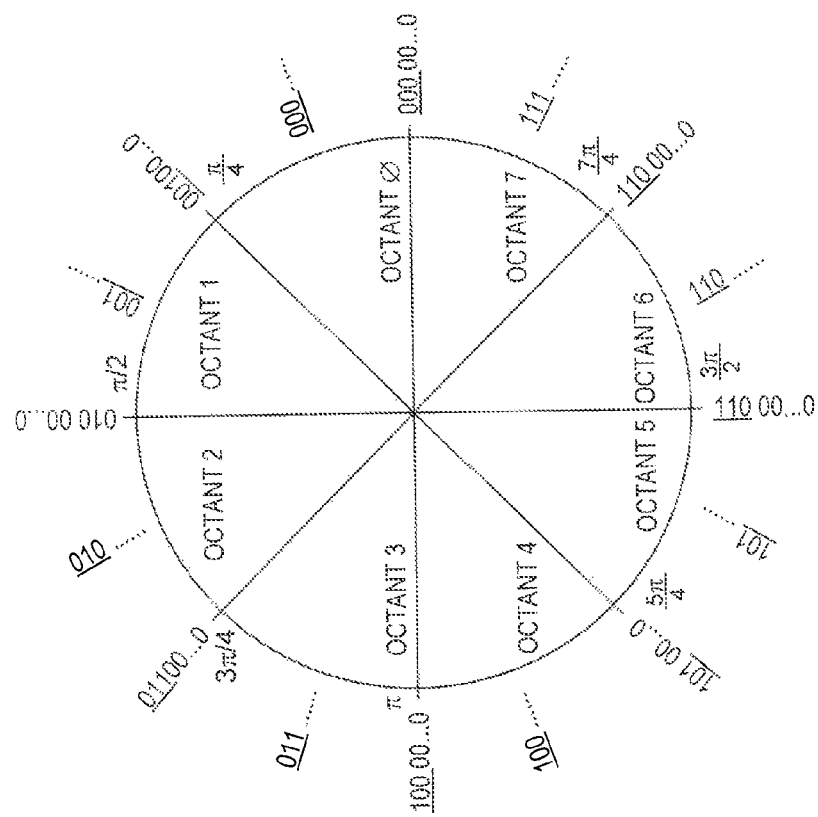
FIG. 2 illustrates the partitioning of the unit circle into octants.

FIG. 2 illustrates the partitioning of the unit circle into octants. As shown in FIG. 2, the three most significant bits (MSBs) of the normalized angle (eight possible combinations '000', '001', '010', '011', '100', '101', '110', and '111') indicate the placement of the normalized angle in an octant. The octants are numbered 0, 1, . . . , 7 with Octant 0 including angles $\hat{\phi}$ within the half-open interval [0, π/4) while Octant 1 has angles $\hat{\phi}$ within [π/4, π/2), etc.

Thus, the phase accumulator values can be viewed as normalized angles that become radian-valued angles if they are multiplied by 2π. When an overflow occurs, the integer part of $\hat{\phi}$ is lost, which elegantly causes the remaining fractional part of $\hat{\phi}$ to be represented by an angle within [0, 2π), but normalized to [0, 1). The normalized angles are fed to the phase-to-amplitude mapper 130. The phase-to-amplitude mapper 130 is configured to compute the sequence of amplitudes of a sinusoid, e.g., $y = \sin 2\pi\hat{\phi}$ for each normalized angle $\hat{\phi}$.

Various innovations have been adopted in the conventional use of a DDS over the past four decades. The earliest DDS implementations simply employed lookup tables (ROMs) for getting the $y = \sin 2\pi\hat{\phi}$ values, using the normalized phase angle $\hat{\phi}$ to address the ROMs. Since the ROM size grows exponentially with the bit-length of $\hat{\phi}$ various techniques have been devised to reduce lookup-table size. One early technique was to use only the most significant W bits of normalized angle $\hat{\phi}$ as the ROM address. This technique is depicted in FIG. 1. As shown in FIG. 1, truncate module 120 truncates the M-bit normalized angle to W bits. Clearly, this truncation can produce an exponential reduction in ROM storage requirements, from $2^M$ words, down to $2^W$ words, where W<M.

Another technique that is almost universally applied for reducing ROM storage requirements is the exploitation of certain symmetries of sinusoidal functions defined over [0, 2π). For example, rather than storing the values of $\sin 2\pi\hat{\phi}$ for all needed values of $\hat{\phi}$ within [0, 1), it suffices to have a ROM that contains only the values of $\sin 2\pi\hat{\phi}$ for $0 \leq \hat{\phi} \leq \frac{1}{4}$ (first quadrant represented by Octants 0 and 1 in FIG. 2). Values of the sine function for angles in the other three quadrants can easily be determined from values of the sine within the first quadrant—just a conditional two's complement negation of $\hat{\phi}$ (applied only in the second and fourth quadrants) and a conditional negation of the $\sin 2\pi\hat{\phi}$ output value (applied only in the third and fourth quadrants) can extend the definition of $\sin 2\pi\hat{\phi}$ to the complete interval $0 \leq \hat{\phi} \leq 1$.

Similarly, when both $\sin 2\pi\hat{\phi}$ and $\cos 2\pi\hat{\phi}$ are being generated, it suffices to store data in ROMs for both $\sin 2\pi\hat{\phi}$ and $\cos 2\pi\hat{\phi}$ for values of 0 within the first octant $0 \leq \hat{\phi} \leq \frac{1}{8}$ Various computation-based approaches for getting $\sin 2\pi\hat{\phi}$ and/or $\cos 2\pi\hat{\phi}$ over the quadrant or octant intervals, as well as combinations of table-lookups and computations, have been employed. The article, "A 100-MHz 16-b, direct digital frequency synthesizer with a 100-dBc spurious-free dynamic range," by A. Madisetti, A. Y. Kwentus, and A. N Willson, published in IEEE J Solid-State Circuits, vol. 34, pp. 1034-1043 (August 1999) (hereinafter "Madisetti") shows that a modified-CORDIC rotation can be applied, using the value of 0 to rotate the point (1, 0) in the plane to get to a point (a, b) on the unit circle, with the result that a and b represent the desired $\cos 2\pi\hat{\phi}$ and $\sin 2\pi\hat{\phi}$ values, respectively. Using CORDIC, the rotations are performed, one after the other, each rotating further the result of the previous rotation, using positive or negative rotation angles having strictly monotone decreasing magnitude.

The first four rotations for the method of Madisetti are actually performed by a single small ROM table (a coarse rotation ROM), and the remaining rotations are each performed by a matrix operator that provides an approximate pure rotation through a small angle α. For a sufficiently small, a point (x, y) in the plane can be approximately rotated to obtain the point (u, v) as follows:

$$\begin{pmatrix} u \\ v \end{pmatrix} = \begin{bmatrix} 1 & -\alpha \\ \alpha & 1 \end{bmatrix} \begin{pmatrix} x \\ y \end{pmatrix} \quad (1)$$

where the vector $(u, v)^T$ is close to the point obtained by a pure rotation of $(x, y)^T$ around the origin, counter-clockwise, through the positive angle α, because a pure rotation (by an angle β, a so-called Givens rotation) would employ the following matrix involving cos β and sin β. The relations are $$\begin{bmatrix} \cos\beta & -\sin\beta \\ \sin\beta & \cos\beta \end{bmatrix} = \cos\beta \begin{bmatrix} 1 & -\tan\beta \\ \tan\beta & 1 \end{bmatrix} = \cos\beta \begin{bmatrix} 1 & -\alpha \\ \alpha & 1 \end{bmatrix}.$$

That is, equation (1) above introduces an angular-rotation error, in that (1) rotates by β radians, where β=atan α, rather than α radians, and it introduces a magnitude-scaling error in the rotated vector, where the scaling factor is $1/\cos\beta = \sqrt{1+\alpha^2}$. The length of the rotated vector is slightly increased. But clearly, if α is sufficiently small then β=atan α≈α and also 1/cos β ≈1.

Figure 3:
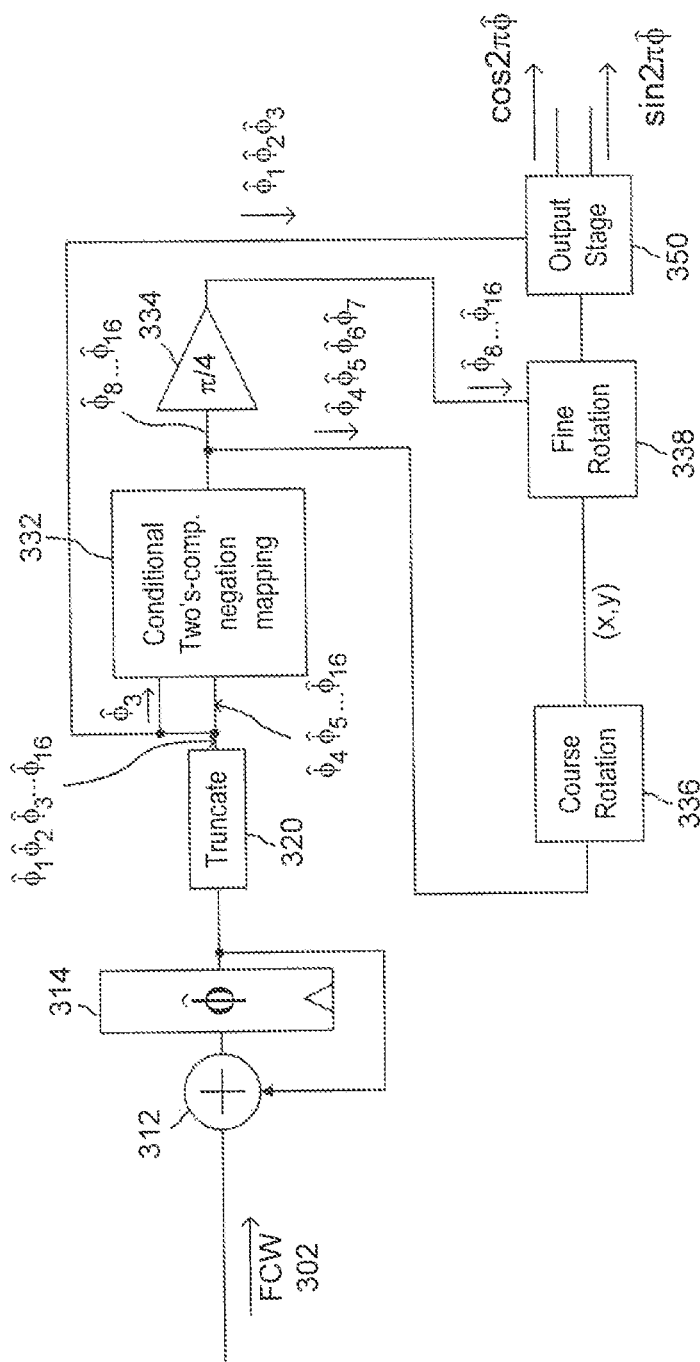
FIG. 3 depicts a detailed block diagram of a direct digital synthesizer 300 having coarse and fine rotation stages.

The article, "A two-stage angle-rotation architecture and its error analysis for efficient digital mixer implementation," by D. Fu and A. N. Willson, Jr., published in *IEEE Trans. Circuits Syst. I*, vol. 53, pp. 604-614 (March 2006) (hereinafter "Fu") formalized the notion of a two-stage rotation process, comprising first a ROM-based coarse rotation and then a fine, computation-based rotation. FIG. 3 depicts a detailed block diagram of a direct digital synthesizer 300 having coarse and fine rotation stages. Direct digital synthesizer (DDS) 300 includes an adder 312 and a phase accumulator 314. In embodiments, adder 312 is an unsigned overflowing adder that is repeatedly incremented by M-bit frequency control word (FCW) input 302. The output of the adder, $\hat{\phi}$, is stored in the phase accumulator 314. The phase accumulator 314 in embodiments is an M-bit register (e.g., a 32-bit register).

DDS 300 may also include a module 320 to truncate the M-bit output of the phase accumulator to W bits (e.g., 16 bits). Module 320 may be a stand-alone module or may be included in the phase accumulator 314. The output of module 320 is the sequence of bits $\hat{\phi}_1, \hat{\phi}_2 \ldots \hat{\phi}_{16}$. Truncate module 320 is coupled to a conditional two's complement negation mapping module 332 and to an output stage 350. After truncating the M-bit phase accumulator to W bits (see FIG. 3, where W=16, and M=32), the three octant-determining MSBs $\hat{\phi}_1\hat{\phi}_2\hat{\phi}_3$ are stripped off and $\hat{\phi}_3$=0/1 (specifying an even-octant/odd-octant angle) is passed to the conditional two's complement negation mapping module 332 and used to control a conditional two's complement negation of the remaining bits.

Conditional two's complement negation mapping module 332 receives two inputs. The first input is $\hat{\phi}_3$ and the second input is bits $\hat{\phi}_4\hat{\phi}_5\hat{\phi}_6\ldots\hat{\phi}_{16}$. The conditional two's complement negation mapping module 332 outputs 13 bits, $\phi_4\phi_5\phi_6\phi_7\phi_8 \phi_9\ldots\phi_{16}$. After being processed by the conditional negation block, angles $\hat{\phi}$ are represented as $\phi$ (i.e., without the "hat").

These angles are converted into radian-valued angles by multiplying them by an approximation to π/4. Multiplier 334 receives as input bits $\phi_8\phi_9\ldots\phi_{16}$ and outputs nine bits $\phi_8\ldots\phi_{16}$ of the radian-valued angle, θ. The π/4 value reflects the 2π/8 value that would be applied to a normalized "Octant-0 angle" where normalized values within the interval [0, 1) correspond to radian-valued angles within the Octant-0 interval [0, π/4).

Rotation may be decomposed into two stages: a coarse rotation of the input signal followed by a fine rotation of an intermediate pair of numbers. Coarse rotation stage 336 receives as input, bits $\phi_4\phi_5\phi_6\phi_7$ from the conditional two's complement mapping module 332. In embodiments, coarse rotation stage 336 includes a Read Only Memory (ROM). The coarse rotation stage 336 produces an intermediate pair of numbers (X, Y). The fine rotation stage 338 receives the intermediate numbers (X, Y) and performs the fine rotation of the intermediate pair (representing a point in the plane) counter-clockwise around the origin, to produce an output signal. Various techniques have also been advocated for reducing the number of fine-stage rotations, including the use of "look-ahead rotations" described in Madisetti, and minority-select fine-stage rotations described in U.S. Pat. No. 7,539,716 to A. Torosyan (hereinafter "Torosyanl"). Output Stage 350 controlled by $\hat{\phi}_1\hat{\phi}_2\hat{\phi}_3$ remaps the fine-stage rotated result into its correct octant.

Output stage 350 receives the three high order bits $\hat{\phi}_1\hat{\phi}_2\hat{\phi}_3$ from truncation module 320 and the output from fine rotation stage 338. The three high order bits $\hat{\phi}_1\hat{\phi}_2\hat{\phi}_3$ identify the octant (0 through 7) to which the output of the fine rotation stage 338 belongs. Output stage 350 may provide two (so-called quadrature) outputs, where both sin 2π$\hat{\phi}$ and cos 2π$\hat{\phi}$ are generated simultaneously for each $\hat{\phi}$ value. Alternatively, output stage 350 may provide a single-output (e.g., cos 2π$\hat{\phi}$ or sin 2π$\hat{\phi}$).

While it is evident that the coarse rotation stage can be driven by a normalized angle (the conditionally-negated normalized angle $\phi_4\phi_5\phi_6\phi_7$ in FIG. 3), the fine rotations in the fine rotation stage can also be driven by a normalized angle, the normalized angle $\phi_8\ldots\phi_{16}$ rather than $\theta_8\ldots\theta_{16}$. To see how this can be done, it suffices to recognize that by simply removing the π/4 multiplier from the FIG. 3 system, the fine-rotation block is being driven by what could be viewed as a radian-valued angle, but one whose angle is too large by a factor of 4/π. This undesired 4/π factor can be eliminated, however, within the fine-rotation block's computations. There, the computations can amount to matrix-vector multiplications like equation (1). Hence, it clearly makes no difference if the rotation angle is corrected by multiplying the value of α by π/4 (which is the role of the π/4 multiplier of FIG. 3) or by performing the multiplications −αy and αx in equation (1) using special x and y values that have been pre-multiplied by π/4. And since the x and y values come from the coarse rotation ROM, such pre-multiplied πx/4 and πy/4 values can be provided as well by the coarse rotation ROM, with no computational overhead—but at the expense of a reasonable, but nontrivial, increase in ROM storage.

Figure 4:
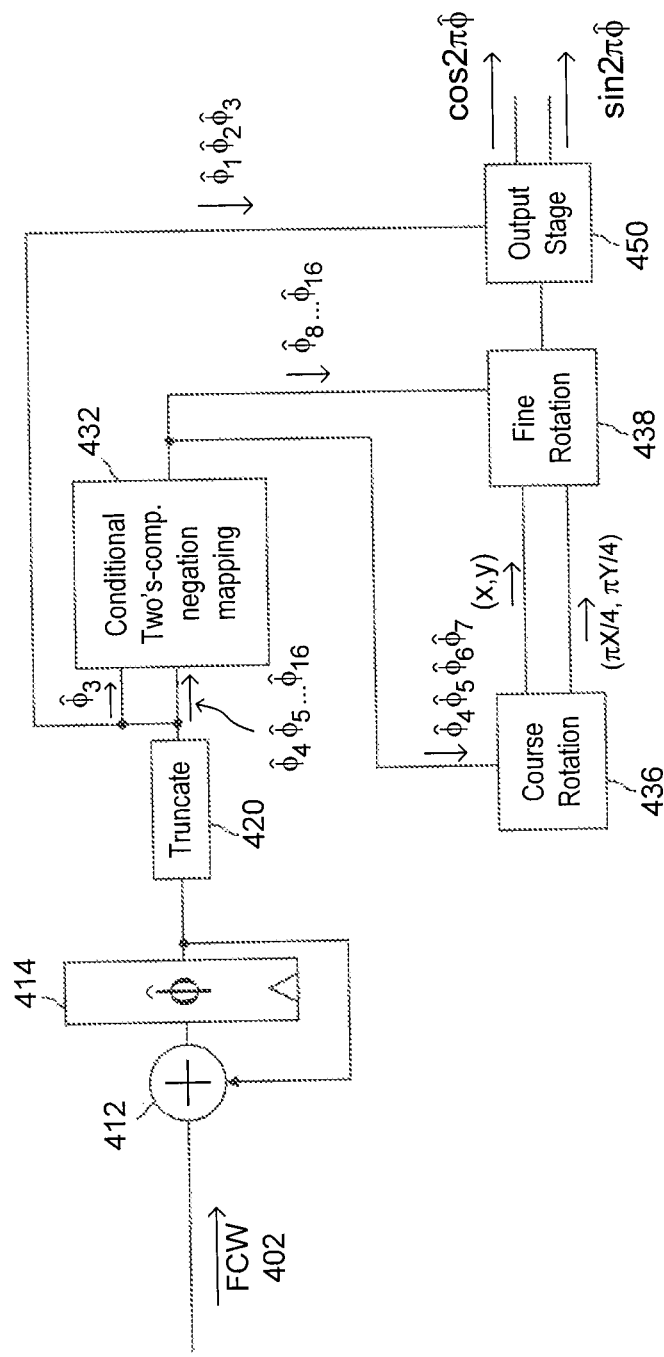
FIG. 4 depicts a direct digital synthesizer eliminating the π/4 multiplier.

FIG. 4 depicts a DDS eliminating the π/4 multipliers. Direct digital synthesizer (DDS) 400 includes an adder 412 and a phase accumulator 414. The output of the adder, $\hat{\phi}$, is stored in the phase accumulator 414. The phase accumulator 414 in embodiments is an M-bit register (e.g., a 32 bit register). DDS 400 may also include a module 420 to truncate the M-bit output of the phase accumulator to W bits (e.g., 16 bits). Truncate module 420 is coupled to a conditional two's complement negation mapping module 432 and to an output stage 450. After truncating the M-bit phase accumulator to W bits (see FIG. 3, where W=16, and M=32), the three octant-determining MSBs $\hat{\phi}_1\hat{\phi}_2\hat{\phi}_3$ are stripped off and $\hat{\phi}_3$=0/1 (specifying an even-octant/odd-octant angle) is passed to the conditional two's complement negation mapping module 432 and used to control a conditional two's complement negation of the remaining bits.

Coarse rotation stage 436 receives as input, bits $\phi_4\phi_5\phi_6\phi_7$ from the conditional two's complement mapping module 432. The coarse rotation stage 436 produces an intermediate pair of numbers (X, Y). The fine rotation stage 438 receives the intermediate numbers (X, Y) from coarse rotation stage 436 and $\phi_8 \ldots \phi_{16}$ from conditional two's complement negation mapping module 432 and performs the fine rotation of the intermediate pair (representing a point in the plane) counterclockwise around the origin, to produce an output signal.

While we have illustrated the FIG. 3 and FIG. 4 type systems with coarse-rotation ROMs that have four-bit addresses (i.e., bits $\phi_4$, $\phi_5$, $\phi_6$, $\phi_7$) it will be evident to one of ordinary skill in the art that other numbers of address bits could be used (e.g., 3, 5, 6, 7, or more). Using more address bits may have performance advantages but this will be accompanied by the hardware cost of a larger ROM. With four address bits, the coarse rotation stage requires a 16-word ROM for the coarse X outputs and another 16 words for the Y outputs. The elimination of the π/4 multiplier requires two additional 16-word ROMs for the (π/4)X and (π/4)Y outputs. That is, the DDS of FIG. 4 requires a total of 4×2$^4$=64 words of ROM storage when using ROMs having four-bit addresses. Similarly, a five-bit-driven coarse rotation (with the π/4 multiplier removal of FIG. 4) would require 4×2$^5$=128 words of ROM storage.

2.0 EXCESS FOUR PROCESSING

In embodiments of the present invention, the number of fine rotations required in a 2-stage angle-rotation DDS, such as the DDS depicted in FIGS. 3 and 4, can be reduced by utilizing the "excess fours method." The excess fours method appears to have significant advantages over previous methods, and these advantages include, but go beyond, providing the capability to reduce the number of fine-stage rotations.

2.1 Excess Four Basics

Figure 5:
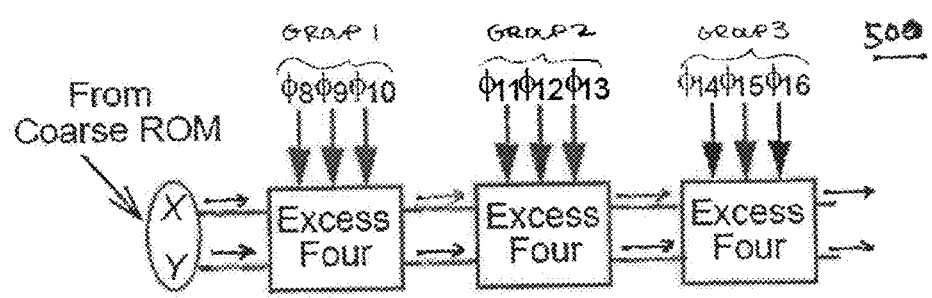
FIG. 5 depicts a high-level block diagram of an excess fours fine rotation stage, according to embodiments of the present invention.

FIG. 5 depicts a high-level block diagram of an excess fours fine rotation stage 500, according to embodiments of the present invention. As illustrated in FIG. 5, fine-stage phase word (also referred to herein as the fine stage rotation bits) has been divided into three three-bit groups (Groups 1, 2, and 3). Group 1 includes $\phi_8\phi_9\phi_{10}$ of the fine-stage phase word. Group 2 includes $\phi_{11}\phi_{12}\phi_{13}$ of the fine-stage phase word. Group 3 includes $\phi_{14}\phi_{15}\phi_{16}$ of the fine-stage phase word. In embodiments, the coarse-stage angle rotation includes, in addition to the rotation amount specified by the normalized coarse angle (e.g., $\phi_4\phi_5\phi_6\phi_7$) a rotation by an offset normalized angle amount equal to the sum of weighted binary values "100" (i.e., binary "4") for each of the three-bit fine-stage groups. Fine rotation stage 500 receives as input the (X, Y) values from coarse rotation stage (not shown). The fine rotation stage 500 is configured to perform a single positive/negative fine-stage rotation of (X, Y) for each three-bit group, as indicated in FIG. 5 and the BIAS=0 column of Table 1.

Table 1 below depicts an excess four rotation table. There are two inputs to an excess four rotation table (such as Table 1): a three-bit pattern, specifying a normalized-angle rotation value from 0 through 7, and a one-bit value (not used in the fine rotation stage example of FIG. 5), specifying a BIAS of either 0 or 1. The excess four table can be viewed as having two outputs: a three-bit value that will be shown to correspond to the selecting and shifting applied to incoming data, and a one-bit value indicating whether the selected and shifted data will be added (0) or subtracted (1)—where adding/subtracting will be shown to correspond to a positive/negative three-bit angle-driven sub-rotation. These table output bits are used as control bits, primarily controlling multiplexers in a DDS fine stage.

TABLE 1

| | Excess Four System | |
|---|---|---|
| bit pattern $\phi_a\phi_b\phi_c$ | if BIAS = 0 treated as | if BIAS = 1 treated as |
| 000 (0) | −100 (−4) | −011 (−3) |
| 001 (1) | −011 (−3) | −010 (−2) |
| 010 (2) | −010 (−2) | −001 (−1) |
| 011 (3) | −001 (−1) | 000 (0) |
| 100 (4) | 000 (0) | 001 (1) |
| 101 (5) | 001 (1) | 010 (2) |
| 110 (6) | 010 (2) | 011 (3) |
| 111 (7) | 011 (3) | 100 (4) |

Notice that the BIAS=1 column has values that could be obtained from the BIAS=0 column by shifting each row up by one row and including a "100 (4)" entry on the last row. This, of course, corresponds to an additional "001" rotational increment for the BIAS=1 value. Notice also, however, that the BIAS=1 column has values that could be obtained from the BIAS=0 column if the BIAS=0 column is just flipped-up/down and negated. Moreover, the up/down flipping can effectively be achieved by simply addressing a table row by the ones' complement of the 3-bit input data (in the column labeled "bit pattern"). This means that the operations indicated in Table 1 can be performed by simply building a circuit that implements only the BIAS=0 column and then, when using the circuit to perform a rotation, replacing the three input-bits $\phi_a\phi_b\phi_c$ by the three bits $\gamma_a\gamma_b\gamma_c$, obtained with use of an Exclusive-OR (XOR): $\gamma_k=\phi_k\oplus$ BIAS, for k=1, 2, 3. The table's output add/subtract bit, described above, is used after Exclusive-ORing it with BIAS. In situations always dealing with the BIAS=0 case, the above-mentioned XORs may be omitted. The capability, exhibited in Table 1, to increase an angle-rotation value by one bit, on the fly (by merely using a single-bit XOR gate), provides a powerful means for incrementing the phase value "in place," i.e., without requiring a long carry ripple. Various examples of significant benefits deriving from this feature are described herein.

2.2 Fine Stage Rotation Using Excess Four Technique: Conventional Processing

An excess fours processor can be used conventionally (i.e., with a fixed BIAS=0 value on each three-bit group). This conventional processing corresponds to the usual DDS processing of the fine-stage data, with the full-angle data having been obtained from a truncated phase accumulator. The fine-stage data could either be un-normalized data (i.e., radian valued, where the normalized phase value has been multiplied by π/4—as shown in FIG. 3) or normalized data (where no π/4 multiplication has occurred, as in FIG. 4)—depending on the type of system being designed. The normalized phase-accumulator data will have been obtained in the usual manner, i.e., after an update of the previous normalized-phase-accumulator data by adding in an FCW value. The most significant three bits (the octant-designating bits $\hat{\phi}_1\hat{\phi}_2\hat{\phi}_3$ in FIGS. 3 and 4) will have been stripped off and bit-3 (will have been used to determine whether or not a two's complement negation is applied to the remaining bits.

Figure 6A:
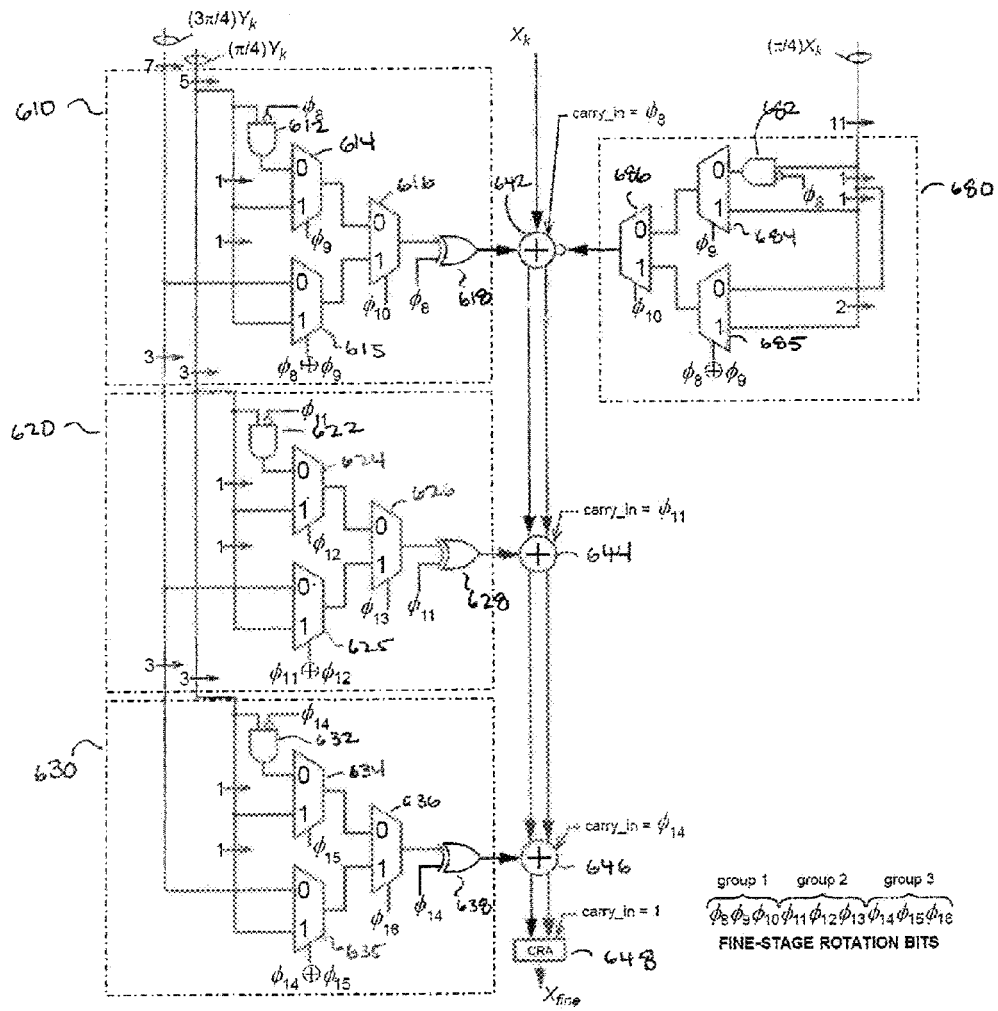
FIGS. 6A and 6B depict an exemplary fine rotation stage using conventional excess-four processing, according to embodiments of the present invention.
Figure 6B:
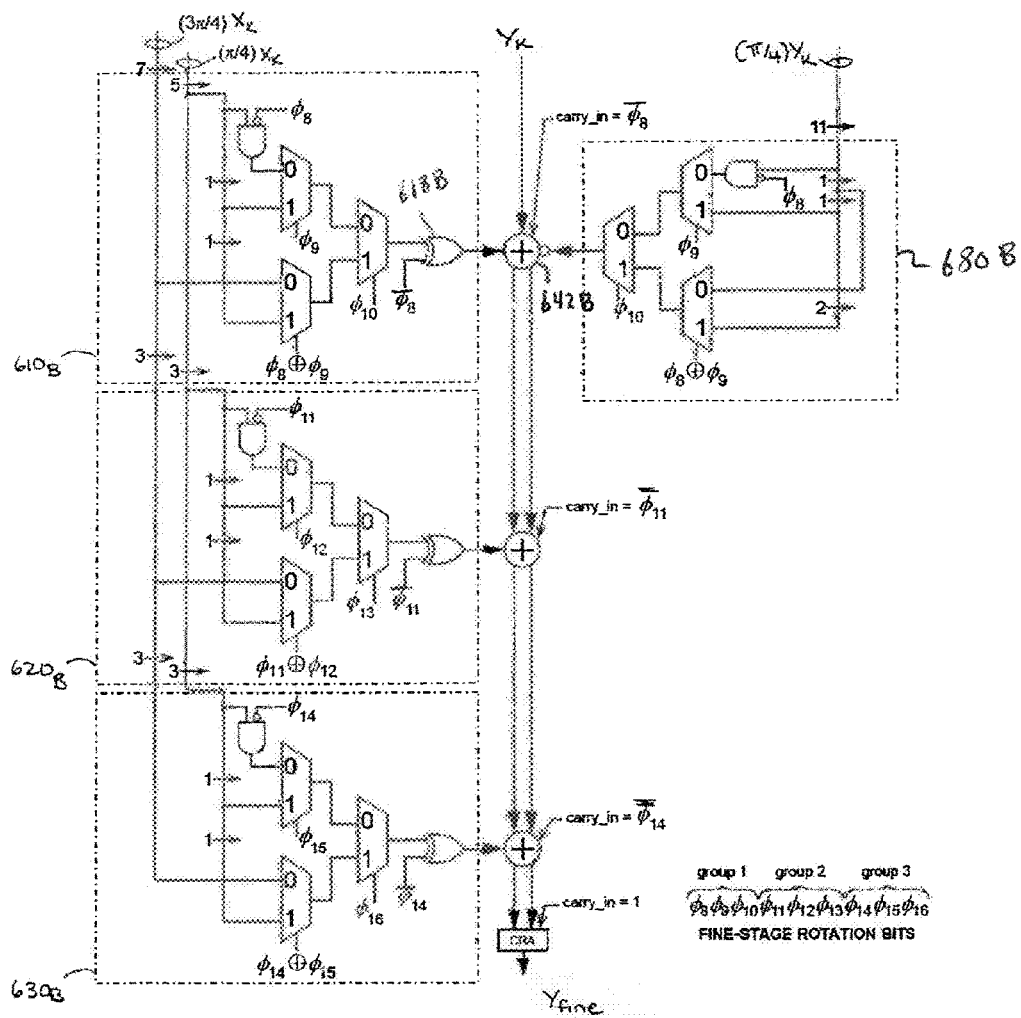

FIGS. 6A and 6B depict an exemplary fine rotation stage 600 using conventional excess-four processing, according to embodiments of the present invention. FIG. 6A is configured to generate $X_{fine}$ ($X_{datapath}$) and FIG. 6B is configured to generate $Y_{fine}$ ($Y_{datapath}$). When utilizing the excess four technique, fine rotation stage 600 receives a bit sequence, e.g., $\phi_8\phi_9\phi_{10}\phi_{11}\phi_{12}\phi_{13}\phi_{14}\phi_{15}\phi_{16}$, representing the normalized angle. Notice that for notational clarity all variables, $\hat{\phi}_k$ have been written as $\phi_k$ Exemplary fine rotation stage 600 includes three subrotation modules 610, 620, and 630. Each of the three rotation stages uses a simple three multiplexer circuit that implements the BIAS=0 column of Table 1.

Subrotation module 610 includes an AND gate 612, three 2-to-1 multiplexers 614, 615, and 616, and an exclusive-OR gate 618. Subrotation module 610 receives the group 1, $\phi_8\phi_9\phi_{10}$, of the fine-stage rotation bits. AND gate 612 receives as a first input, $(\pi/4)Y_k$, shifted by 5 (i.e., by five bits in the LSB direction) and as a second input, bit $\phi_8$ of group 1, which is negated at the input. The output of AND gate 612 is provided at the 0 input to multiplexer 614. Multiplexer 614 receives $(\pi/4)Y_k$ shifted by 6 at its 1 input. Multiplexer 614 is controlled by bit $\phi_9$ of the three-bit input group. Multiplexer 615 receives $(3\pi/4)Y_k$ shifted by 7 at its 0 input and $(\pi/4)Y_k$ shifted by 7 at its 1 input. Multiplexer 615 is controlled by the exclusive-OR of bits $\phi_8$ and $\phi_9$ of group 1 of the fine-stage rotation bits. The output of multiplexer 614 is provided at the 0 input of multiplexer 616 and the output of multiplexer 615 is provided at the 1 input of multiplexer 616. Multiplexer 616 is controlled by bit $\phi_{10}$ of group 1. The output of multiplexer 616 is provided as a first input to exclusive-OR gate 618. Exclusive-OR gate 618 receives bit $\phi_8$ of group 1 as its second input.

Subrotation module 620 includes an AND gate 622, three 2-to-1 multiplexers 624, 625, and 626, and an exclusive-OR gate 628. Subrotation module 620 receives group 2, $\phi_{11}\phi_{12}\phi_{13}$, of the fine-stage rotation bits. AND gate 622 receives as a first input, $(\pi/4)Y_k$, shifted by 8 and as a second input, bit $\phi_{11}$ of the three-bit input group, which is negated at the input. The output of AND gate 622 is provided at the 0 input to multiplexer 624. Multiplexer 624 receives $(\pi/4)Y_k$ shifted by 9 at its 1 input. Multiplexer 624 is controlled by bit $\phi_{12}$ of group 2. Multiplexer 625 receives $(3\pi/4)Y_k$ shifted by 10 at its 0 input and $(\pi/4)Y_k$ shifted by 10 at its 1 input. Multiplexer 625 is controlled by the exclusive-OR of bits $\phi_{11}$ and $\phi_{12}$ of group 2 of the fine rotation bits. The output of multiplexer 624 is provided at the 0 input of multiplexer 626 and the output of multiplexer 625 is provided at the 1 input of multiplexer 626. Multiplexer 626 is controlled by bit $\phi_{13}$ of group 2. The output of multiplexer 626 is provided as a first input to exclusive-OR gate 628. Exclusive-OR gate 628 receives bit $\phi_{11}$ of group 2 as its second input.

Subrotation module 630 includes an AND gate 632, three 2-to-1 multiplexers 634, 635, and 636, and an exclusive-OR gate 638. Subrotation module 630 receives group 3, $\phi_{14}\phi_{15}\phi_{16}$, of the fine-stage rotation bits. AND gate 632 receives as a first input, $(\pi/4)Y_k$, shifted by 11 and as a second input, bit $\phi_{14}$ of group 3, which is negated at the input. The output of AND gate 632 is provided at the 0 input to multiplexer 634. Multiplexer 634 receives $(\pi/4)Y_k$ shifted by 12 at its 1 input. Multiplexer 634 is controlled by bit $\phi_{15}$ of group 3. Multiplexer 635 receives $(3\pi/4)Y_k$ shifted by 13 at its 0 input and $(\pi/4)Y_k$ shifted by 13 at its 1 input. Multiplexer 635 is controlled by the exclusive-OR of bits $\phi_{14}$ and $\phi_{15}$ of group 3. The output of multiplexer 634 is provided at the 0 input of multiplexer 636 and the output of multiplexer 635 is provided at the 1 input of multiplexer 636. Multiplexer 636 is controlled by bit $\phi 16$ of group 3. The output of multiplexer 636 is provided as a first input to exclusive-OR gate 638. Exclusive-OR gate 638 receives bit $\phi_{14}$ of the third three-bit input group as its second input.

Both FIGS. 6A/B depict the use of the additional coarse-stage outputs $(3\pi/4)X$ and $(3\pi/4)Y$. While it will be understood by one of ordinary skill in the art that there would be alternate computation-based techniques to generate the needed $(3\pi/4)X$ and $(3\pi/4)Y$ values, (e.g., given the $(\pi/4)X$ value, $(3\pi/4)X$ can be obtained with one addition and a hard-wired shift, as $(3\pi/4)X=(\pi/4)X+2(\pi/4)X$). By using additional $(3\pi/4)X$ and $(3\pi/4)Y$ ROM values the system of FIG. 6A/B is computation free, except for the additions that appear in the vertical path down the center of FIG. 6A/B. The cost of storing the $(3\pi/4)X$ and $(3\pi/4)Y$ data would be $2\times2^4$ 32 additional ROM words, which brings the total ROM storage cost up to $6\times2^4=96$ words for a system having four ROM address bits, or $6\times2^5=192$ words for a five ROM address bit system, etc.

Fine stage magnitude scaling module 680 is configured to provide magnitude scaling for the fine rotation stage 600. The fine stage magnitude scaling module 680 of FIG. 6 also includes a simple three multiplexer circuit that slightly shortens the $X_k$ {or $Y_k$} input data, via subtraction, which approximately compensates for the slight lengthening of the output of the first three-bit rotation stage, as explained in the previous discussion regarding the introduction of equation (1). In principle, such magnitude scaling should (and would, when needed) also be employed for the other two rotation stages but the amount of scaling needed is rather small and can often be neglected without a significant loss of accuracy. The computed correction value of the fine stage magnitude scaling module 680 is ones'-complement negated as it is fed to the main (vertical) data-path in FIG. 6.

Magnitude scaling module 680 includes an AND gate 682 and three 2-to-1 multiplexers 684, 685, and 686. The AND gate 682 receives as a first input, $(\pi/4)X_k$, shifted by 11 and as a second input, bit $\phi_8$ of group 1, which is negated at the input. The output of AND gate 682 is provided at the 0 input of multiplexer 684. Multiplexer 684 receives $(\pi/4)X_k$ shifted by 13 at its 1 input. Multiplexer 684 is controlled by bit $\phi_9$ of the three-bit input group. Multiplexer 685 receives $(\pi/4)X_k$ shifted by 12 at its 0 input and $(\pi/4)X_k$ shifted by 15 at its 1 input. Multiplexer 685 is controlled by the exclusive-OR of bits $\phi_8$ and $\phi_9$ of group 1. The output of multiplexer 684 is provided at the 0 input of multiplexer 686 and the output of multiplexer 685 is provided at the 1 input of multiplexer 686. Multiplexer 686 is controlled by bit $\phi_{10}$ of group 1.

Adder 642 is configured to rotate input coordinate, $X_k$, by the value generated by first subrotation module 610. Adder 642 receives as inputs, $X_k$, the output of exclusive-OR gate 618 of the first subrotation module 610, and the negation of the output of multiplexer 686 of the fine stage magnitude scaling module 680. In an embodiment, adder 642 is a carry-save adder (CSA). Adder 642 may further receive bit $\phi_8$ of group 1 of the fine-stage rotation bits as the carry_in value, which causes the XOR 618 output, when negating a signal, to provide a fully two's-complemented value to adder 642.

Adder 644 receives the output from adder 642 and the subrotation value generated by the second subrotation module 620. Thus, adder 644 rotates $X_k$ by the additional subrotation value generated by subrotation module 620. In an embodiment, adder 644 is also a carry-save adder (CSA). Adder 644 may further receive bit $\phi_{11}$ of group 2 of the fine-stage rotation bits as the carry_in value. Similarly, adder 646 receives the output from adder 644 and the subrotation value generated by the third subrotation module 630. Thus, adder 646 rotates $X_k$ by the additional subrotation value generated by subrotation module 630. In an embodiment, adder 646 is also a carry-save adder (CSA). Adder 646 may further receive bit $\phi_{14}$ of group 3 of the fine-stage rotation bits as the carry_in value.

A final adder 648 receives the output from adder 646. In an embodiment, adder 648 is a carry ripple adder. Adder 648 receives a 1 value as a carry_in input. The carry_in=1 bit completes the ones'-complement negation of the correction value from the fine stage magnitude scaling module, making it into a two's-complement correction. The output of adder 648 is a coordinate, $X_{fine}$, of the rotated pair of output values.

Notice that, when implemented using carry-save adders, the total computation cost of the FIG. 6 system is just three carry-save adders and one carry-ripple adder for the X data path and a similar number of adders for the Y data path. That is, both X and Y rotations (which can operate simultaneously) are generated by a total of six carry-save additions and two carry-ripple additions. Various alternative techniques of performing the computations can be employed, as will be evident to one of ordinary skill in the art.

The circuit 600B of FIG. 6B is configured to generate $Y_{fine}$ ($Y_{datapath}$). The general operation of the $Y_{datapath}$ is the same as the $X_{datapath}$ of FIG. 6A with the following exceptions. The subrotation modules of FIG. 6B receive as input $(\pi^3/4)X_k$ and $(\pi/4)X_k$. Adder 642B receives as inputs, the input coordinate $Y_k$, the output of subrotation module 610B, and the inverted output of fine stage magnitude scaling module 680B. The output of circuit 600B is a coordinate, $Y_{fine}$, of the rotated pair of output values. Y-datapath computations require a negation of the $\phi_8$, $\phi_{11}$, and $\phi_{14}$ XOR inputs as well as negations of these values when used as carry_in values.

2.3 Ones' Complement Negation in Fine Stage Rotation Using Excess Four Technique Since a two's complement negation can be accomplished by starting with a ones' complement negation and including a carry-in bit into the ones' complement result, the conventional excess fours processing on a system for which the odd octants have had the ones' complement operation conditionally performed can be used instead of the two's complement negation. Then, when doing the fine-stage processing, an excess four processor is used for the least-significant three-bit group having the BIAS value set to "bit-3" (i.e., $\hat{\phi}_3$), or some equivalent computation. Thus, this method to implement the conditional two's complement negation requires only that the least-significant three-bit group's excess four processor be built to accommodate both columns of Table 1. This implementation would be applied to the normalized phase accumulator value, since it is this point in the conventional DDS processing where the conditional two's complement negation occurs.

Figure 7:
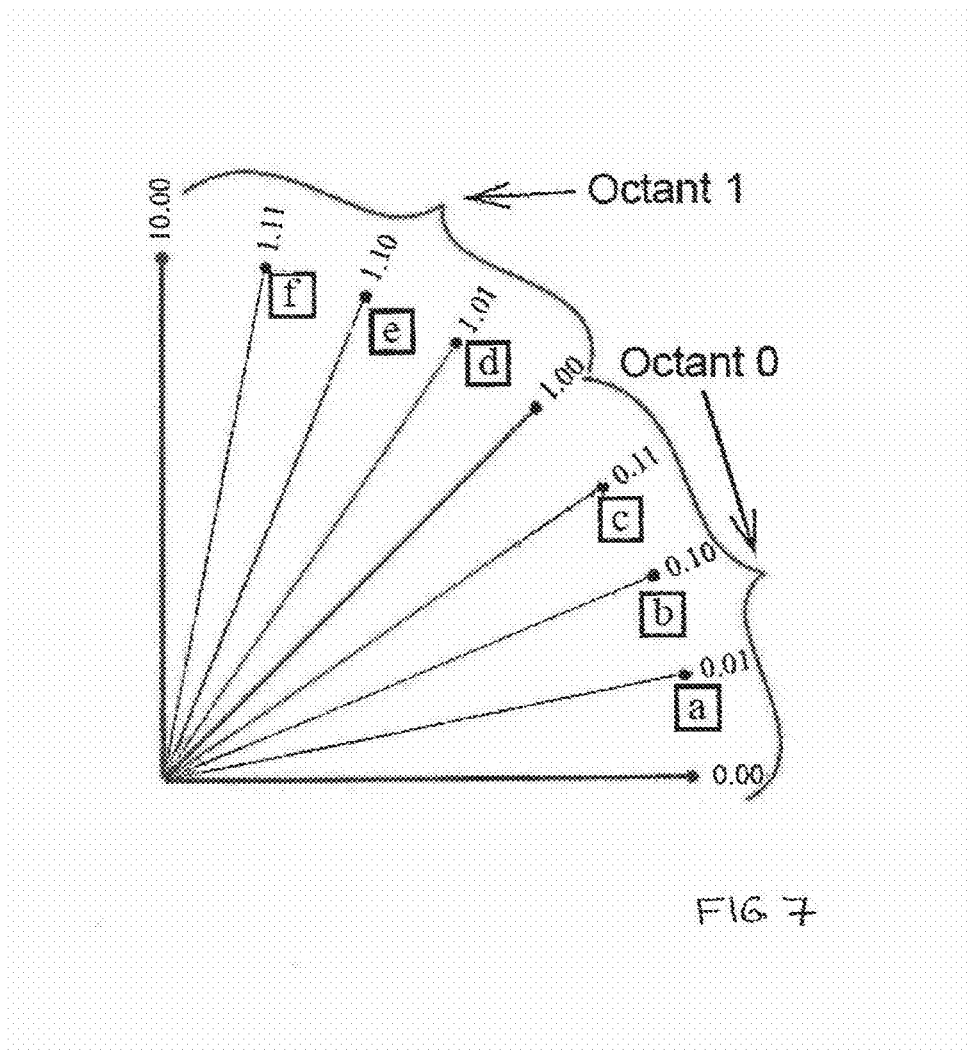
FIG. 7 depicts a set of normalized angles in Octants 0 and 1.

FIG. 7 depicts a set of normalized angles in Octants 0 and 1. As illustrated in FIG. 7, angle [d] is the mirror image (relative to the normalized angle 1.00, representing π/4 radians, which is the boundary between the two octants) of angle [c]; angle [e] is the mirror image of angle [b]; and angle [f] is the mirror image of angle [a]. The FIG. 7 normalized angles (which, for clarity, show far fewer bits than would typically be employed in a practical system) are processed as follows (clearly yielding two's complements):

1.00→0.11+(BIAS=1)=1.00 (invariant)

1.01→0.10+(BIAS=1)=0.11 [d]→[e]

1.10→0.01+(BIAS=1)=0.10 [c]→[b]

1.11→0.00+(BIAS=1)==0.01 [f]→[a]

Figure 8A:
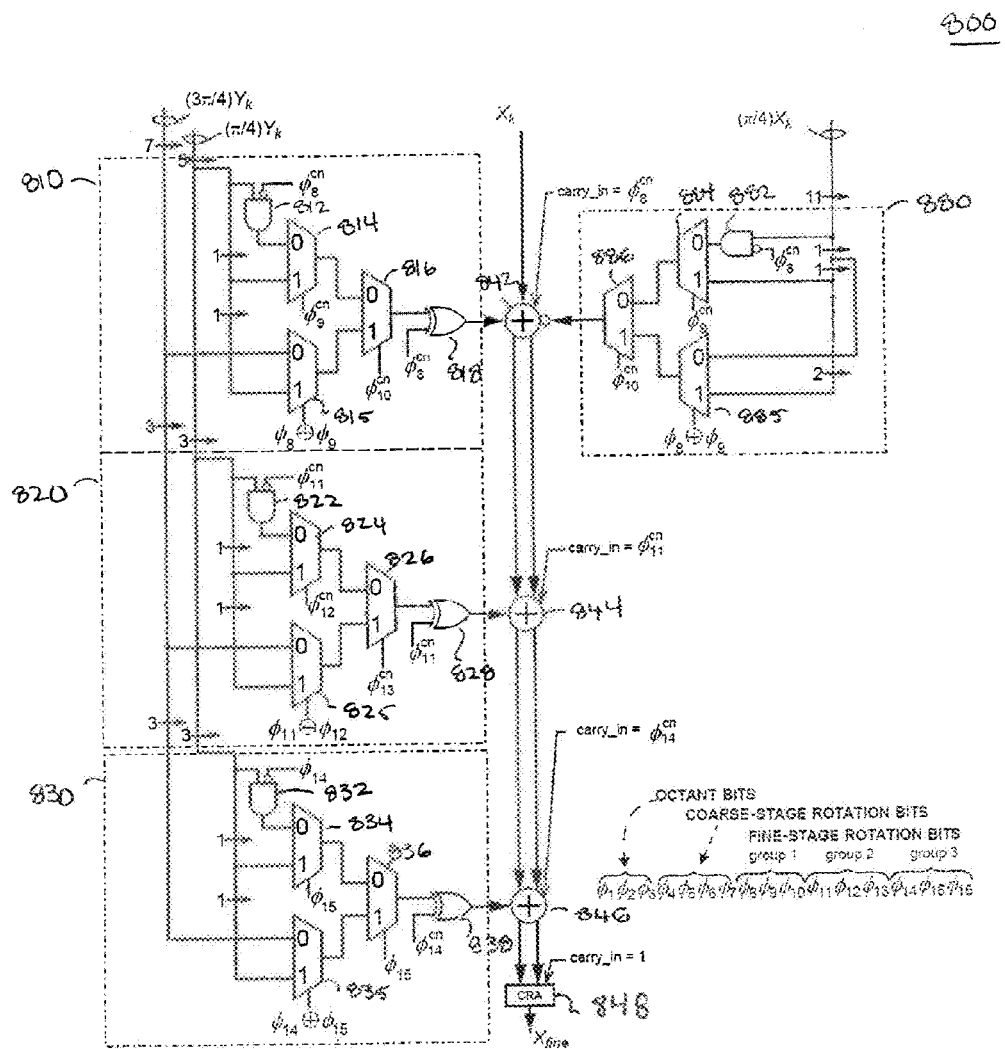
FIGS. 8A and 8B depict an exemplary fine rotation stage incorporating the use of ones' complement conditional negation into the conventional processing of fine-stage data, according to embodiments of the present invention.
Figure 8B:
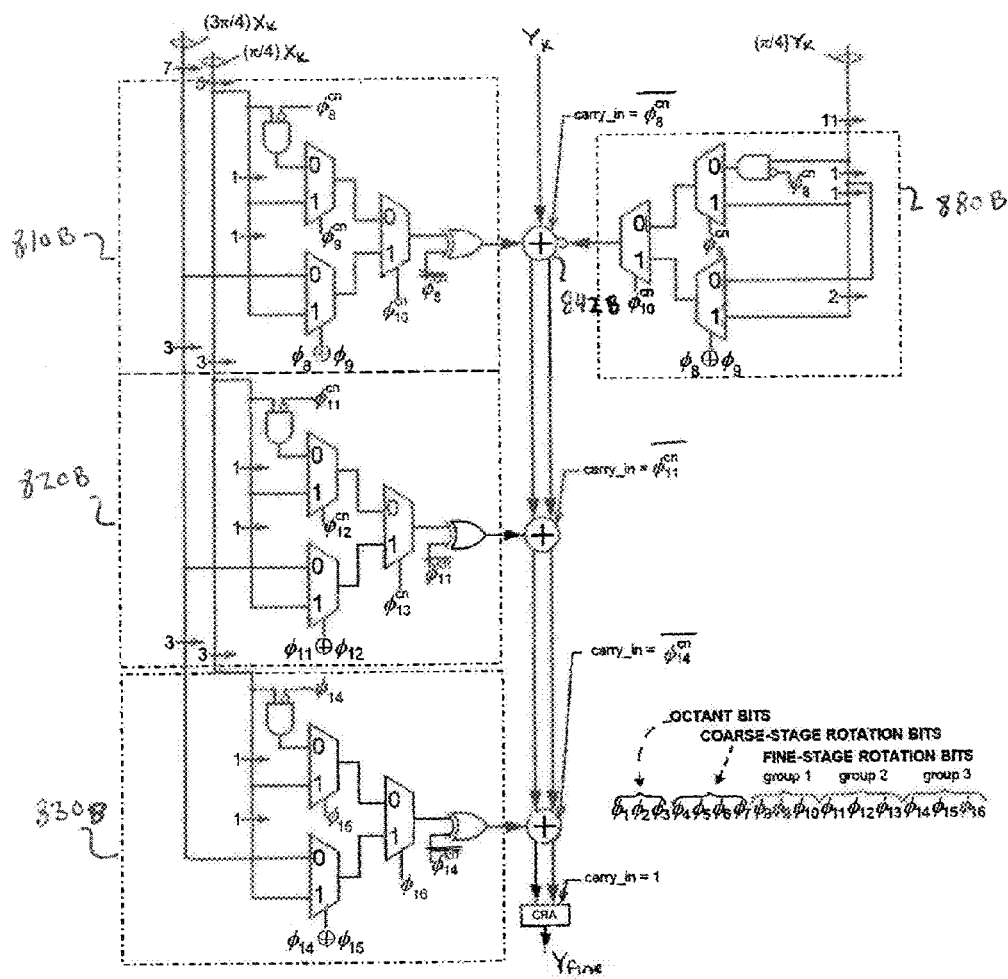

FIGS. 8A and 8B depict an exemplary fine rotation stage 800 incorporating the use of ones' complement conditional negation into the conventional processing of line-stage data, according to embodiments of the present invention. FIG. 8A is configured to generate $X_{fine}$ ($X_{datapath}$) and FIG. 8B is configured to generate $Y_{fine}$ ($Y_{datapath}$). Notice that for notational clarity all variables, $\hat{\phi}_k$ have been written as $\phi_k$. Exemplary fine rotation stage 800 includes three subrotation modules 810, 820, and 830.

Subrotation module 810 includes an AND gate 812, three 2-to-1 multiplexers 814, 815, and 816, and an exclusive-OR gate 818. Subrotation module 810 receives the group 1, $\phi_8\phi_9\phi_{10}$, of the fine-stage rotation bits. AND gate 812 receives as a first input, $(\pi/4)Y_k$, shifted by 5 and as a second input, $\phi_8^{cn}$ (referred to herein as the 'cn' version or as having been conditionally negated) which is then negated at the input. The conditional negation operation is defined using the equation:

$$\phi_k^{cn} = \phi_k \oplus \hat{\phi}_3, \text{ for } k=8,\ldots,14$$

The output of AND gate 812 is provided at the 0 input to multiplexer 814. Multiplexer 814 receives $(\pi/4)Y_k$ shifted by 6 at its 1 input. Multiplexer 814 is controlled by $\phi_9^{cn}$. Multiplexer 815 receives $(3\pi/4)Y_k$ shifted by 7 at its 0 input and $(\pi/4)Y_k$ shifted by 7 at its 1 input. Multiplexer 815 is controlled by the exclusive-OR of bits $\phi_8$ and $\phi_9$ of group 1 of the fine-stage rotation bits. In an alternative embodiment, multiplexer 815 could be controlled by the 'cn' versions of the control signals (i.e., $\phi_8^{cn} \oplus \phi_9^{cn}$) since the XOR output would be unaffected by inverting both inputs.

The output of multiplexer 814 is provided at the 0 input of multiplexer 816 and the output of multiplexer 815 is provided at the 1 input of multiplexer 816. Multiplexer 816 is controlled by $\phi_{10}^{cn}$. The output of multiplexer 816 is provided as a first input to exclusive-OR gate 818. Exclusive-OR gate 818 receives $\phi_8^{cn}$ as its second input.

Subrotation module 820 includes an AND gate 822, three 2-to-1 multiplexers 824, 825, and 826, and an exclusive-or gate 828. Subrotation module 820 receives group 2, $\phi_{11}\phi_{12}\phi_{13}$, of the fine-stage rotation bits. AND gate 822 receives as a first input, $(\pi/4)Y_k$, shifted by 8 and as a second input, $\phi_{11}^{cn}$ which is negated at the input. The output of AND gate 822 is provided at the 0 input to multiplexer 824. Multiplexer 824 receives $(\pi/4)Y_k$ shifted by 9 at its 1 input. Multiplexer 824 is controlled by conditional negation of bit $\phi_{12}$ of Group 2, $\phi_{12}^{cn}$. Multiplexer 825 receives $(3\pi/4)Y_k$ shifted by 10 at its 0 input and $(\pi/4)Y_k$ shifted by 10 at its 1 input. Multiplexer 825 is controlled by the exclusive-OR of bits $\phi_{11}$ and $\phi_{12}$ of group 2 of the fine rotation bits and the output of multiplexer 825 is provided at the 1 input of multiplexer 826. In an alternative embodiment, multiplexer 825 could be controlled by the 'cn' versions of the control signals (i.e., $\phi_{11}^{cn} \oplus \phi_{12}^{cn}$) since the XOR output would be unaffected by inverting both inputs.

The output of multiplexer 824 is provided at the 0 input of multiplexer 826 and the output of multiplexer 825 is provided at the 1 input of multiplexer 826. Multiplexer 826 is controlled by the conditional negation of bit $\phi_3$ of Group 2, $\phi_{13}^{cn}$. The output of multiplexer 826 is provided as a first input to exclusive-OR gate 828. Exclusive-OR gate 828 receives the conditional negation of bit $\phi_{11}$ Group 2, $\phi_{11}^{cn}$ as its second input.

The third (least significant) fine-stage group (830) in FIGS. 8A and 8B is processed with control signals that are somewhat different from the control signals of the other fine-stage groups (e.g., the multiplexer controls lack the "en" feature). This is because, essentially, the least-significant group employs a two's complement negation of its control bits while the other groups employ a ones' complement negation. Table 2 shows, in its third column, that the excess four processing of a two's complement of a 3-bit pattern $\phi_a\phi_b\phi_c$ simply amounts to a negation of the conventional excess four processing (i.e., compare it to the BIAS=0 column of Table 1)—compare also the control signals for all groups of FIG. 6A/B with those of FIG. 8A/B.

TABLE 2

TWO'S COMPLEMENT IN EXCESS FOUR

| bit pattern $\phi_a\phi_b\phi_c$ | two's comp. | => excess 4 is treated as |
|---|---|---|
| 000 (0) | 1000 (8) | 100 (4) |
| 001 (1) | 111 (7) | 011 (3) |
| 010 (2) | 110 (6) | 010 (2) |
| 011 (3) | 101 (5) | 001 (1) |
| 100 (4) | 100 (4) | –000 (–0) |
| 101 (5) | 011 (3) | –001 (–1) |
| 110 (6) | 010 (2) | –010 (–2) |
| 111 (7) | 001 (1) | –011 (–3) |

Subrotation module 830 includes an AND gate 832, three 2-to-1 multiplexers 834, 835, and 836, and an exclusive-OR gate 838. Subrotation module 830 receives group 3, $\phi_{14}\phi_{15}\phi_{16}$, of the fine-stage rotation bits. AND gate 832 receives as a first input, $(\pi/4)Y_k$, shifted by 11 and as a second input, bit $\phi_{14}$ of group 3, which is negated at the input. The output of AND gate 832 is provided at the 0 input to multiplexer 834. Multiplexer 834 receives $(\pi/4)Y_k$ shifted by 12 at its 1 input. Multiplexer 834 is controlled by bit $\phi_{15}$ of group 3. Multiplexer 835 receives $(3\pi/4)Y_k$ shifted by 13 at its 0 input and $(\pi/4)Y_k$ shifted by 13 at its 1 input. Multiplexer 835 is controlled by the exclusive-OR of bits $\phi_{14}$ and $\phi_{15}$ of group 3. The output of multiplexer 834 is provided at the 0 input of multiplexer 836 and the output of multiplexer 835 is provided at the 1 input of multiplexer 836. Multiplexer 836 is controlled by bit $\phi_{16}$ of group 3. The output of multiplexer 836 is provided as a first input to exclusive-OR gate 838. Exclusive-OR gate 838 receives the conditional negation of bit $\phi_{14}$ of Group 3, $\phi_{14}^{cn}$ as its second input.

As illustrated in FIG. 8, the implementation of FIG. 8A/B requires just seven additional single-bit XOR gates to get the gate-control signals. These signals can be shared by both X and Y data paths.

Like FIG. 6, FIG. 8 depicts the use of the additional coarse-stage outputs $(\pi/4)X$ and $(\pi/4)Y$. While it will be understood by one of ordinary skill in the art that there would be alternate computation-based techniques to generate the needed $(\pi/4)X$ and $(\pi/4)Y$ values, (e.g., given the $(\pi/4)X$ value, $(\pi/4)X$ can be obtained with one addition and a hard-wired shift, as $(\pi/4)X=(\pi/4)X+2(\pi/4)X)$. By using additional $(\pi/4)X$ and $(\pi/4)Y$ ROM values the system of FIG. 8 is computation free, except for the additions that appear in the vertical path down the center of FIG. 8.

Magnitude scaling module 880 includes an AND gate 882 and three 2-to-1 multiplexers 884, 885, and 886. The AND gate receives as a first input, $(\pi/4)X_k$, shifted by 11 and as a second input, $\phi_8^{cn}$, which is negated at the input. The output of AND gate 882 is provided at the 0 input of multiplexer 884. Multiplexer 884 receives $(\pi/4)X_k$ shifted by 13 at its 1 input. Multiplexer 884 is controlled by $\phi_9^{cn}$. Multiplexer 885 receives $(\pi/4)X_k$ shifted by 12 at its 0 input and $(\pi/4)X_k$ shifted by 15 at its 1 input. Multiplexer 885 is controlled by the exclusive-OR of bits $\phi_8$ and $\phi_9^{cn}$ of group 1. In an alternative embodiment, multiplexer 885 could be controlled by the 'cn' versions of the control signals (i.e., $\phi_8^{cn} \oplus \phi_9^{cn}$) since the XOR output would be unaffected by inverting both of its inputs. The output of multiplexer 884 is provided at the 0 input of multiplexer 886 and the output of multiplexer 885 is provided at the 1 input of multiplexer 886. Multiplexer 886 is controlled by $\phi_{10}^{cn}$.

Adder 842 is configured to rotate input coordinate, $X_k$, by the value generated by first subrotation module 810. Adder 842 receives as inputs, $X_k$, the output of exclusive-OR gate 818 of the first subrotation module 810, and the negation of the output of multiplexer 886 of the fine stage magnitude scaling module 880. In an embodiment, adder 842 is a carry-save adder (CSA). Adder 642 may further receive $\phi_8^{cn}$ as the carry_in value.

Adder 844 receives the output from adder 842 and the subrotation value generated by the second subrotation module 820. Thus, adder 844 rotates $X_k$ by the additional subrotation value generated by subrotation module 820. In an embodiment, adder 844 is also a carry-save adder (CSA). Adder 844 may further receive $\phi_{11}^{cn}$ as the carry_in value. Similarly, adder 846 receives the output from 844 and the subrotation value generated by the third subrotation module 830. Thus, adder 846 rotates $X_k$ by the additional subrotation value generated by subrotation module 830. In an embodiment, adder 846 is also a carry-save adder (CSA). Adder 846 may further receive $\phi_{14}^{cn}$ as the carry_in value.

A final adder 848 receives the output from adder 846. In an embodiment, adder 848 is a carry ripple adder. Adder 848 receives a 1 value as a carry_in input. The carry_in=1 bit completes the ones'-complement negation of the correction value from the fine stage magnitude scaling module, making it into a two's-complement correction. The output of adder 848 is a coordinate, $X_{fine}$, of the rotated pair of output values.

The circuit 800B of FIG. 8B is configured to generate $Y_{fine}$ ($Y_{datapath}$). The general operation of the $Y_{datapath}$ is the same as the $X_{datapath}$ of FIG. 8A with the following exceptions. The subrotation modules of FIG. 8B receive as input $(\pi^3/4)X_k$ and $(\pi/4)X_k$. Adder 842B receives as inputs, the input coordinate $Y_k$, the output of subrotation module 810B, and the inverted output of fine stage magnitude scaling module 880B. The output of circuit 800B is a coordinate, $Y_{fine}$, of the rotated pair of output values. Y-datapath computations require a negation of the $\phi_8^{cn}$, $\phi_{11}^{cn}$, and $\phi_{14}^{cn}$ XOR inputs as well as negations of these values when used as carry_in values.

When two's complement negation is being employed to map odd octants into Octant 0, conventional DDS architectures require special processing for the four normalized angles representing $\pi/4$, $3\pi/4$, $5\pi/4$, and $7\pi/4$. Basically, this is because there is no ROM data available to represent the sine and/or cosine values for these special angles. (All addresses $\phi_4\phi_5\phi_6\phi_7$ for the ROM tables of FIGS. 2 and 3, for example, actually represent the 13-bit normalized angle values $0.\phi_4\phi_5\phi_6\phi_7 0 \ldots 0$, whereas the normalized representation of the angle $\pi/4$ is the 14-bit value $1.0 \ldots 0$.) The usual solution to this problem as disclosed in the Ph.D. thesis by A. Torosyan, "*Direct Digital Frequency Synthesizers: Complete Analysis and Design Guidelines*" (University of California, Los Angeles, 2003) (hereinafter Torosyan II) is to employ one additional table value that represents $\sin \pi/4 (=\cos \pi/4)$. However, when using the procedure of FIGS. 8A/B for getting two's complement angles via ones' complement angles, the processing of the 14-bit value $1.0 \ldots 0$ happens naturally, without special handling. The high-order "1" bit indicates that an odd-octant angle is being processed. Thus each three-bit group "000" is processed as if it were "111." (Notice that the angle $\pi/4$ is considered to be the smallest angle of Octant 1.) Hence, the two high-order groups provide large rotations (driven by sevens) and the least-significant group is processed as the value 8. The processing is essentially that shown in FIG. 5-12(a) of Torosyan II but the long carry-ripple is avoided by the excess four processing of the least significant 3-bit group having its BIAS=1. In effect, by use of the excess fours method, it suffices to deal explicitly with angles $\hat{\phi}$ within the half-open interval $0 \leq \hat{\phi} < \frac{1}{8}$ rather than those within the closed interval $0 \leq \hat{\phi} \frac{1}{8}$.

2.4 Phase Accumulator Rounding

The following embodiments incorporate phase accumulator rounding into DDS architectures. The excess-four processor's BIAS bit allows processing of one additional LSB (a "½ LSB") of the phase accumulator. Notice that, because the excess four processor can handle the BIAS bit "in place," i.e., within the least-significant three-bit group's processing unit (without needing to send out a C_out bit that could ripple toward the MSB), phase accumulator rounding can be achieved without having to deal with a W-bit carry-ripple delay. This phase accumulator rounding can be applied to either a normalized or an un-normalized phase accumulator value. BIAS input is used to do a rounding of the last 3-bit group's fourth (extra) LSB regardless of whether an odd octant or even octant is being processed.

Prior DDS systems did not utilize phase accumulator rounding possibly because of the additional carry-ripple computation that it would entail. The embodiments of the processing system described herein, however, avoid the W-bit carry ripple. Alternatively, phase accumulator rounding may not have been used because it can be shown (perhaps surprisingly) to cause no improvement in the DDS spurious free dynamic range. However, the systems described herein can accomplish phase accumulator rounding with essentially zero computational cost. While not improving the DDS spurs, the phase accumulator rounding does provide a small improvement in the signal-to-noise ratio of the DDS output. Furthermore, the circuit that implements phase accumulator rounding may also be reused to facilitate other desirable design goals.

Figure 9:
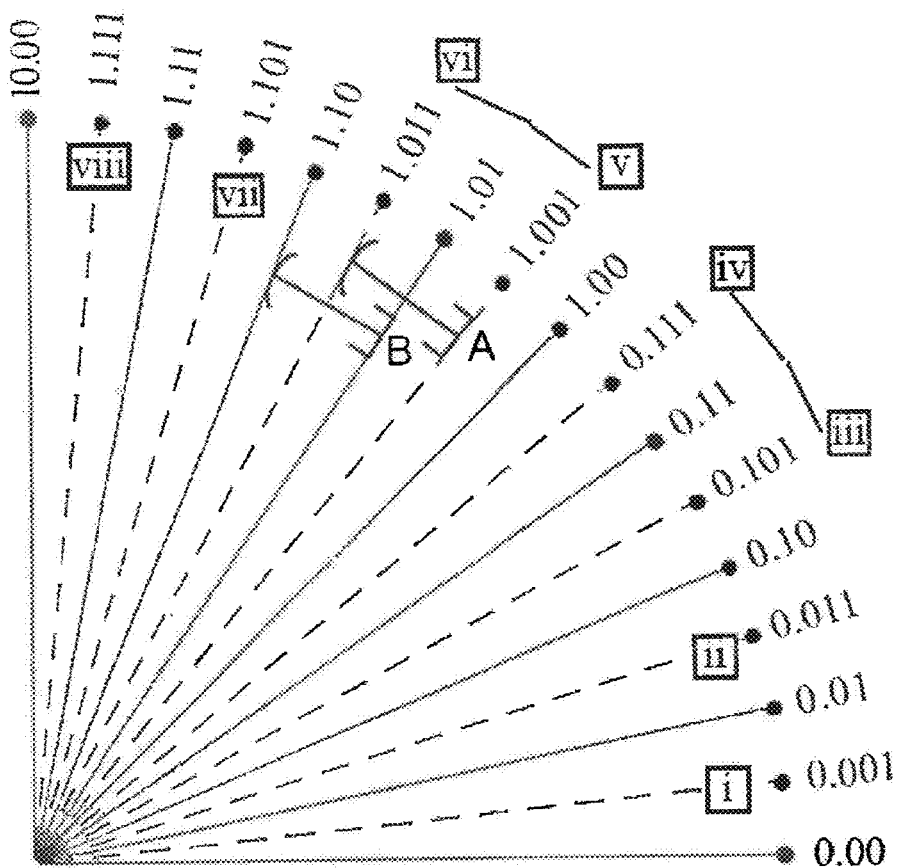
FIG. 9 illustrates exemplary phase accumulator rounding in Octant 0 and Octant 1.

FIG. 9 illustrates exemplary phase accumulator rounding in Octant 0 and Octant 1. In embodiments, a phase-accumulator-rounding DDS considers a resolution of the W-bit normalized phase angle that is twice as fine as that for the corresponding phase-truncation case. Thus, for the FIG. 9 example, truncation is performed such that one more bit is kept than the system actually intends to fully use. This bit's value will then be rounded into a one-bit-shorter phase word, thereby creating a slightly more accurate phase-word value.

Thus, the phase value labeled 1.001 (point ⓥ in FIG. 9), as well as all phase values greater than 1.001 but strictly less than 1.011, i.e., all values within the half open interval [1.001, 1.011), shown as interval A in FIG. 9, will be rounded to the 1.01 value located at the center of the interval. This phase angle rounding pertains to how all M-bit phase accumulator words are represented by shorter W-bit words. In contrast to the more conventional phase-accumulator truncation, which would represent all M-bit phase values by a set of W-bit values lying at the bottom of their corresponding intervals—e.g., 1.01 would represent all angles lying within half-open interval B in FIG. 9. Clearly, the use of phase rounding rather than phase truncation will produce phase errors whose magnitudes average half the average for phase truncation. Moreover, these errors will be evenly distributed as positive and negative errors, whereas the phase truncation DDS will always have positive errors (for angles within Octant-0).

Figure 10A:
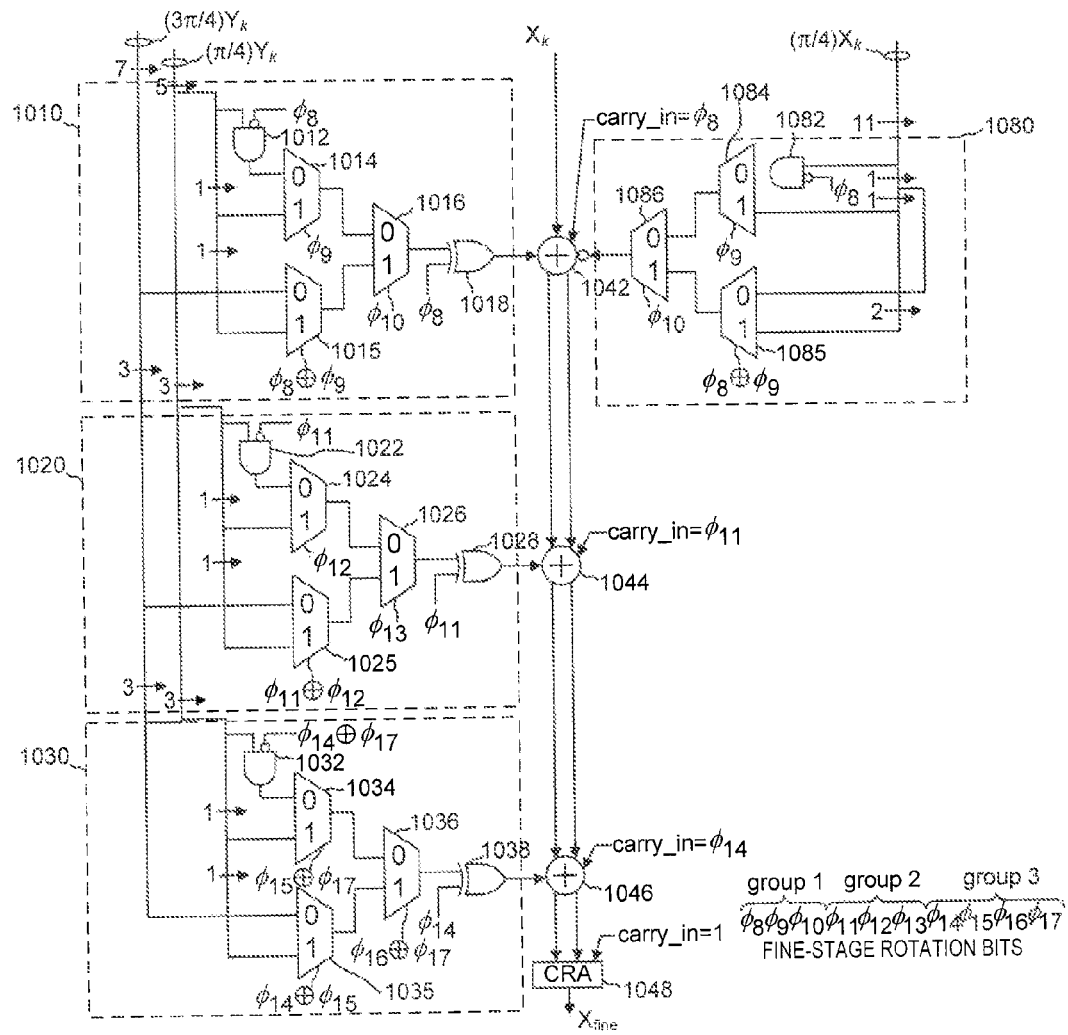
FIGS. 10A and 10B depict an exemplary fine rotation stage using phase accumulator rounding, according to embodiments of the present invention.
Figure 10B:
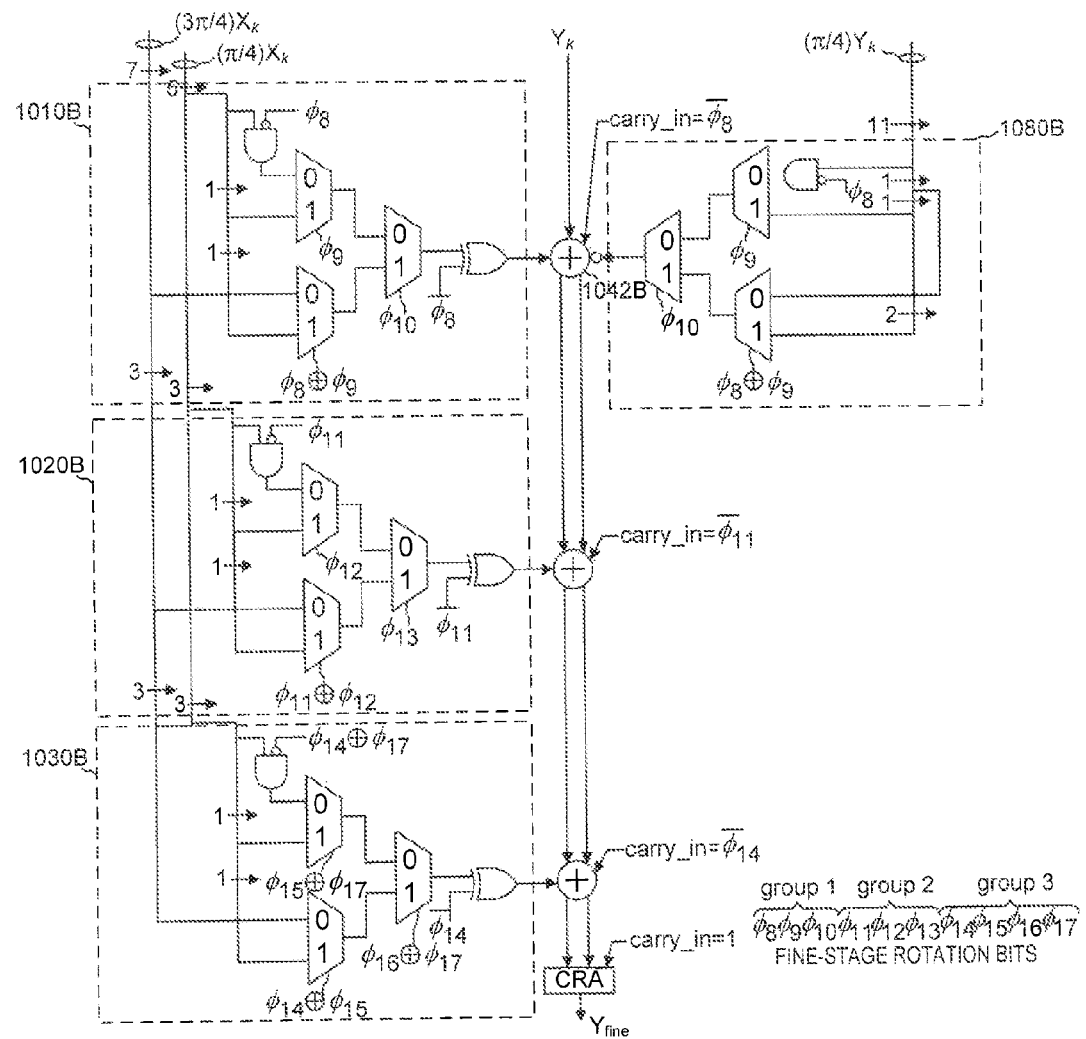

FIGS. 10A and 10B depict an exemplary fine rotation stage 1000 in a system using phase accumulator rounding, according to embodiments of the present invention. FIG. 10A is configured to generate $X_{fine}$ ($X_{datapath}$) and FIG. 10B is configured to generate $Y_{fine}$ ($Y_{datapath}$). Notice that for notational clarity all variables, $\phi_k$ have been written as $\phi_k$. Exemplary fine rotation stage 1000 includes three subrotation modules 1010, 1020, and 1030.

Subrotation module 1010 includes an AND gate 1012, three 2-to-1 multiplexers 1014, 1015, and 1016, and an exclusive-OR gate 1018. Subrotation module 1010 receives the group 1, $\phi_8 \phi_9 \phi_{10}$, of the fine-stage rotation bits. AND gate 1012 receives as a first input, $(\pi/4)Y_k$, shifted by 5 and as a second input, bit $\phi_8$ of group 1, which is negated at the input. The output of AND gate 1012 is provided at the 0 input to multiplexer 1014. Multiplexer 1014 receives $(\pi/4)Y_k$ shifted by 6 at its 1 input. Multiplexer 1014 is controlled by bit $\phi_9$ of the three-bit input group. Multiplexer 1015 receives $(3\pi/4)Y_k$ shifted by 7 at its 0 input and $(\pi/4)Y_k$ shifted by 7 at its 1 input. Multiplexer 1015 is controlled by the exclusive-OR of bits $\phi_8$ and $\phi_9$ of group 1 of the fine-stage rotation bits. The output of multiplexer 1014 is provided at the 0 input of multiplexer 1016 and the output of multiplexer 1015 is provided at the 1 input of multiplexer 1016. Multiplexer 1016 is controlled by bit $\phi_{10}$ of group 1. The output of multiplexer 1016 is provided as a first input to exclusive-OR gate 1018. Exclusive-OR gate 1018 receives bit $\phi_8$ of group 1 as its second input.

Subrotation module 1020 includes an AND gate 1022, three 2-to-1 multiplexers 1024, 1025, and 1026, and an exclusive-OR gate 1028. Subrotation module 1020 receives group 2, $\phi_{11}\phi_{12}\phi_{13}$, of the fine-stage rotation bits. AND gate 1022 receives as a first input, $(\pi/4)Y_k$, shifted by 8 and as a second input, bit $\phi_{11}$ of the three-bit input group, which is negated at the input. The output of AND gate 1022 is provided at the 0 input to multiplexer 1024. Multiplexer 1024 receives $(\pi/4)Y_k$ shifted by 9 at its 1 input. Multiplexer 1024 is controlled by bit $\phi_{12}$ of group 2. Multiplexer 1025 receives $(3\pi/4)Y_k$ shifted by 10 at its 0 input and $(\pi/4)Y_k$ shifted by 10 at its 1 input. Multiplexer 1025 is controlled by the exclusive-OR of bits $\phi_{11}$ and $\phi_{12}$ of group 2 of the fine rotation bits. The output of multiplexer 1024 is provided at the 0 input of multiplexer 1026 and the output of multiplexer 1025 is provided at the 1 input of multiplexer 1026. Multiplexer 1026 is controlled by bit $\phi_{13}$ of group 2. The output of multiplexer 1026 is provided as a first input to exclusive-OR gate 1028. Exclusive-OR gate 1028 receives bit $\phi_{11}$ of group 2 as its second input.

Subrotation module 1030 includes an AND gate 1032, three 2-to-1 multiplexers 1034, 1035, and 1036, and an exclusive-OR gate 1038. Subrotation module 1030 receives group 3, $\phi_{14}\phi_{15}\phi_{16}\phi_{17}$, of the fine-stage rotation bits. AND gate 1032 receives as a first input, $(\pi/4)Y_k$, shifted by 11 and as a second input, the exclusive-OR of bits $\phi_{14}$ and $\phi_{17}$ of group 3 of the fine rotation bits, which is negated at the input. The output of AND gate 1032 is provided at the 0 input to multiplexer 1034. Multiplexer 1034 receives $(\pi/4)Y_k$ shifted by 12 at its 1 input. Multiplexer 1034 is controlled by the exclusive-OR of bits $\phi_{15}$ and $\phi_{17}$ of group 3 of the fine rotation bits. Multiplexer 1035 receives $(3\pi/4)Y_k$ shifted by 13 at its 0 input and $(\pi/4)Y_k$ shifted by 13 at its 1 input. Multiplexer 1035 is controlled by the exclusive-OR of bits $\phi_{14}$ and $\phi_{15}$ of group 3. The output of multiplexer 1034 is provided at the 0 input of multiplexer 1036 and the output of multiplexer 1035 is provided at the 1 input of multiplexer 1036. Multiplexer 1036 is controlled by the exclusive-OR of bits $\phi_{16}$ and $\phi_{17}$ of group 3. The output of multiplexer 1036 is provided as a first input to exclusive-OR gate 1038. Exclusive-OR gate 1038 receives bit $\phi_{14}$ of the three-bit input group as its second input.

Like FIGS. 6 and 8, FIG. 10A/B depicts the use of the additional coarse-stage outputs $(3\pi/4)X$ and $(3\pi/4)Y$. While it will be understood by one of ordinary skill in the art that there would be alternate computation-based techniques to generate the needed $(3\pi/4)X$ and $(3\pi/4)Y$ values, (e.g., given the $(\pi/4)X$ value, $(3\pi/4)X$ can be obtained with one addition and a hard-wired shift, as $(\pi/4)X=(\pi/4)X+2(\pi/4)X)$.

Fine stage magnitude scaling module 1080 is configured to provide magnitude scaling for the fine rotation stage 1000. The fine stage magnitude scaling module 1080 of FIG. 10 also includes a simple three multiplexer circuit that slightly shortens the $X_k$ {or $Y_k$} input data, via subtraction, which approximately compensates for the slight lengthening of the output of the first three-bit rotation stage, as explained in the previous discussion regarding the introduction of equation (1). In principle, such magnitude scaling should (and would, when needed) also be employed for the other two rotation stages but the amount of scaling needed is rather small and can often be neglected without a significant loss of accuracy. The computed correction value of the fine stage magnitude scaling module 1080 is ones'-complement negated as it is fed to the main (vertical) data-path in FIG. 10.

Magnitude scaling module 1080 includes an AND gate 1082 and three 2-to-1 multiplexers 1084, 1085, and 1086. AND gate receives as a first input, $(\pi/4)X_k$, shifted by 11 and as a second input, bit $\phi_8$ of group 1, which is negated at the input. The output of AND gate 1082 is provided at the 0 input of multiplexer 1084. Multiplexer 1084 receives $(\pi/4)X_k$ shifted by 13 at its 1 input. Multiplexer 1084 is controlled by bit $\phi_9$ of the three-bit input group. Multiplexer 1085 receives $(\pi/4)X_k$ shifted by 12 at its 0 input and $(\pi/4)X_k$ shifted by 15 at its 1 input. Multiplexer 1085 is controlled by the exclusive-OR of bits $\phi_8$ and $\phi_9$ of group 1. The output of multiplexer 1084 is provided at the 0 input of multiplexer 1086 and the output of multiplexer 1085 is provided at the 1 input of multiplexer 1086. Multiplexer 1086 is controlled by bit $\phi_{10}$ of group 1.

Adder 1042 is configured to rotate input coordinate, $X_k$, by the value generated by first subrotation module 1010. Adder 1042 receives as inputs, $X_k$, the output of exclusive-OR gate 1018 of the first subrotation module 1010, and the negation of the output of multiplexer 1086 of the fine stage magnitude scaling module 1080. In an embodiment, adder 1042 is a carry-save adder (CSA). Adder 1042 may further receive bit $\phi_8$ of group 1 of the fine-stage rotation bits as the carry_in value, which causes the XOR 1018 output, when negating a signal, to provide a fully two's complemented value to adder 1042.

Adder 1044 receives the output from adder 1042 and the subrotation value generated by the second subrotation module 1020. Thus, adder 1044 rotates $X_k$ by the additional subrotation value generated by subrotation module 1020. In an embodiment, adder 1044 is also a carry-save adder (CSA). Adder 1044 may further receive bit $\phi_{11}$ of group 2 of the fine-stage rotation bits as the carry_in value. Similarly, adder 1046 receives the output from 1044 and the subrotation value generated by the third subrotation module 1030. Thus, adder 1046 rotates $X_k$ by the additional subrotation value generated by subrotation module 1030. In an embodiment, adder 1046 is also a carry-save adder (CSA). Adder 1046 may further receive bit $\phi_{14}$ of group 3 of the fine-stage rotation bits as the carry_in value.

A final adder 1048 receives the output from adder 1046. In an embodiment, adder 1048 is a carry ripple adder. Adder 1048 receives a 1 value as a carry_in input. The carry_in=1 bit completes the ones'-complement negation of the correction value from the fine stage magnitude scaling module, making it into a two's-complement correction. The output of adder 1048 is a coordinate, $X_{fine}$, of the rotated pair of output values.

The circuit 1000B of FIG. 10B is configured to generate $Y_{fine}(Y_{datapath})$. The general operation of the Y datapath is the same as the $X_{datapath}$ of FIG. 10A with the following exceptions. The subrotation modules of FIG. 10B receive as input $(\pi^3/4)X_k$ and $(\pi/4)X_k$. Adder 1042B receives as inputs, the input coordinate $Y_k$, the output of subrotation module 1010B, and the inverted output of fine stage magnitude scaling module 1080B. The output of circuit 1000B is a coordinate, $Y_{fine}$, of the rotated pair of output values. Y-datapath computations require a negation of the $\phi_8$, $\phi_{11}$, and $\phi_{14}$ XOR inputs as well as negations of these values when used as carry_in values.

As illustrated in FIGS. 10A/B, even less hardware is required for this phase-accumulator rounding operation than that described above in reference to FIGS. 8A/B for getting conditional two's complement negation via ones' complement negation. As compared to the system of FIGS. 6A/B, the fine-stage processing, shown in FIGS. 10A/B, requires just three additional single-bit XOR gates to get MUX control signals that can be shared by both (X and Y) data paths.

2.5 Ones' Complement Negation and Phase Accumulator Rounding

Figure 11:
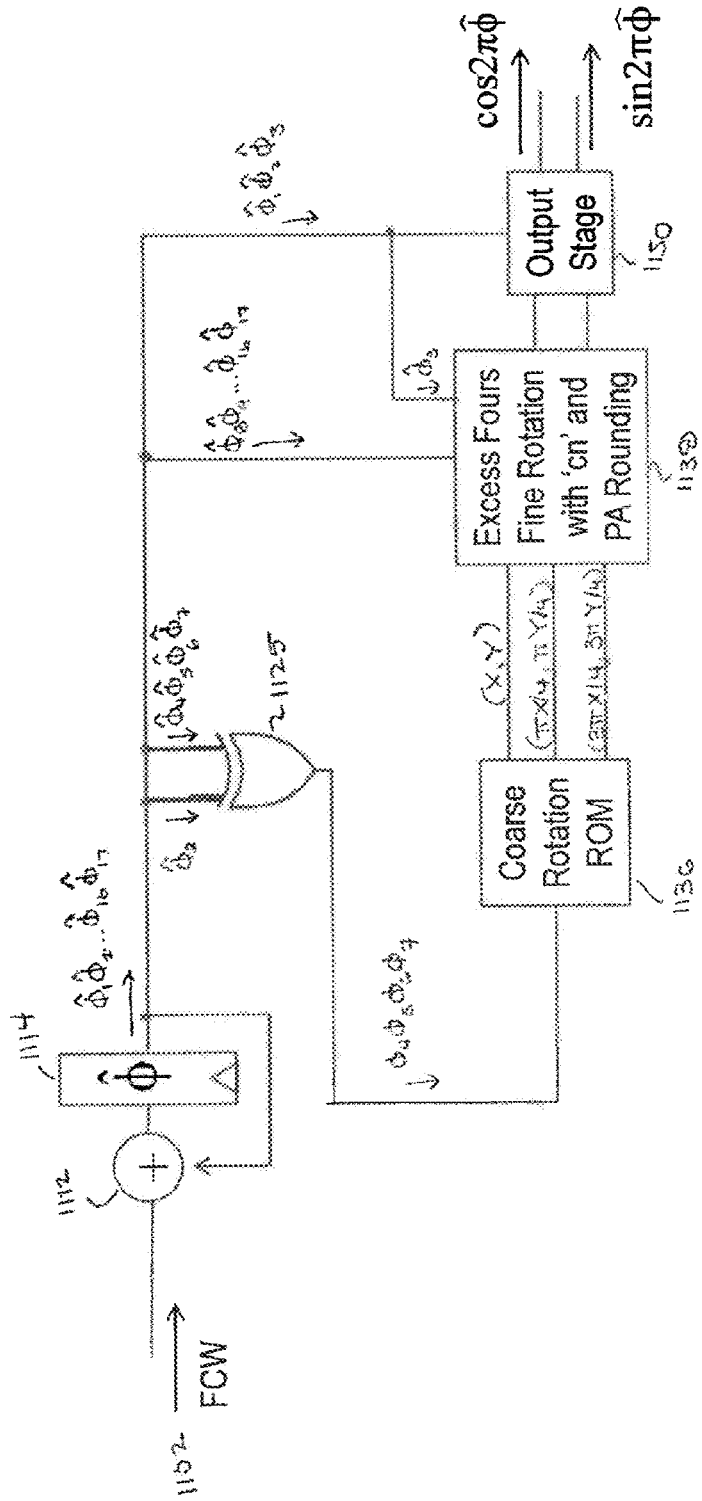
FIG. 11 depicts a detailed block diagram of a direct digital synthesizer 1100 with ones' complement negation and phase accumulator rounding, according to embodiments of the present invention.

FIG. 11 depicts a detailed block diagram of a direct digital synthesizer 1100 with ones' complement negation and phase accumulator rounding, according to embodiments of the present invention. Note that the processing of FIG. 11 can be used in a system having the $\pi/4$ multiplier (e.g., FIG. 3) or a system where the $\pi/4$ multiplier has been eliminated. The embodiment of FIG. 11 illustrates a system with the $\pi/4$ multiplier eliminated. In this embodiment, when processing normalized phase accumulator values (that have not yet had any conditional negation applied to them), a (W+1)-bit angle is retained, with the intention of rounding the extra ½-LSB into the higher-order bits as the phase-to-amplitude mapping is performed on, effectively, a W-bit phase value. The system strips off the top three bits $\hat{\phi}_1\hat{\phi}_2\hat{\phi}_3$, on the remainder, it performs a conditional (bit-3 driven) ones' complement of the four-MSB coarse-stage address, and then performs the coarse-stage rotation.

As shown in FIG. 11, DDS 1100 includes an adder 1112 and a phase accumulator 1114. In embodiments, adder 1112 is an unsigned overflowing adder that is repeatedly incremented by M-bit frequency control word (FCW) input 1102. The output of the adder, $\hat{\phi}$, is stored in the phase accumulator 1114. The phase accumulator 1114 in embodiments is an M-bit register (e.g., 32-bit register). The phase accumulator outputs $\phi_1\phi_2 \ldots \phi_{16}, \phi_{17}$.

Figure 12A:
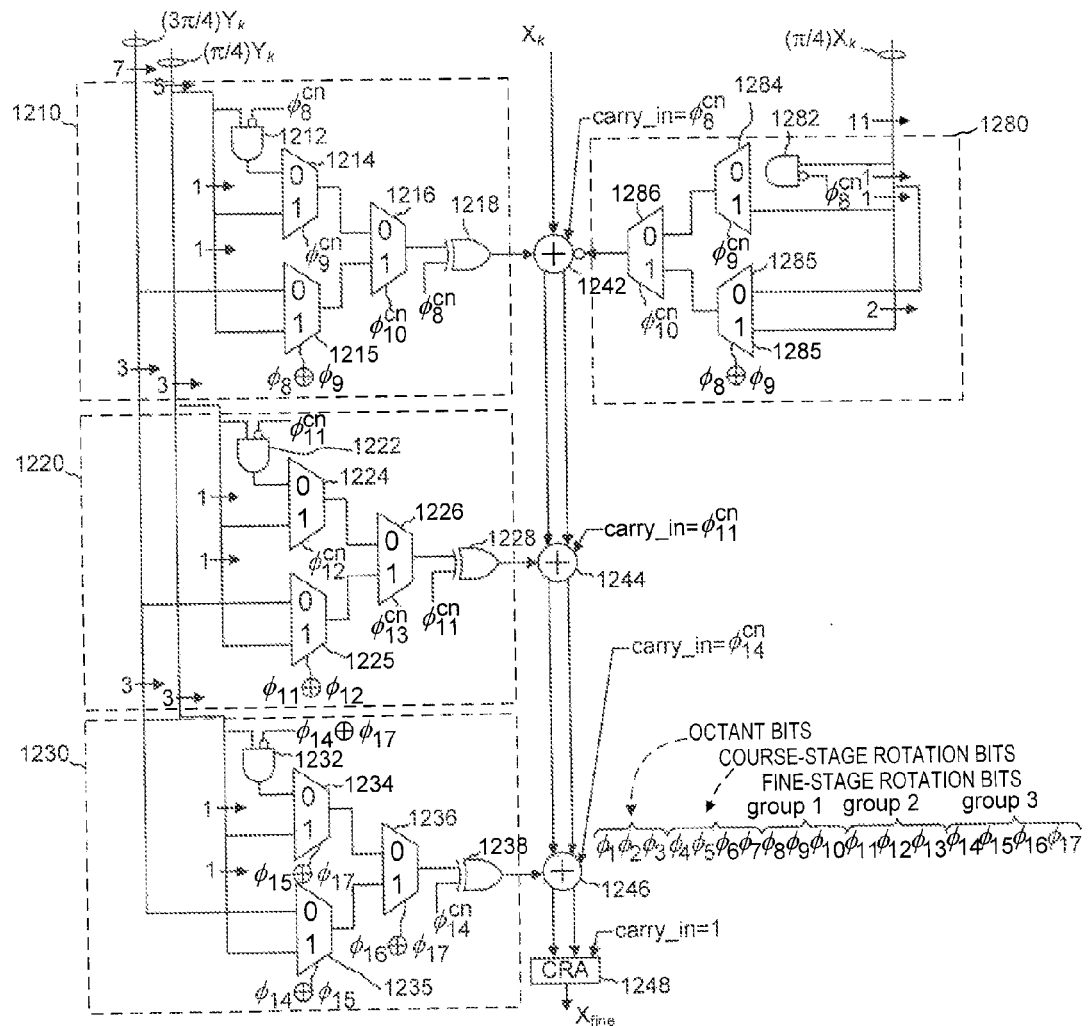
FIGS. 12A and 12B depict an exemplary fine rotation stage in a system incorporating the use of ones' complement conditional negation and phase accumulator rounding, according to embodiments of the present invention.

DDS further includes an exclusive-OR gate 1125. Exclusive-OR gate 1125 receives as a first input bit, $\hat{\phi}_3$ and as a second input, bits $\hat{\phi}_4\hat{\phi}_5 \hat{\phi}_6\hat{\phi}_7$. The output of exclusive-OR gate 1125, $\phi_4\phi_5\phi_6\phi_7$ is provided as input to coarse rotation stage 1136. Coarse rotation stage 1136 outputs coordinates $(X, Y)$, values $(\pi X/4, \pi Y/4)$ and values $(3\pi X/4, 3\pi Y/4)$ to fine rotation stage 1138. Fine rotation stage 1138 further receives as input, bits $\hat{\phi}_8\hat{\phi}_9 \ldots \hat{\phi}_{16}\hat{\phi}_{17}$ and bit $\hat{\phi}_3$. As discussed in further detail below, phase-accumulator fine-stage processing is performed in three-bit groups, where the conditionally inverted fine stage values are used in each three-bit group. In the least-significant three-bit group, however, a BIAS bit that is the ½-LSB is included and the odd/even octant-designating bit (bit-3) is further used to determine whether the stage output is added or subtracted into the data path. FIGS. 12A/B provide a detailed implementation of fine rotation stage 1138.

The output of fine rotation stage 1138 is provided as an input to output stage 1150. Output stage 1150 further receives as input, bits $\hat{\phi}_1\hat{\phi}_2 \hat{\phi}_3$. The output of output stage 1150 is cos $2\pi\phi$ and/or sin $2\pi\phi$.

Figure 12B:
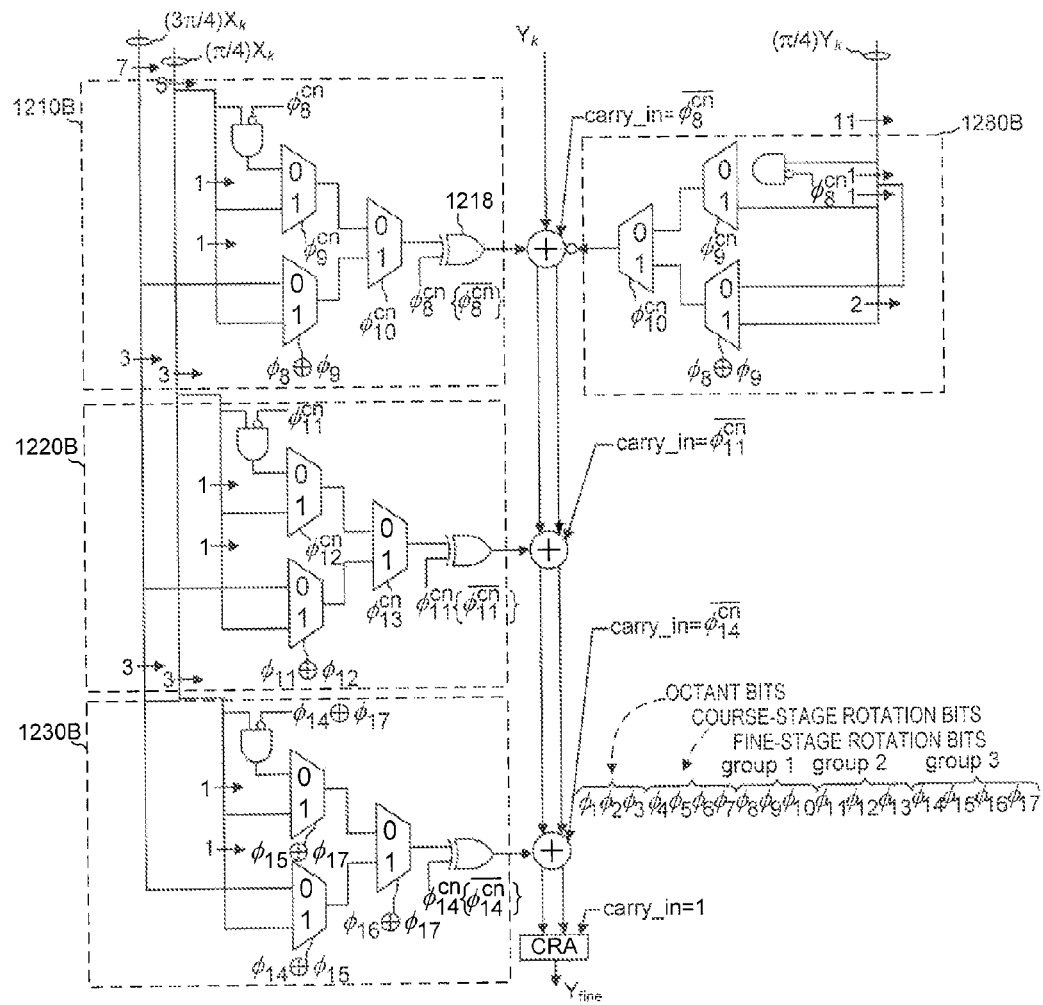

FIGS. 12A and 12B depict an exemplary fine rotation stage 1200 in a system incorporating the use of ones' complement conditional negation and phase accumulator rounding, according to embodiments of the present invention. FIG. 12A is configured to generate $X_{fine}$ ($X_{datapath}$) and FIG. 125 is configured to generate $Y_{fine}$ ($Y_{datapath}$). Notice that for notational clarity all variables, $\hat{\phi}_k$ have been written as $\phi_k$. Exemplary fine rotation stage 1200 includes three subrotation modules 1210, 1220, and 1230.

Subrotation module 1210 includes an AND gate 1212, three 2-to-1 multiplexers 1214, 1215, and 1216, and an exclusive-OR gate 1218. Subrotation module 1210 receives the group 1, $\phi_8 \phi_9 \phi_{10}$, of the fine-stage rotation bits. AND gate 1212 receives as a first input, $(\pi/4)Y_k$, shifted by 5 and as a second input, $\phi_8^{cn}$ (referred to herein as the 'cn' version) which is negated at the input. The 'cn' version is determined using the equation:

$$\phi_k^{cn} = \phi_k \oplus \hat{\phi}_3 \text{ for } k=8,\ldots,14$$

The output of AND gate 1212 is provided at the 0 input to multiplexer 1214. Multiplexer 1214 receives $(\pi/4)Y_k$ shifted by 6 at its 1 input. Multiplexer 1214 is controlled by $\phi_9^{cn}$. Multiplexer 1215 receives $(3\pi/4)Y_k$ shifted by 7 at its 0 input and $(\pi/4)Y_k$ shifted by 7 at its 1 input. Multiplexer 1215 is controlled by the exclusive-OR of bits $\phi_8$ and $\phi_9$ of group 1 of the fine-stage rotation bits. In an alternative embodiment, multiplexer 1215 could be controlled by the 'cn' versions of the control signals (e.g., $\phi_8^{cn} \oplus \phi_9^{cn}$) since the XOR output would be unaffected by inverting both inputs.

The output of multiplexer 1214 is provided at the 0 input of multiplexer 1216 and the output of multiplexer 1215 is provided at the 1 input of multiplexer 1216. Multiplexer 1216 is controlled by $\phi_{10}^{cn}$. The output of multiplexer 1216 is provided as a first input to exclusive-OR gate 1218. Exclusive-OR gate 1218 receives $\phi_8^{cn}$ as its second input.

Subrotation module 1220 includes an AND gate 1222, three 2-to-1 multiplexers 1224, 1225, and 1226, and an exclusive-OR gate 1228. Subrotation module 1220 receives group 2, $\phi_{11} \phi_{12} \phi_{13}$, of the fine-stage rotation bits. AND gate 1222 receives as a first input, $(\pi/4)Y_k$, shifted by 8 and as a second input, $\phi_{11}^{cn}$ which is negated at the input. The output of AND gate 1222 is provided at the 0 input to multiplexer 1224. Multiplexer 1224 receives $(\pi/4)Y_k$ shifted by 9 at its 1 input. Multiplexer 1224 is controlled by conditional negation of bit $\phi_{12}$ of Group 2, $\phi_{12}^{cn}$. Multiplexer 1225 receives $(3\pi/4)Y_k$ shifted by 10 at its 0 input and $(\pi/4)Y_k$ shifted by 10 at its 1 input. Multiplexer 1225 is controlled by the exclusive-OR of bits $\phi_{11}$ and $\phi_{12}$ of group 2 of the fine rotation bits and the output of multiplexer 1225 is provided at the 1 input of multiplexer 1226. In an alternative embodiment, multiplexer 1225 could be controlled by the 'cn' versions of the control signals (e.g., $\phi_{11}^{cn} \oplus \phi_{12}^{cn}$) since the XOR output would be unaffected by inverting both inputs.

Multiplexer 1226 is controlled by the conditional negation of bit $\phi_{13}$ of Group 2, $\phi_{13}^{cn}$. The output of multiplexer 1226 is provided as a first input to exclusive-OR gate 1228. Exclusive-OR gate 1228 receives the conditional negation of bit $\phi_{11}$ of Group 2, $\phi_{11}^{cn}$ as its second input.

As described above, in the least-significant three-bit group, a BIAS bit that is the ½-LSB is included and the odd/even octant-designating bit (bit 3) is farther used to determine whether the stage output is added or subtracted into the data path. Since the three-bit sub-rotation should perform the conditional rounding before the conditional negation (cn), and since the two's complement negation just requires a negation of the sub-rotation output (see Tables 1 and 2, and see the presence of "cn" in the third stage of FIG. 8) the control signals of the FIG. 8 and FIG. 10 systems can easily be combined to get the result shown in FIG. 12. In more detail, the four possibilities for the two bits "bit-3 and BIAS" regarding the third three-bit group in the fine-stage processing are considered:

If "00," the (W+1)-bit truncated phase word comes from an even octant, and the ½-LSB bit has value zero. Thus, the value at hand can be used directly. (BIAS=0 and No output negation);

If "01," the truncated phase word comes from an even octant, and the ½-LSB has value one. Then, the truncated phase word is rounded using the 1-valued ½-LSB. (BIAS=1 and No output negation);

If "10," the truncated phase word comes from an odd octant, and the original ½-LSB bit has value zero. Thus the third sub-rotation stage just employs a two's complement. (BIAS=0 and Negate output);

If "11," the truncated phase word comes from an odd octant, and the original ½-LSB bit has value one. In this instance rounding is indicated before phase-accumulator complementing. (BIAS=1 and Negate output);

In all four situations, the phase-accumulator rounding operation requires little computation beyond that required by a conventional system using phase-accumulator truncation—essentially, just a few more single-bit XOR gates. Moreover, the absence of a carry-ripple yields a system requiring less computational delay than a conventional two's-complement conditional negation implementation requires.

Subrotation module 1230 includes an AND gate 1232, three 2-to-1 multiplexers 1234, 1235, and 1236, and an exclusive-or gate 1238. Subrotation module 1230 receives group 3, $\phi_1 \phi_{14} \phi_{15} \phi_{16}$, of the fine-stage rotation bits in addition to bit $\phi_{17}$ (the ½-LSB). AND gate 1232 receives as a first input, $(\pi/4)Y_k$, shifted by 11 and as a second input, the exclusive-OR of bits $\phi_{14}$ of group 3 of the fine rotation bits and $\phi_{17}$, which is negated at the input. The output of AND gate 1232 is provided at the 0 input to multiplexer 1234. Multiplexer 1234 receives $(\pi/4)Y_k$ shifted by 12 at its 1 input. Multiplexer 1234 is controlled by the exclusive-OR of bits $\phi_{15}$ of group 3 and $\phi_{17}$ of the fine rotation bits. Multiplexer 1235 receives $(3\pi/4)Y_k$ shifted by 13 at its 0 input and $(\pi/4)Y_k$ shifted by 13 at its 1 input. Multiplexer 1235 is controlled by the exclusive-OR of bits $\phi_{14}$ and $\phi_{15}$ of group 3. The output of multiplexer 1234 is provided at the 0 input of multiplexer 1236 and the output of multiplexer 1235 is provided at the 1 input of multiplexer 1236. Multiplexer 1236 is controlled by the exclusive-OR of bits $\phi_{16}$ of group 3 and $\phi_{17}$. The output of multiplexer 1236 is provided as a first input to exclusive-OR gate 1238. Exclusive-OR gate 1238 receives the conditional negation of bit $\phi_{14}$ of Group 3, $\phi_{14}^{cn}$, as its second input.

FIG. 12 depicts the use of the additional coarse-stage outputs $(3\pi/4)X$ and $(\pi/4)Y$. While it will be understood by one of ordinary skill in the art that there would be alternate computation-based techniques to generate the needed $(3\pi/4)X$ and $(\pi/4)Y$ values, (e.g., given the $(\pi/4)X$ value, $(\pi/4)X$ can be obtained with one addition and a hard-wired shift, as $(3\pi/4)X = (\pi/4)X + 2(\pi/4)X$). By using additional $(3\pi/4)X$ and $(3\pi/4)Y$ ROM values a system of FIG. 8 is computation free, except for the additions that appear in the vertical path down the center of FIG. 12.

Magnitude scaling module 1280 includes an AND gate 1282 and three 2-to-1 multiplexers 1284, 1285, and 1286. AND gate receives as a first input, $(\pi/4)X_k$, shifted by 11 and as a second input, $\phi_8^{cn}$, which is negated at the input. The output of AND gate 1282 is provided at the 0 input of multiplexer 1284. Multiplexer 1284 receives $(\pi/4)X_k$ shifted by 13 at its 1 input. Multiplexer 1284 is controlled by $\phi_9^{cn}$. Multiplexer 1285 receives $(\pi/4)X_k$ shifted by 12 at its 0 input and $(\pi/4)X_k$ shifted by 15 at its 1 input. Multiplexer 1285 is controlled by the exclusive-OR of bits $\phi_8$ and $\phi_9$ of group 1. In an alternative embodiment, multiplexer 1285 could be controlled by the 'cn' versions of the control signals (e.g., $\phi_8{}^{cn} \oplus \phi_9{}^{cn}$) since the XOR output would be unaffected by inverting both inputs. The output of multiplexer 1284 is provided at the 0 input of multiplexer 1286 and the output of multiplexer 1285 is provided at the 1 input of multiplexer 1286. Multiplexer 1286 is controlled by $\phi_{10}{}^{cn}$.

Adder 1242 is configured to rotate input coordinate, $X_k$, by the value generated by first subrotation module 1210. Adder 1242 receives as inputs, $X_k$, the output of exclusive-OR gate 1218 of the first subrotation module 1210, and the negation of the output of multiplexer 1286 of the fine stage magnitude scaling module 1280. In an embodiment, adder 1242 is a carry-save adder (CSA). Adder 1242 may further receive $\phi_8{}^{cn}$ as the carry_in value.

Adder 1244 receives the output from adder 1242 and the subrotation value generated by the second subrotation module 1220. Thus, adder 1244 rotates $X_k$ by the additional subrotation value generated by subrotation module 1220. In an embodiment, adder 1244 is also a carry-save adder (CSA). Adder 1244 may further receive $\phi_{11}{}^{cn}$ as the carry_in value. Similarly, adder 1246 receives the output from adder 1244 and the subrotation value generated by the third subrotation module 1230. Thus, adder 1246 rotates $X_k$ by the additional subrotation value generated by subrotation module 1230. In an embodiment, adder 1246 is also a carry-save adder (CSA). Adder 1246 may further receive $\phi_{14}{}^{cn}$ as the carry_in value.

A final adder 1248 receives the output from adder 1246. In an embodiment, adder 1248 is a carry ripple adder. Adder 1248 receives a 1 value as a carry_in input. The carry_in=1 bit completes the ones'-complement negation of the correction value from the fine stage magnitude scaling module, making it into a two's-complement correction. The output of adder 1248 is a coordinate, $X_{fine}$, of the rotated pair of output values.

The circuit 1200B of FIG. 12B is configured to generate $Y_{fine}$ ($Y_{datapath}$). The general operation of the $Y_{datapath}$ is the same as the $X_{datapath}$ of FIG. 12A with the following exceptions. The subrotation modules of FIG. 12B receive as input $(\pi^3/4)X_k$ and $(\pi/4)X_k$. Adder 1242B receives as inputs, the input coordinate $Y_k$, the output of subrotation module 1210B, and the inverted output of fine stage magnitude scaling module 1280B. The output of circuit 1200B is a coordinate, $Y_{fine}$, of the rotated pair of output values. Y-datapath computations require a negation of the $\phi_8{}^{cn}$, $\phi_{11}{}^{cn}$, and $\phi_{14}{}^{cn}$ XOR inputs as well as negations of these values when used as carry_in values.

2.6 Improved DDS Phase Accumulator

Another use for the excess fours processor concerns improving the performance of the DDS phase accumulator. As discussed above, a typical DDS phase accumulator employs a relatively long phase word (e.g., the word length M=32 bits for the examples we have been using here, and M=48 bits has been used in commercial products described in REFs 6 and 7). When incrementing the phase accumulator by adding FCW to it, a long carry-ripple delay can be problematic. A well-known technique for increasing the frequency at which a DDS phase accumulator can be updated is to employ some form of pipelining of the phase accumulator. More details regarding this technique can be found in F. Lu, H. Samueli, J. Yuan, and C. Svensson, "A 700-MHz 24-b pipelined accumulator in 1.2-µm CMOS for application as a numerically controlled oscillator," *IEEE J Solid-State Circuits*, vol. 28, pp. 878-886, August 1993 (hereinafter "LU"), J. Vankka and K. Halonen, *Direct Digital Synthesizers: Theory, Design and Applications*. Dordrecht, Netherlands: Kluwer, 2001, and J. D. Betowski and V. Beiu, "Considerations for phase accumulator design for direct digital frequency synthesizers," *IEEE Int. Coq Neural Networks & Signal Proc.*, Nanjing, China, Dec. 14-17, 2003, each of which is hereinafter incorporated by reference in its entiretly.

When pipelined, a 32-bit phase accumulator can run at 250-MHz in TSMC 0.18-µm CMOS. In addition to the increased hardware expense incurred by the pipelining circuitry, one residual problem remains: the inherent pipeline-induced delay and/or complexity when one desires to instantaneously change the frequency being generated—by changing FCW. (Instantaneous frequency changing is one of the very desirable capabilities of a DDS; indeed, such a feature is perhaps unique to a DDS, in comparison with other types of oscillators.) When changing to a new FCW value, in a pipelined-phase-accumulator system, it can be a problem that the least-significant part of the phase accumulator must be incremented in a previous output-data cycle to that in which the most-significant part of the phase accumulator is incremented, and solving this and related problems can require additional and more complicated circuitry and/or performance compromises.

Figure 13:
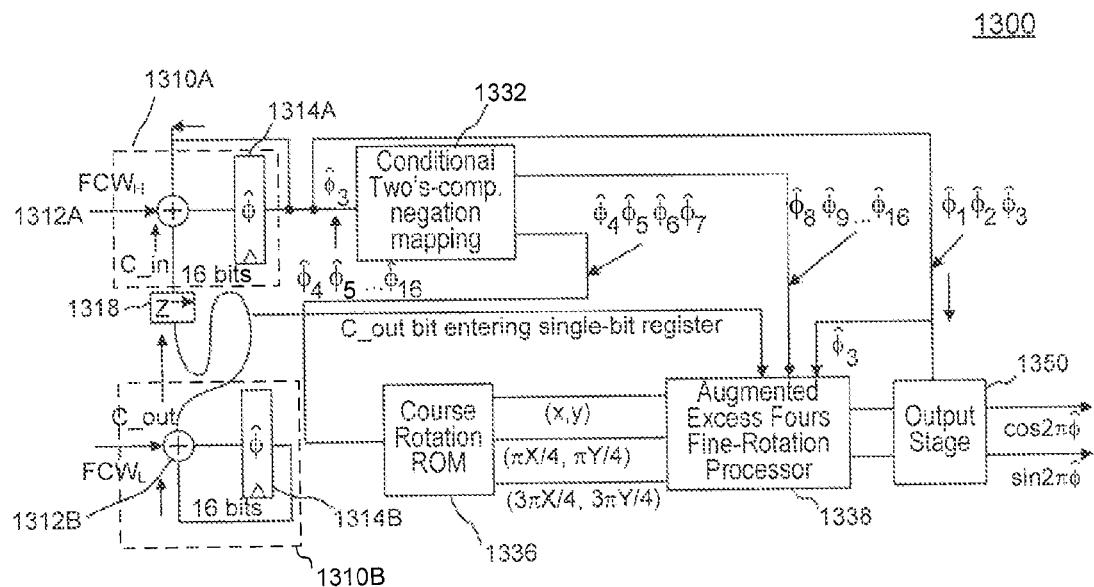
FIG. 13 depicts a DDS with a split phase accumulator, according to embodiments of the present invention.

The excess fours processor can provide an elegant solution to this phase-accumulator speed-up problem. FIG. 13 depicts a DDS 1300 with a split phase accumulator, according to embodiments of the present invention. DDS 1300 includes a phase accumulator split into two halves, 1310A and 1310B. The two halves 1310A/B run independently and simultaneously. Each half, contending with a much shorter phase accumulator carry ripple can comfortably achieve a faster phase-incrementing speed, with each being updated by a corresponding part of a split FCW.

Upper phase accumulator half 1310A receives the upper half of the FCW (FCW$_H$) and lower phase accumulator half 1310B receives the lower half of the FCW (FCW$_L$). For a 32-bit FCW, the upper phase accumulator half 1310A will receive the 16 most significant bits of the FCW and the lower phase accumulator half 1310B will receive the remaining bits. Each phase accumulator half includes an adder and a register. Adder 1312B of the lower phase accumulator half 1310B receives as input a portion of the frequency control word (FCW$_L$) and the output of register 1314B. Adder 1312B provides an output to register 1314B. In addition, adder 1312B outputs C_out. C_out, the carry-out bit of the least-significant part, is held in a single-bit register (SBR) 1318. This bit is used on the next phase-accumulator updating cycle as a carry-in bit for adder 1312A of upper phase accumulator half 1310A, which ensures that the sequence of most significant parts of the phase accumulator (along with the bit held in the single-bit register) will always contain the correct values. (The least-significant part of the phase accumulator will, of course, always have the correct value.) Notice that, if one desires to change the DDS frequency instantaneously, at an arbitrary time, it suffices simply to change both halves of the FCW at that time. No pipelining is used and no undesired transient or synchronization issues arise; both upper and lower FCW halves are added into the upper and lower halves of the phase accumulator simultaneously. When the upper FCW half is used to increment the upper half of the phase accumulator, the C_in bit from the single-bit register is included in the normal manner—no special processing is needed.

The upper half of the phase accumulator 1310A is used as the W-bit truncated phase accumulator value. Here, the processing can proceed normally with the exception that the C_out value that gets stored in SBR 1318 must also be included as a part of the truncated phase accumulator value used by the DDS. This is where the excess fours processor elegantly provides the required capability. It processes this bit without requiring additional carry-ripple delays.

Note that while there is no apparent purpose to be served by tracking the normal occurrence of overflows of the phase accumulator during the real-time operation of a DDS, if an application does need this information for some special purpose then subsequent observations will give useful insights and techniques to easily achieve this goal. The one-cycle deferring of the inclusion of the SBR input into the $\hat{\phi}_H$ update can, conceivably, delay the appearance of a normal $\hat{\phi}_H$ overflow (even though our DDS architecture assures normal behavior with respect to the DDS output sequence).

DDS 1300 further includes a conditional two's complement negation mapping module 1332, coarse rotation stage 1336, augmented excess fours fine-rotation processor 1338, and an output stage 1350. Conditional two's complement negation mapping module 1332 receives bit $\hat{\phi}_3$ and bits $\hat{\phi}_4$ $\hat{\phi}_5 \ldots \hat{\phi}_{16}$ from the output of register 1314A of the first part of the phase accumulator 1310A as inputs. The conditional two's complement negation mapping module 1332 generates a first output $\phi_4\phi_5\phi_6\phi_7$ and a second output $\phi_8\phi_9 \ldots \phi_{16}$. Coarse rotation stage 1336 receives as input, bits $\phi_4\phi_5\phi_6\phi_7$ from the conditional two's complement mapping module 1332. Coarse rotation stage 1336 outputs coordinates (X, Y), values ($\pi X/4$, $\pi Y/4$) and values ($3\pi X/4$, $3\pi Y/4$) to fine rotation processor 1338. Fine rotation processor 1338 further receives as input, C_out, a bit that is also being sent to the single bit register 1318, bits $\phi_8\phi_9 \ldots \phi_{16}$ from conditional two's complement negation mapping module 1332, and bit $\hat{\phi}_3$ from the first part of phase accumulator 1310A.

By comparing the system of FIG. 4 with that of FIG. 13, it is evident that conventional (i.e., FIG. 6) processing can be employed when C_out=0. The system 1300 must, however, address the issue of processing correctly when C_out=1. If C_out=1, then, depending on whether the even/odd-octant designating bit ($\hat{\phi}_3$) is 0 or 1, respectively, the value that would normally have been produced by the conditional two's complement negation mapping would have been too small or too large. When $\hat{\phi}_3$=0, and hence no two's complement negation is performed on the most-significant phase accumulator part $\hat{\phi}_H$, the "1" received by the SBR must increment the $\hat{\phi}_4$ $\hat{\phi}_5 \ldots \hat{\phi}_{16}$ value by 00 . . . 01. On the other hand, when $\hat{\phi}_3$=1, the two's complement negation should then be performed on a desired $\hat{\phi}_H$ value but the $\hat{\phi}_H$ register's value is too small [i.e., it is $\hat{\phi}_H$–00 . . . 01, where now $\hat{\phi}_H$ denotes the desired value]. The two's complement negation of the register's value is 2–($\hat{\phi}_H$–00 . . . 01)=(2–$\hat{\phi}_H$)+00 . . . 01. That is, this two's-complement result must be reduced by the value 00 . . . 01. This means the excess fours fine-stage processor is required to perform one of three possible computations: normal excess fours processing (when C_out=0), otherwise (i.e., when C_out=1) incrementing the normal processing angle by 00 . . . 01 (when $\hat{\phi}_3$=0), or decrementing the normal processing angle by 00 . . . 01 (when $\hat{\phi}_3$=1). The fine rotation processor 1338 is described in further detail below.

The output of fine rotation processor 1338 is provided as an input to output stage 1350. Output stage 1350 further receives as input, bits $\hat{\phi}_1\hat{\phi}_2\hat{\phi}_3$ from the first part of the phase accumulator 1310A. The output of output stage 1350 is cos $2\pi\hat{\phi}$ and/or sin $2\pi\hat{\phi}$.

2.7 Augmented Excess Fours Processor

The augmented excess fours processor for the FIG. 13 system employs one three-bit stage that is constructed in accord with Table 3 below. While the two higher-order stages, modules 1510 and 1520 of FIG. 15, (those controlled by $\phi_8\phi_9\phi_{10}$ and $\phi_{11}\phi_{12}\phi_{13}$) are implemented with excess fours processors of the type described in Table 1, the third (least significant) stage, module 1530 of FIG. 15, controlled by $\phi_{14}\phi_{15}\phi_{16}$, employs Table 3 processing. This three-bit stage will handle the increment/decrement processing without encountering carry propagation delays. Table 3 is constructed by augmenting Table 1 with one more column. This augmented system accommodates three different bias values but it is implemented quite similarly to the previous excess-fours processor's fine stage.

TABLE 3

Augmented Excess Four System

| bit pattern $\phi_a\phi_b\phi_c$ | if BIAS = 0 treated as | if BIAS = 1 treated as | if BIAS = 2 treated as |
|---|---|---|---|
| 000 (0) | –100 (–4) | –011 (–3) | –010 (–2) |
| 001 (1) | –011 (–3) | –010 (–2) | –001 (–1) |
| 010 (2) | –010 (–2) | –001 (–1) | 000 (0) |
| 011 (3) | –001 (–1) | 000 (0) | 001 (1) |
| 100 (4) | 000 (0) | 001 (1) | 010 (2) |
| 101 (5) | 001 (1) | 010 (2) | 011 (3) |
| 110 (6) | 010 (2) | 011 (3) | 100 (8-4) |
| 111 (7) | 011 (3) | 100 (4) | 101 (8-3) |

The Table 3 fine-stage phase word is again divided into three-bit groups, as in FIG. 5, but, unlike the previously discussed excess fours processor, which assumes a coarse-stage angle rotation that includes an offset amount equal to the sum of weighted binary values "100" for each three-bit group, this augmented excess-fours processor uses an offset amount that is the sum of weighted binary values "100" for the two higher-order groups, and the weighted binary value "011" (i.e., binary "3") for the least-significant group—strictly speaking this part of the system could be called an excess three processor. Due to the excess three offset, the BIAS=1 column of Table 3 is used when normal fine-stage processing is desired. The other two columns provide angle rotations that include an increment or decrement.

The BIAS=0 column of Table 3 is addressed by using the $\phi_a$ $\phi_b$ $\phi_c$ bits directly. The BIAS=1 column is addressed by using inverted bits $\overline{\phi}_a$ $\overline{\phi}_b$ $\overline{\phi}_c$ bits (and then negating the sign of the output values—which is achieved by keeping the output signs the same as $\phi_a$ $\phi_b$ $\phi_c$ dictate in the BIAS=0 case). The BIAS=2 column is addressed by using the following simple mapping of the $\phi_a$ $\phi_b$ $\phi_c$ bits: $\phi_c \to \phi_c$; $\overline{\phi}_b \to \phi_b$; $\phi_a \oplus \phi_b \to \phi_a$. For the BIAS=2 column we must also implement certain special processing to handle the last two entries in the column, particularly the 101=(8-3) entry in the column's last row. This last capability is easily accomplished by employing a standard (Table 1) excess four processor for the system's next higher-order (i.e., $\phi_{11}\phi_{12}\phi_{13}$-controlled) three-bit group. That group will employ the BIAS 0 column of Table 1 except for the situation in which the LSB-group processor requires the "8" part of the 101=(8–3) value. Then, a signal to the $\phi_{11}\phi_{12}\phi_{13}$-controlled processor will cause it to use the BIAS 1 column of Table 1, thereby yielding an additional "001" rotation, which, from the perspective of the LSB group, represents the desired "8" value. The "–3" part of (8-3) is, of course, handled by the LSB group processor alone.

Figure 14:
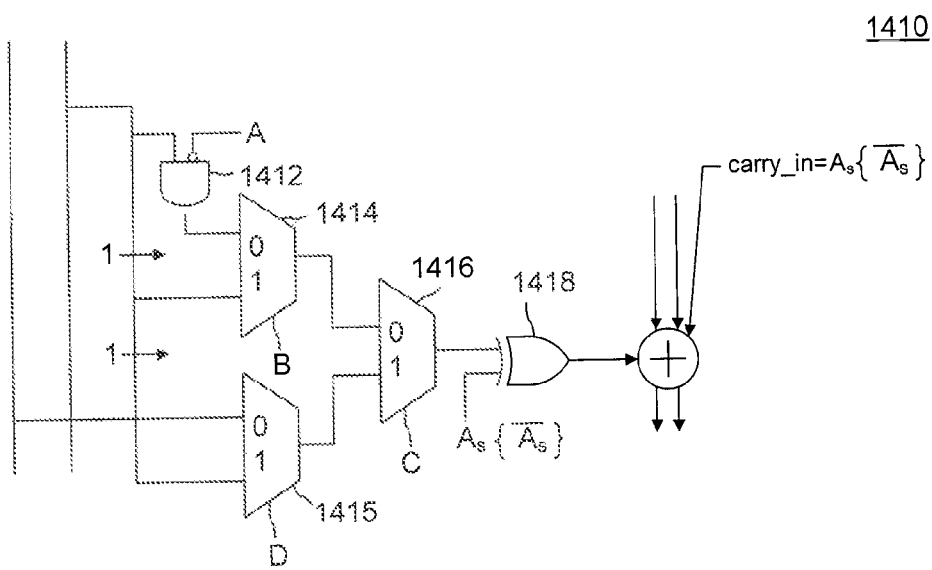
FIG. 14 depicts a three-bit sub-stage processor, according to embodiments of the present invention.

FIG. 14 depicts a three-bit sub-stage processor 1410, according to embodiments of the present invention. Sub-stage processor 1410 includes an AND gate 1412, three 2-to-1 multiplexers 1414, 1415, and 1416 and an exclusive-OR gate 1418. FIG. 14 shows the control signals for a fine-stage three-bit-rotation sub-stage processor. Typically, in the embodiment of FIG. 14, A=A$_S$=$\phi_a$, B=$\phi_b$, C=$\phi_c$ and D=$\phi_a \oplus \phi_b$. It may be that the $A_S$ control signal feeding the output XOR gate 1418 (and providing a carry_in signal to a subsequent carry-save adder) needs revision when add/subtract conditions are altered. In the present embodiment, the control signals for the third (LSB) sub-stage are driven by the BIAS choices in Table 3, and for this:

BIAS=0 applies when C_out=1 and $\hat{\phi}_3$=1;

BIAS=1 applies when C_out=0;

BIAS=2 applies when C_out=1 and $\hat{\phi}_3$=0. (2)

As mentioned above, the mapping of the $\phi_a$ $\phi_b$ $\phi_c$ control bits causes $\phi_a$ to be replaced by $\phi_a \oplus \phi_b$ and $\phi_b$ to be replaced by $\overline{\phi}_b$ when BIAS=2. This means that D=$\phi_a \oplus \phi_b$ becomes $\phi_a \oplus \phi_b \oplus \overline{\phi}_b = \overline{\phi}_a$. Thus, for the FIG. 14 example, it is clear that the third sub-rotation circuit's control signals are:

$$A = \begin{cases} \phi_a & \text{for BIAS} = 0 \\ \overline{\phi}_a & \text{for BIAS} = 1 \\ \phi_a \oplus \phi_b & \text{for BIAS} = 2 \end{cases} \quad (3)$$

$$B = \begin{cases} \phi_b & \text{for BIAS} = 0 \\ \overline{\phi}_b & \text{for BIAS} = 1 \\ \overline{\phi}_b & \text{for BIAS} = 2 \end{cases}$$

$$C = \begin{cases} \phi_c & \text{for BIAS} = 0 \\ \overline{\phi}_c & \text{for BIAS} = 1 \\ \phi_c & \text{for BIAS} = 2 \end{cases}$$

$$D = \begin{cases} \phi_a \oplus \phi_b & \text{for BIAS} = 0 \\ \phi_a \oplus \phi_b & \text{for BIAS} = 1 \\ \overline{\phi}_a & \text{for BIAS} = 2 \end{cases}$$

$$A_s = \begin{cases} \phi_a & \text{for BIAS} = 0 \\ \overline{\phi}_a & \text{for BIAS} = 1 \\ \phi_a \oplus \phi_b & \text{for BIAS} = 2 \end{cases}$$

For example, when $\phi_a \phi_b \phi_c$="000," Table 3 shows that when BIAS=2 the value is treated as "−2" (due to the excess four feature as well as the BIAS). Thus, ideally this case is processed as the BIAS=0 processing would do if the input bit pattern were "010" (see the BIAS=0 entry in Table 3 for that bit pattern). The BIAS=2 specifications above give the results A=0, B=1, and C=0 when $\phi_a$ $\phi_b$ $\phi_c$="000."

The manner in which $A_s$ might differ from A when BIAS=2 reflects the minor alteration required by the last one or two entries in the rightmost column of Table 3. In Table 3 it is evident that there is just one element in the BIAS=2 column that is outside the usual parameter range for the sub-stage processor, and that is the bottom-row value 5 (101). This value is represented as "8-3" because both the eight and the three can easily be implemented. There is another irregular feature exhibited by the BIAS=2 values of Table 3, and that is the sign of the output produced by the sub-stage processor. Here, output negations for $\phi_a$ $\phi_b$ $\phi_a$ entries having bit patterns 000, 001, and 111 (the top two entries and the "−3" part of the bottom one) are required. There is also the row where $\phi_a$ $\phi_b$ $\phi_c$=010 for which the output sign could be either plus or minus, since the output is zero. Beyond this, however, the value of four that applies to the next-to-last row of Table 3 may be represented as "8-4." Then, the higher-order sub-stage processor can be requested to provide a rotation of 8 for both of the bottom two rows. This makes it easier to find a simple expression for the sign-bit control signal for the BIAS=2 column. Namely, $\phi_a \oplus \phi_b$ can now specify the situations in which the application of an output negation is desired. If the reliance on another sub-stage processor's help is limited to just the "8-3" case, then a slightly more complicated logical expression for specifying just the three rows (1, 2, 7) for negation would be required.

The excess four method employs the existence of an excess (four) rotation amount in the rotated values stored in the coarse-rotation ROMs. For a specific rotation sub stage, this amount is an excess rotation in the positive (counter-clockwise) direction of four binary units "100." This is why, in Table 1 and Table 3, the BIAS=0 column shows the first entry as "−4," since that is what would be required to compensate for the presence of the excess four amount that was built in. Clearly, the minus part of the −4 rotation the tables call for here is a rotation in the clockwise direction. From this insight we establish that references made throughout this document to "negating the output" of an excess-four sub stage are, in fact, referring to the direction of the rotation being negative, i.e., clockwise.

Notice that, from equation (1) with α>0, the negative "−α" appearing in the first row of the 2×2 matrix causes a positive rotation: the first row computation is X−αY and since both X and Y have positive values throughout Octant 0, it is clear that the result of X−αY is to reduce the positive value of X Similarly, the second-row computation of equation (1) is αX+Y, which shows that the positive value Y is made larger. Obviously, making the X coordinate smaller and making the Y coordinate larger is consistent with a positive rotation in Octant 0. Such insight makes it clear that, for example, the first four BIAS=0 table entries being negative, hence calling for clockwise rotations, dictate that, in equation (3), $A_s$=$\phi_a$=0. This, in terms of equation (1), makes the first row become X+αY (and the second row, −αX+Y)—clearly a negative (clockwise) rotation (increasing X, and decreasing Y).

A final insight resulting from this discussion is that no matter which rotation direction applies, all excess-four sub stage implementations will have opposite negation/no-negation specifications for the control signals applied to the sub-stage output XOR gates (e.g., $\phi_8$ is applied to XOR gate 618 while $\overline{\phi}_8$ is applied to XOR gate 618B.

Figure 15A:
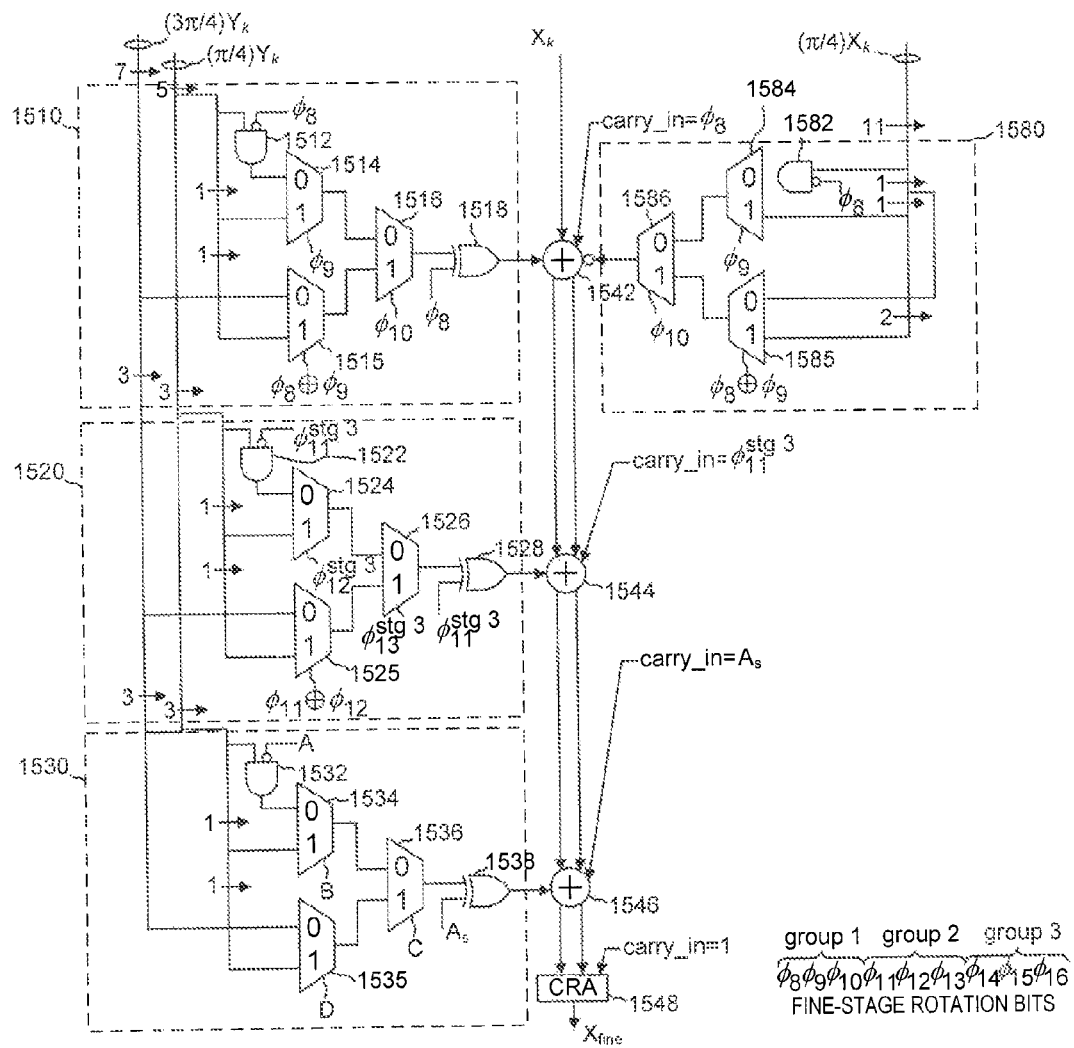
FIGS. 15A and 15B depict the fine rotation stage 1500 from an implementation of the DDS in FIG. 13 described above, according to embodiments of the present invention.

FIGS. 15A and B depict the fine rotation stage 1500 for an implementation of the DDS in FIG. 13 described above, according to embodiments of the present invention. Exemplary fine rotation stage 1500 includes three subrotation modules 1510, 1520, and 1530.

Subrotation module 1510 includes an AND gate 1512, three 2-to-1 multiplexers 1514, 1515, and 1516, and an exclusive-or gate 1518. Subrotation module 1510 receives the group 1, $\phi_8\phi_9\phi_{10}$, of the fine-stage rotation bits. AND gate 1512 receives as a first input, $(\pi/4)Y_k$, shifted by 5 and as a second input, bit 08 of group 1, which is negated at the input. The output of AND gate 1512 is provided at the 0 input to multiplexer 1514. Multiplexer 1514 receives $(\pi/4)Y_k$ shifted by 6 at its 1 input. Multiplexer 1514 is controlled by bit $\phi_9$ of the three-bit input group. Multiplexer 1515 receives $(3\pi/4)Y_k$ shifted by 7 at its 0 input and $(\pi/4)Y_k$ shifted by 7 at its 1 input. Multiplexer 1515 is controlled by the exclusive-OR of bits $\phi_8$ and $\phi_9$ of group 1 of the fine-stage rotation bits. The output of multiplexer 1514 is provided at the 0 input of multiplexer 1516 and the output of multiplexer 1515 is provided at the 1 input of multiplexer 1516. Multiplexer 1516 is controlled by bit $\phi_{10}$ of group 1. The output of multiplexer 1516 is provided as a first input to exclusive-OR gate 1518. Exclusive-OR gate 1518 receives bit $\phi_8$ of group 1 as its second input.

Subrotation module 1520 includes an AND gate 1522, three 2-to-1 multiplexers 1524, 1525, and 1526, and an exclusive-OR gate 1528. Subrotation module 1520 receives group 2, $\phi_{11}\phi_{12}\phi_{13}$, of the fine-stage rotation hits. AND gate 1522 receives as a first input, $(\pi/4)Y_k$, shifted by 8 and as a second input, $\phi_{11}^{stg3}$ where $\phi_k^{stg3} = \phi_k \oplus (\phi_{14} \cap \phi_{15} \cap BIAS_0)$, for k=11, 12 and 13.

The output of AND gate 1522 is provided at the 0 input to multiplexer 1524. Multiplexer 1524 receives $(\pi/4)Y_k$ shifted by 9 at its 1 input. Multiplexer 1524 is controlled by $\phi_{12}^{stg3}$. Multiplexer 1525 receives $(\pi/4)Y_k$ shifted by 10 at its 0 input and $(\pi/4)Y_k$ shifted by 10 at its 1 input. Multiplexer 1525 is controlled by the exclusive-OR of bits $\phi_{11}$ and $\phi_{12}$ of group 2 of the fine rotation bits. The output of multiplexer 1524 is provided at the 0 input of multiplexer 1526 and the output of multiplexer 1525 is provided at the 1 input of multiplexer 1526. Multiplexer 1526 is controlled by $\phi_{13}^{stg3}$. The output of multiplexer 1526 is provided as a first input to exclusive-OR gate 1528. Exclusive-OR gate 1528 receives $\phi_{11}^{stg3}$ as its second input. Note that the modifications to the control bits of subrotation module 1520 yield the needed "8" rotations in Table 3.

Subrotation module 1530 is described above in reference to FIG. 14. For subrotation module 1530, using the following relations [from equation (2)]:

$$BIAS_0 = C\_out \cap \hat{\phi}_3$$

$$BIAS_1 = \overline{C\_out}$$

$$BIAS_2 = C\_out \cap \hat{\phi}_3$$

A, B, etc., of equation (3) above can be defined as:

$$A=(\phi_{14} \cap BIAS_0) \cup (\overline{\phi}_{14} \cap BIAS_1) \cup ((\phi_{14} \oplus \phi_{15}) \cap BIAS_2, \text{etc.}$$

Fine stage magnitude scaling module 1580 is configured to provide magnitude scaling for the fine rotation stage 1500. The fine stage magnitude scaling module 1580 of FIG. 15 also includes a simple three multiplexer circuit that slightly shortens the $X_k$ $\{$or $Y_k\}$ input data, via subtraction, which approximately compensates for the slight lengthening of the output of the first three-bit rotation stage, as explained in the previous discussion regarding the introduction of equation (1). In principle, such magnitude scaling should (and would, when needed) also be employed for the other two rotation stages but the amount of scaling needed is rather small and can often be neglected without a significant loss of accuracy. The computed correction value of the fine stage magnitude scaling module 1580 is ones'-complement negated as it is fed to the main (vertical) data-path in FIG. 15.

Magnitude scaling module 1580 includes an AND gate 1582 and three 2-to-1 multiplexers 1584, 1585, and 1586. AND gate 1582 receives as a first input, $(\pi/4)X_k$, shifted by 11 and as a second input, bit $\phi_8$ of group 1, which is negated at the input. The output of AND gate 1582 is provided at the 0 input of multiplexer 1584. Multiplexer 1584 receives $(\pi/4)X_k$ shifted by 13 at its 1 input. Multiplexer 1584 is controlled by bit $\phi_9$ of the three-bit input group. Multiplexer 1585 receives $(\pi/4)X_k$ shifted by 12 at its 0 input and $(\pi/4)X_k$ shifted by 15 at its 1 input. Multiplexer 1585 is controlled by the exclusive-OR of bits $\phi_8$ and $\phi_9$ of group 1. The output of multiplexer 1584 is provided at the 0 input of multiplexer 1586 and the output of multiplexer 1585 is provided at the 1 input of multiplexer 1586. Multiplexer 1586 is controlled by bit $\phi_{10}$ of group 1.

Adder 1542 is configured to rotate input coordinate, $X_k$, by the value generated by first subrotation module 1510. Adder 1542 receives as inputs, $X_k$, the output of exclusive-OR gate 1518 of the first subrotation module 1510, and the negation of the output of multiplexer 1586 of the fine stage magnitude scaling module 1580. In an embodiment, adder 1542 is a carry-save adder (CSA). Adder 1542 may further receive bit $\phi_8$ of group 1 of the fine-stage rotation bits as the carry_in value.

Adder 1544 receives the output from adder 1542 and the subrotation value generated by the second subrotation module 1520. Thus, adder 1544 rotates $X_k$ by the additional subrotation value generated by subrotation module 1520. In an embodiment, adder 1544 is also a carry-save adder (CSA). Adder 1544 may further receive $\phi_{11}^{stg3}$ as the carry_in value. Similarly, adder 1546 receives the output from 1544 and the subrotation value generated by the third subrotation module 1530. Thus, adder 1546 rotates $X_k$ by the additional subrotation value generated by subrotation module 1530. In an embodiment, adder 1546 is also a carry-save adder (CSA). Adder 1546 may further receive $A_s$ as the carry_in value.

A final adder 1548 receives the output from adder 1546. In an embodiment, adder 1548 is a carry ripple adder. Adder 1548 receives a 1 value as a carry_in input. The carry_in=1 bit completes the ones'-complement negation of the correction value from the fine stage magnitude scaling module, making it into a two's-complement correction. The output of adder 1548 is a coordinate, $X_{fine}$, of the rotated pair of output values.

Figure 15B:
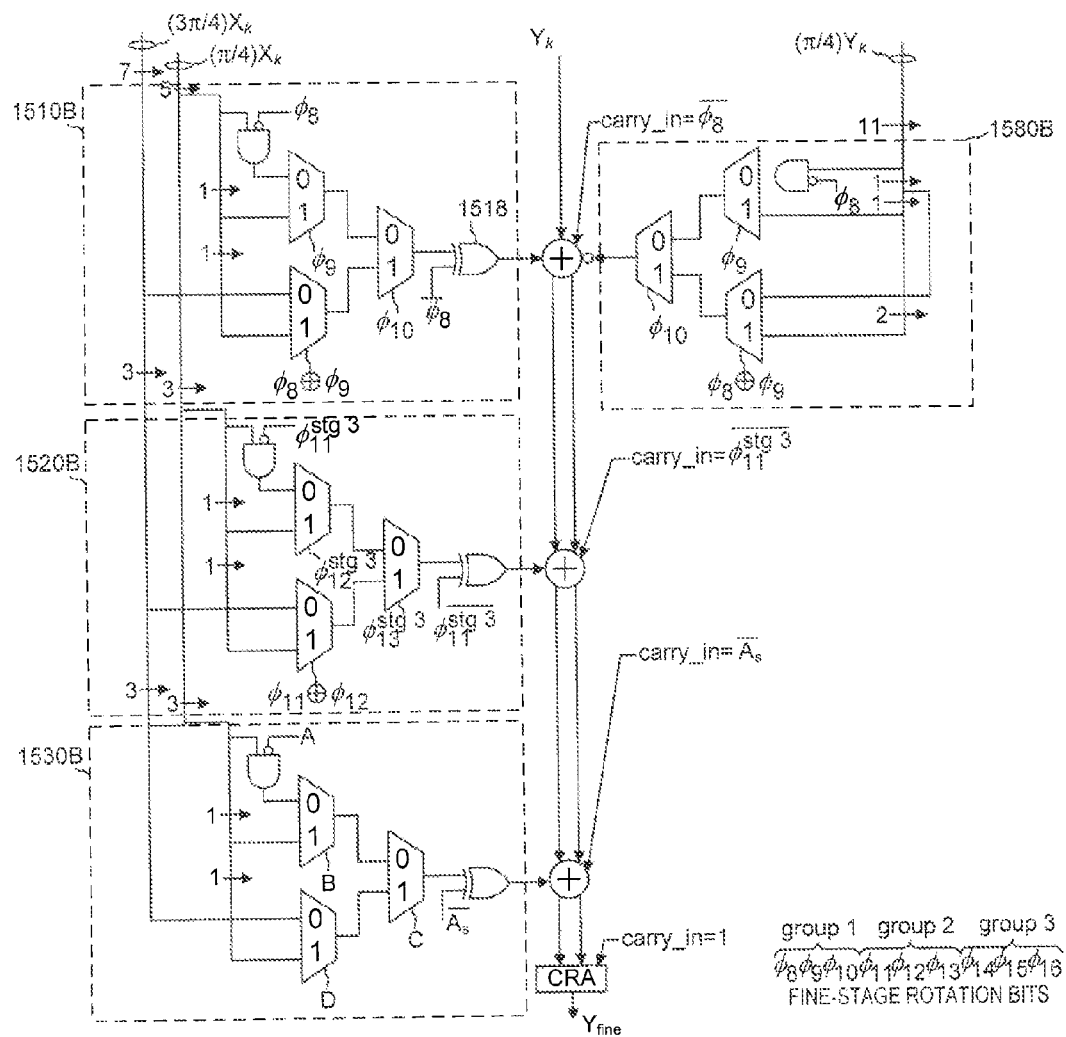

The circuit 1500B of FIG. 15B is configured to generate $Y_{fine}$ ($Y_{datapath}$). The general operation of the $Y_{datapath}$ is the same as the $X_{datapath}$ of FIG. 15A with the following exceptions. The subrotation modules of FIG. 15B receive as input $(\pi^{3}/4)X_k$ and $(\pi/4)X_k$. Adder 1542B receives as inputs, the input coordinate $Y_k$, the output of subrotation module 1510B, and the inverted output of fine stage magnitude scaling module 1580B. The output of circuit 1500B is a coordinate, $Y_{fine}$, of the rotated pair of output values. Y-datapath computations require a negation of the $\phi_8$, and $\phi_{11}^{stg3}$ XOR inputs as well as negations of these values when used as carry_in values.

2.8 Other Split Phase-Accumulator DDS Systems

Figure 16:
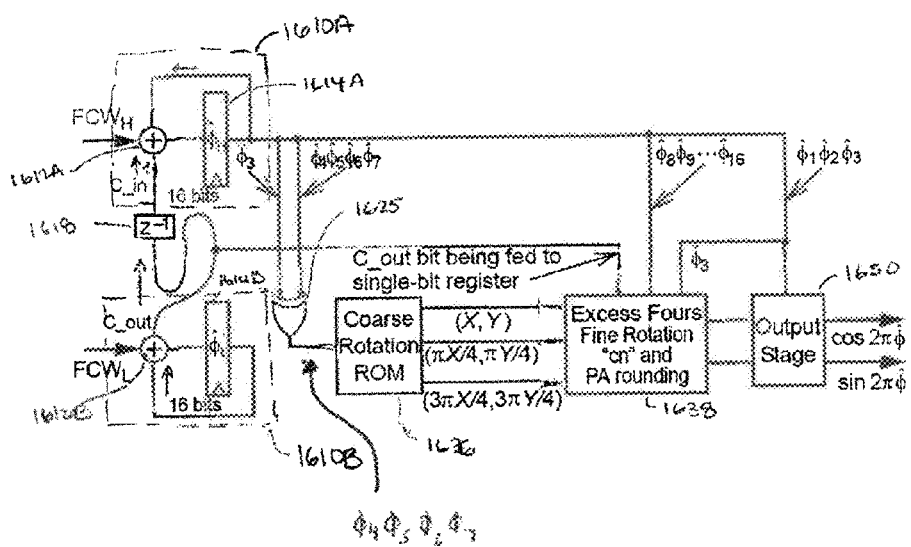
FIG. 16 depicts a conditional ones' complement negation [cn] excess-fours DDS with a split phase accumulator, according to embodiments of the present invention.

FIG. 16 depicts a conditional ones' complement negation [cn] excess-fours DDS 1600 with a split phase accumulator, according to embodiments of the present invention. The system employs conditional ones' complement negation to get conditional two's complement negation, but does conventional processing otherwise. DDS 1600 includes a phase accumulator split into two halves, 1610A and 1610B.

Upper phase accumulator half 1610A receives the upper half of the FCW ($FCW_H$) and lower phase accumulator half 1610B receives the lower half of the FCW ($FCW_L$). Each phase accumulator half includes an adder and a register. Adder 1612B of the lower phase accumulator half 1610B receives as input a portion of the frequency control word ($FCW_L$) and the output of register 1614B. Adder 1612B provides an output to register 1614B. In addition, adder 1612B outputs C_out. C_out, the carry-out bit of the lower (least-significant) phase-accumulator half, is held in a single-bit register (SBR) 1618. This bit is used on the next phase-accumulator updating cycle as a carry-in bit for adder 1612A of upper phase accumulator half 1610A, which ensures that the sequence of most significant parts of the phase accumulator (along with the bit currently held in the single-bit register) will always contain the correct values.

The upper half of the phase accumulator 1610A is used as the W-bit truncated phase accumulator value. Here, the processing can proceed normally with the exception that the C_out value that gets stored in SBR 1618 must also be included as a part of the truncated phase accumulator value used by the DDS.

DDS 1600 further includes an exclusive-OR gate 1625. Exclusive-OR gate 1625 receives as a first input bit, $\hat{\phi}_3$, and as a second input, bits $\hat{\phi}_4 \hat{\phi}_5 \hat{\phi}_6 \hat{\phi}_7$. The output of exclusive-OR gate 1625, $\phi_4\phi_5\phi_6\phi_7$ is provided as input to coarse rotation stage 1636. Coarse rotation stage 1636 outputs coordinate pair (X, Y), values ($\pi$X/4, $\pi$Y/4) and values (3$\pi$X/4, $\pi$Y/4) to excess fours fine rotation "cn" and phase accumulator rounding stage 1638. Fine rotation stage 1638 further receives as input, bits $\hat{\phi}_8\hat{\phi}_9 \ldots \hat{\phi}_{16}$, bit $\hat{\phi}_3$, and the C_out bit being fed to the single bit register 1618.

The output of fine rotation processor 1638 is provided as an input to output stage 1650. Output stage 1650 further receives as input, bits $\hat{\phi}_1\hat{\phi}_2\hat{\phi}_3$ from the first part of the phase accumulator 1610A. The output of output stage 1650 is cos $2\pi\hat{\phi}$ and/or sin $2\pi\hat{\phi}$.

Figure 17A:
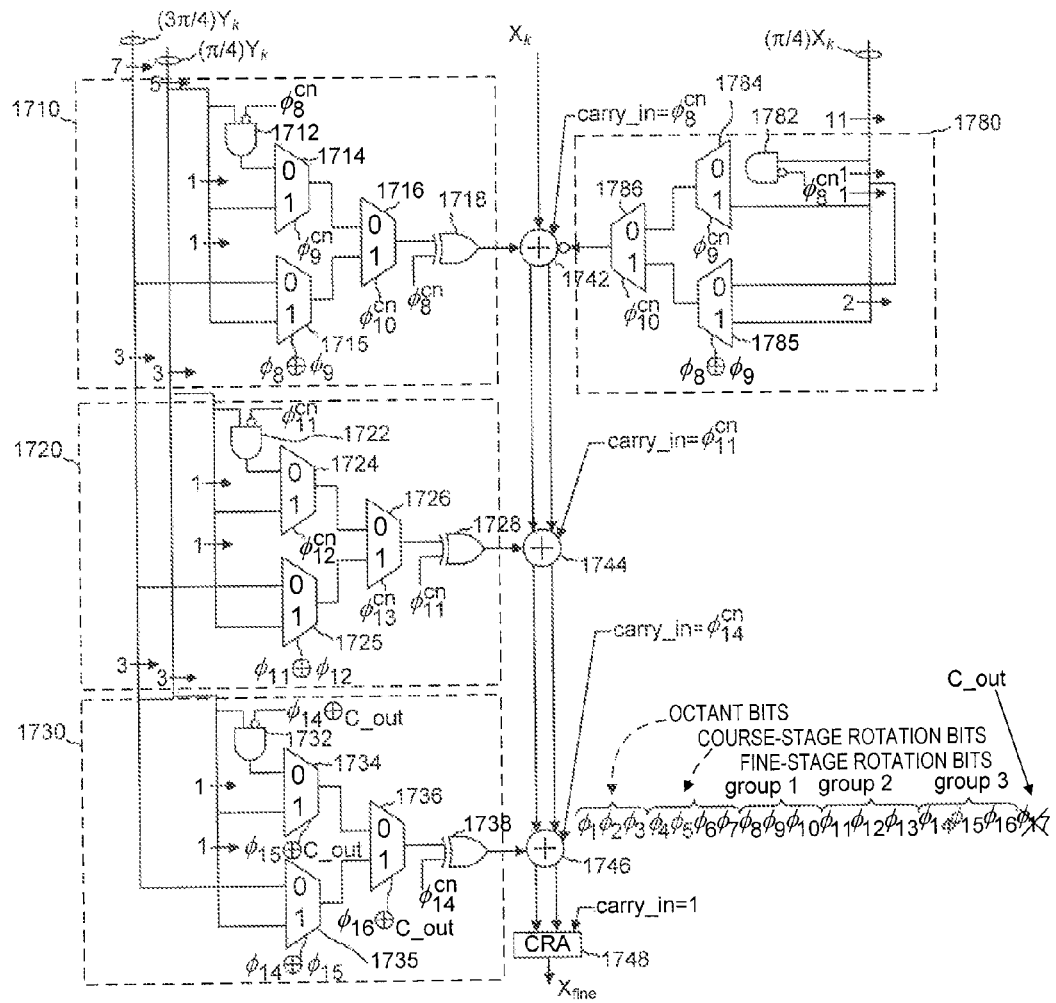
FIGS. 17A and 17B depict an exemplary fine rotation stage in a split-phase accumulator DDS of FIG. 16, according to embodiments of the present invention.
Figure 17B:
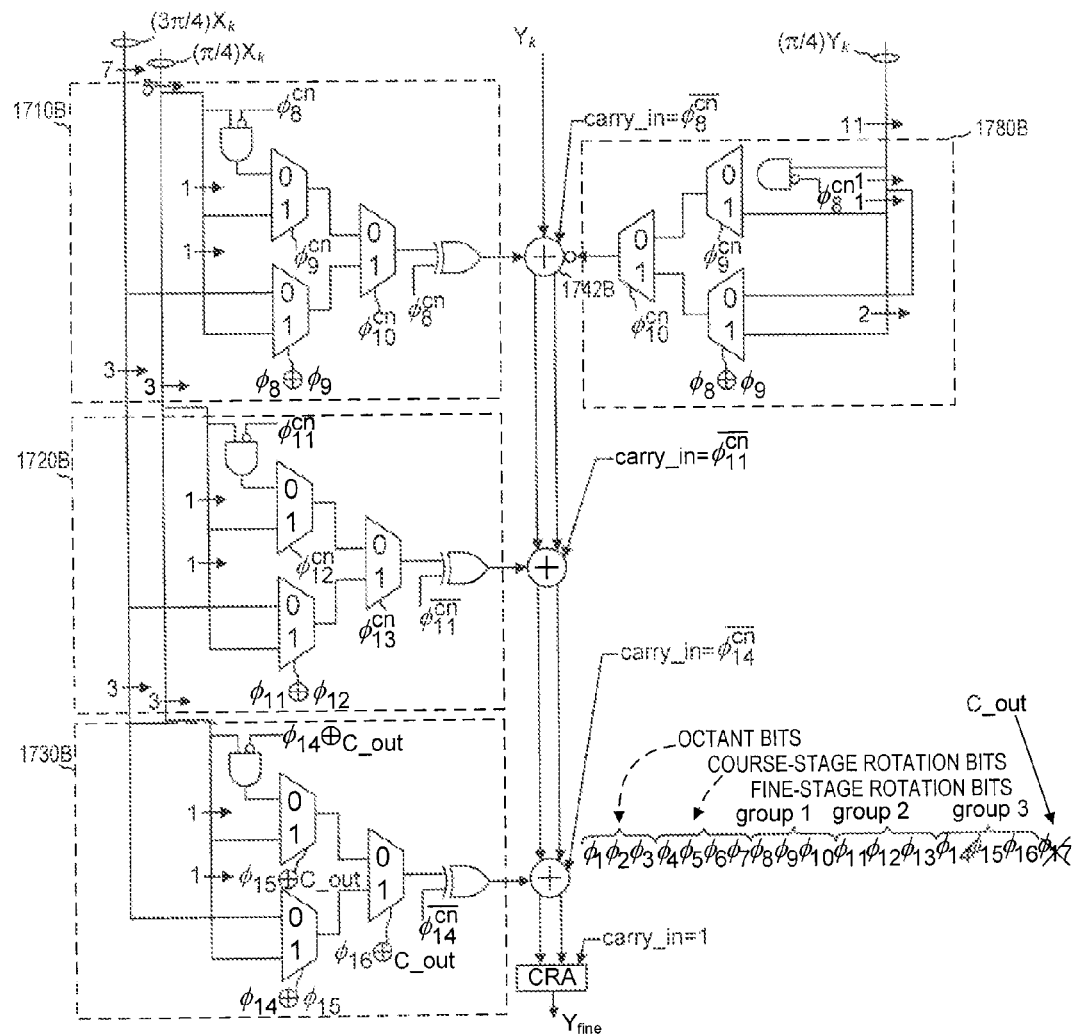

FIGS. 17A and 17B depict an exemplary fine rotation stage 1700 in a split-phase accumulator DDS of FIG. 16, according to embodiments of the present invention. FIG. 17A is configured to generate $X_{fine}$ ($X_{datapath}$) and FIG. 17B is configured to generate $Y_{fine}$ ($Y_{datapath}$). Notice that for notational clarity all variables, $\hat{\phi}_k$ have been written as $\phi_k$. Exemplary fine rotation stage 1700 includes three subrotation modules 1710, 1720, and 1730.

Subrotation module 1710 includes an AND gate 1712, three 2-to-1 multiplexers 1714, 1715, and 1716, and an exclusive-OR gate 1718. Subrotation module 1710 receives the group 1, $\phi_8\phi_9\phi_{10}$, of the fine-stage rotation bits. AND gate 1712 receives as a first input, ($\pi$/4)$Y_k$ shifted by 5 and as a second input, $\phi_8^{cn}$ (referred to herein as the 'cn' version) which is negated at the input. The 'cn' version is determined using the equation:

$$\phi_k^{cn} = \phi_k \oplus \hat{\phi}_3 \text{ for } k=8,\ldots,14$$

The output of AND gate 1712 is provided at the 0 input to multiplexer 1714. Multiplexer 1714 receives ($\pi$/4)$Y_k$ shifted by 6 at its 1 input. Multiplexer 1714 is controlled by $\phi_9^{cn}$. Multiplexer 1715 receives (3$\pi$/4)$Y_k$ shifted by 7 at its 0 input and ($\pi$/4)$Y_k$ shifted by 7 at its 1 input. Multiplexer 1715 is controlled by the exclusive-OR of bits $\phi_8$ and $\phi_9$ of group 1 of the fine-stage rotation bits. In an alternative embodiment, multiplexer 1715 could be controlled by the 'cn' versions of the control signals (i.e., $\phi_8^{cn} \oplus \phi_9^{cn}$) since the XOR output would be unaffected by inverting both inputs.

The output of multiplexer 1714 is provided at the 0 input of multiplexer 1716 and the output of multiplexer 1715 is provided at the 1 input of multiplexer 1716. Multiplexer 1716 is controlled by $\phi_{10}^{cn}$. The output of multiplexer 1716 is provided as a first input to exclusive-OR gate 1718. Exclusive-OR gate 1718 receives $\phi_8^{cn}$ as its second input.

Subrotation module 1720 includes an AND gate 1722, three 2-to-1 multiplexers 1724, 1725, and 1726, and an exclusive-OR gate 1728. Subrotation module 1720 receives group 2, $\phi_{11}\phi_{12}\phi_{13}$, of the fine-stage rotation bits. AND gate 1722 receives as a first input, ($\pi$/4)$Y_k$, shifted by 8 and as a second input, $\phi_{11}^{cn}$; which is negated at the input. The output of AND gate 1722 is provided at the 0 input to multiplexer 1724. Multiplexer 1724 receives ($\pi$/4)$Y_k$ shifted by 9 at its 1 input. Multiplexer 1724 is controlled by the conditional negation of bit $\phi_{12}$ of Group 2, $\phi_{12}^{cn}$. Multiplexer 1725 receives (3$\pi$/4)$Y_k$ shifted by 10 at its 0 input and ($\pi$/4)$Y_k$ shifted by 10 at its 1 input. Multiplexer 1725 is controlled by the exclusive-OR of bits $\phi_{11}$ and $\phi_{12}$ of group 2 of the fine rotation bits. The output of multiplexer 1724 is provided at the 0 input of multiplexer 1726 and the output of multiplexer 1725 is provided at the 1 input of multiplexer 1726. In an alternative embodiment, multiplexer 1725 could be controlled by the 'cn' versions of the control signals (i.e., $\phi_{11}^{cn} \oplus \phi_{12}^{cn}$) since the XOR output would be unaffected by inverting both inputs.

Multiplexer 1726 is controlled by the conditional negation of bit $\phi_{13}$ of Group 2, $\phi_{13}^{cn}$. The output of multiplexer 1726 is provided as a first input to exclusive-OR gate 1728. Exclusive-OR gate 1728 receives the conditional negation of bit $\phi_{11}$ of Group 2, $\phi_{11}^{cn}$ as its second input.

Subrotation module 1730 includes an AND gate 1732, three 2-to-1 multiplexers 1734, 1735, and 1736, and an exclusive-or gate 1738. Subrotation module 1730 receives group 3, $\phi_{14}\phi_{15}\phi_{16}$, of the fine-stage rotation bits in addition to C_out. AND gate 1732 receives as a first input, ($\pi$/4)$Y_k$, shifted by 11 and as a second input, the exclusive-OR of bit $\phi_{14}$ of group 3 of the fine rotation bits and C_out. The output of AND gate 1732 is provided at the 0 input to multiplexer 1734. Multiplexer 1734 receives ($\pi$/4)$Y_k$ shifted by 12 at its 1 input. Multiplexer 1734 is controlled by the exclusive-OR of bits $\phi_{15}$ and C_out. Multiplexer 1735 receives (3$\pi$/4)$Y_k$ shifted by 13 at its 0 input and ($\pi$/4)$Y_k$ shifted by 13 at its 1 input. Multiplexer 1735 is controlled by the exclusive-OR of bits $\phi_{14}$ and $\phi_{15}$ of group 3. The output of multiplexer 1734 is provided at the 0 input of multiplexer 1736 and the output of multiplexer 1735 is provided at the 1 input of multiplexer 1736. Multiplexer 1736 is controlled by the exclusive-OR of bits 016 of group 3 and C_out. The output of multiplexer 1736 is provided as a first input to exclusive-OR gate 1738. Exclusive-OR gate 1738 receives the conditional negation of bit $\phi_{14}$ of Group 3, $\phi_{14}^{cn}$, as its second input.

Magnitude scaling module 1780 includes an AND gate 1782 and three 2-to-1 multiplexers 1784, 1785, and 1786. AND gate receives as a first input, ($\pi$/4)$X_k$, shifted by 11 and as a second input, $\phi_8^{cn}$, which is negated at the input. The output of AND gate 1782 is provided at the 0 input of multiplexer 1784. Multiplexer 1784 receives ($\pi$/4)$X_k$ shifted by 13 at its 1 input. Multiplexer 1784 is controlled by $\phi_9^{cn}$. Multiplexer 1785 receives ($\pi$/4)$X_k$ shifted by 12 at its 0 input and ($\pi$/4)$X_k$ shifted by 15 at its 1 input. Multiplexer 1785 is controlled by the exclusive-OR of bits $\phi_8$ and $\phi_9$ of group 1. In an alternative embodiment, multiplexer 1785 could be controlled by the 'cn' versions of the control signals (i.e., $\phi_8^{cn} \oplus \phi_9^{cn}$) since the XOR output would be unaffected by inverting both inputs. The output of multiplexer 1784 is provided at the 0 input of multiplexer 1786 and the output of multiplexer 1785 is provided at the 1 input of multiplexer 1786. Multiplexer 1786 is controlled by $\phi_{10}^{cn}$.

Adder 1742 is configured to rotate input coordinate, $X_k$, by the value generated by first subrotation module 1710. Adder 1742 receives as inputs, $X_k$, the output of exclusive-OR gate 1718 of the first subrotation module 1710, and the negation of the output of multiplexer 1786 of the fine stage magnitude scaling module 1780. In an embodiment, adder 1742 is a carry-save adder (CSA). Adder 1742 may further receive $\phi_8^{cn}$ as the carry_in value.

Adder 1744 receives the output from adder 1742 and the subrotation value generated by the second subrotation module 1720. Thus, adder 1744 rotates $X_k$ by the additional subrotation value generated by subrotation module 1720. In an embodiment, adder 1744 is also a carry-save adder (CSA). Adder 1744 may farther receive $\phi_{11}^{cn}$ as the carry_in value. Similarly, adder 1746 receives the output from 1744 and the subrotation value generated by the third subrotation module 1730. Thus, adder 1746 rotates $X_k$ by the additional subrotation value generated by subrotation module 1730. In an embodiment, adder 1746 is also a carry-save adder (CSA). Adder 1746 may further receive $\phi_{14}^{cn}$ as the carry_in value.

A final adder 1748 receives the output from adder 1746. In an embodiment, adder 1748 is a carry ripple adder. Adder 1748 receives a 1 value as a carry_in input. The carry_in=1 bit completes the ones'-complement negation of the correction value from the fine stage magnitude scaling module, making it into a two's-complement correction. The output of adder 1748 is a coordinate, $X_{fine}$, of the rotated complex number.

The circuit 1700B of FIG. 17B is configured to generate $Y_{fine}$ ($Y_{datapath}$). The general operation of the $Y_{datapath}$ is the same as the $X_{datapath}$ of FIG. 17A with the following exceptions. The subrotation modules of FIG. 17B receive as input $(\pi^3/4)X_k$ and $(\pi/4)X_k$. Adder 1742B receives as inputs, the input coordinate $Y_k$, the output of subrotation module 1710B, and the inverted output of fine stage magnitude scaling module 1780B. The output of circuit 1700B is a coordinate, $Y_{fine}$, of the rotated pair of output values. Y-datapath computations require a negation of the $\phi_8^{cn}$, $\phi_{11}^{cn}$, and $\phi_{14}^{cn}$ XOR inputs as well as negations of these values when used as carry_in values.

2.9 Other Phase-Accumulator Splits

The 16/16 two-part split in the 32-bit phase accumulator systems of FIGS. 13 and 16 is but one of many possible ways that the phase accumulator can be split. For a smaller carry-ripple delay, the phase accumulator could be split into more parts. A three-way split of 10/11/11 is one other possibility for the splitting of a 32-bit phase accumulator. In this case, the maximum carry-ripple delay would span eleven bits rather than 16 and, if we still desired a 16-bit phase truncation, then the first (high order) 10-bit part would provide the three bits for the octant designation, the four bits for the coarse stage angle, and the three bits for the most-significant three-bit fine-stage group. In addition, the most-significant six of the second part's eleven bits would provide the remaining two 3-bit fine-stage groups.

Figure 18:
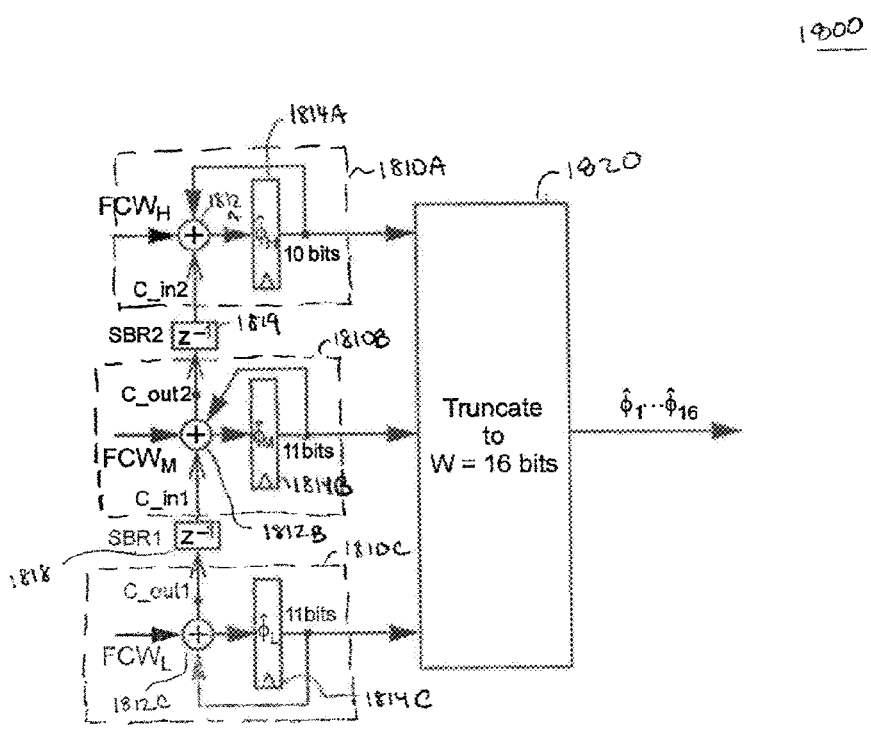
FIG. 18 depicts an n-part split phase accumulator, according to embodiments of the present invention.

FIG. 18 depicts an n-part split phase accumulator 1800, according to embodiments of the present invention. As would be appreciated by a person of skill in the art, a phase accumulator can be split into any number n of parts. For ease of discussion, FIG. 18 discloses a three-part split phase accumulator. The phase accumulator 1800 includes an upper portion 1810A, a middle portion 1810B, and a lower portion 1810C.

Lower portion 1810C includes an adder 1812C coupled to a register 1814C. Adder 1812C receives as inputs, the 11 least-significant bits of the FCW ($FCW_L$) and the output of register 1814C. Adder 1812C outputs C_out1 to single bit register (SBR1) 1818. Middle portion 1810B includes an adder 1812B coupled to a register 1814B. Adder 1812B receives as inputs, 11-bits of the FCW ($FCW_M$), the output of SBR1 1818 (C_in1), and the output of register 1814B. Adder 1812B outputs C_out2 to single bit register (SBR2) 1819.

Upper portion 1810A includes an adder 1812A coupled to a register 1814A. Adder 1812A receives as inputs, the 10 most-significant bits of the FCW ($FCW_H$), the output of SBR1 1819 (C_in2), and the output of register 1814A. The outputs of registers 1814A, B, and C are provided to truncation module 1820. Truncation module 1820 is configured to cut off a least significant part of the received input; in this example it cuts off the 16 least significant bits of the phase accumulator output, leaving a truncated normalized rotation angle having 16 bits.

Figure 19:
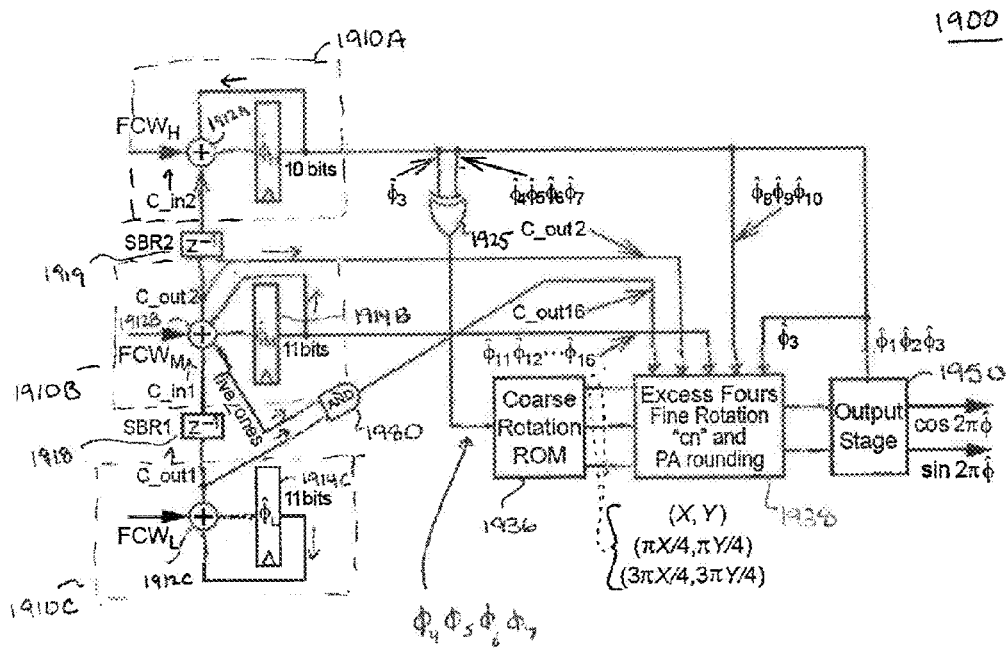
FIG. 19 depicts an excess-fours DDS with three-part split phase accumulator, according to embodiments of the present invention.

FIG. 19 depicts an excess-fours DDS 1900 with three-part split phase accumulator of FIG. 18, according to embodiments of the present invention. As discussed above, the phase accumulator of DDS 1900 is split into three-parts, an upper portion 1910A, a middle portion 1910B, and a lower portion 1910C. Upper potion 1910A receives 10-bits of the FCW ($FCW_H$); middle portion 1910B receives 11-bits of the FCW ($FCW_M$); and lower portion 1910C receives 11-bits of the FCW ($FCW_L$). Each phase accumulator part includes an adder and a register.

Adder 1912C of lower portion 1910C receives as inputs, $FCW_L$ and the output of register 1914C. Adder 1912C outputs C_out1 to single-bit register (SBR1) 1918. This bit is used on the next phase-accumulator updating cycle as an input (C_in1) to adder 1912B of middle portion 1910B. Adder 1912B further receives as input $FCW_M$ and the output of register 1914B. Adder 1912B outputs C_out2 to single-bit register (SBR2) 1919. This bit is used on the next phase-accumulator updating cycle as an input (C_in2) to adder 1912A of upper portion 1910A. The output of the phase accumulator may be further truncated. For example, in FIG. 19, the system strips off the lower 16 bits from the output of the phase accumulator. That is, the 11-bits from the lower phase accumulator portion 1910C and the five least significant bits from the output of the middle phase accumulator portion are stripped. The truncation module is not shown in FIG. 19.

DDS 1900 further includes an exclusive-OR gate 1925. Exclusive-OR gate 1925 receives as a first input bit, $\phi_s$, and as a second input, bits $\hat{\phi}_4\hat{\phi}_5\hat{\phi}_6\hat{\phi}_7$. The output of exclusive-OR gate 1925, $\hat{\phi}_4\hat{\phi}_5\hat{\phi}_6\hat{\phi}_7$ is provided as input to coarse rotation stage 1936. Coarse rotation stage 1936 outputs coordinates (X, Y), values ($\pi X/4$, $\pi Y/4$) and values ($3\pi X/4$, $3\pi Y/4$) to excess fours fine rotation "cn" and phase accumulator rounding stage 1938.

DDS 1900 also includes an AND gate 1980. AND gate 1980 receives as a first input, C_out1 from adder 1912C and as a second input, a special "five_ones" output from adder 1912B. The output of AND gate 1980, C_out16, is provided as input to fine rotation stage 1938. Fine rotation stage 1938 further receives as input, bits $\hat{\phi}_{11}\hat{\phi}_{12}\ldots\hat{\phi}_{16}$, bits $\hat{\phi}_8\hat{\phi}_9\hat{\phi}_{10}$, and C_out2 from adder 1912B.

Figure 20:
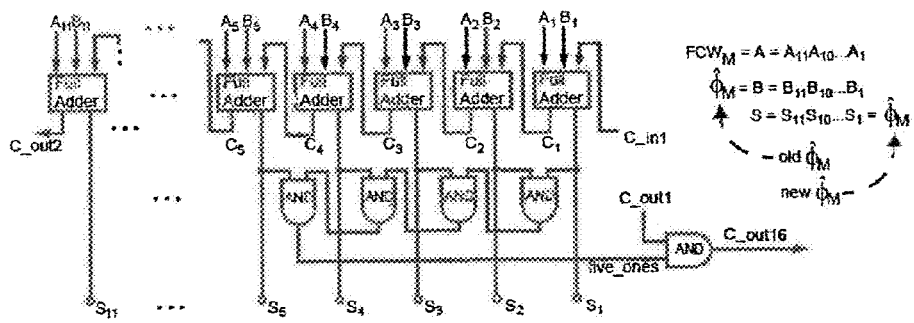
FIG. 20 depicts a chain of AND gates for generating a five_ones signal and a C_out16 signal, according to embodiments of the present invention.

The special "five_ones" output bit of the adder 1912B for $\hat{\phi}_M$ in FIG. 18 delivers a "1" whenever a sum having all ones for the five LSBs is produced. Such an output can be provided by a simple chain of AND gates that processes the carry-ripple adder's five LSB sum bits as they are produced. An example is shown in FIG. 20. Also shown in FIGS. 19 and 20 is the logical AND operation combining the "five_ones" signal with the C_out1 bit. The output of this AND gate 1980, designated C_out16, is used as a carry-in bit for the higher-order six bits of $\hat{\phi}_M$ so that these bits can produce the correct rotations in the fine-stage processing illustrated in FIG. 21. Here, of course, the C_out16 signal takes on the role of the C_out bit in FIG. 17.

The above discussion of the implementation of the three-way split (10/11/11) phase accumulator for a DDS can be extended to various other split phase accumulators. While the reduction of a 32-bit phase accumulator to three parts with 10/11/11 bits, resulting in a system having an eleven-bit carry ripple delay, may not seem a practical system, since other processing delays within the overall system may already exceed a delay this short, a three-part split could, however, be a useful means of implementing a 48-bit phase accumulator having three 16-bit phase accumulator parts.

Figure 21A:
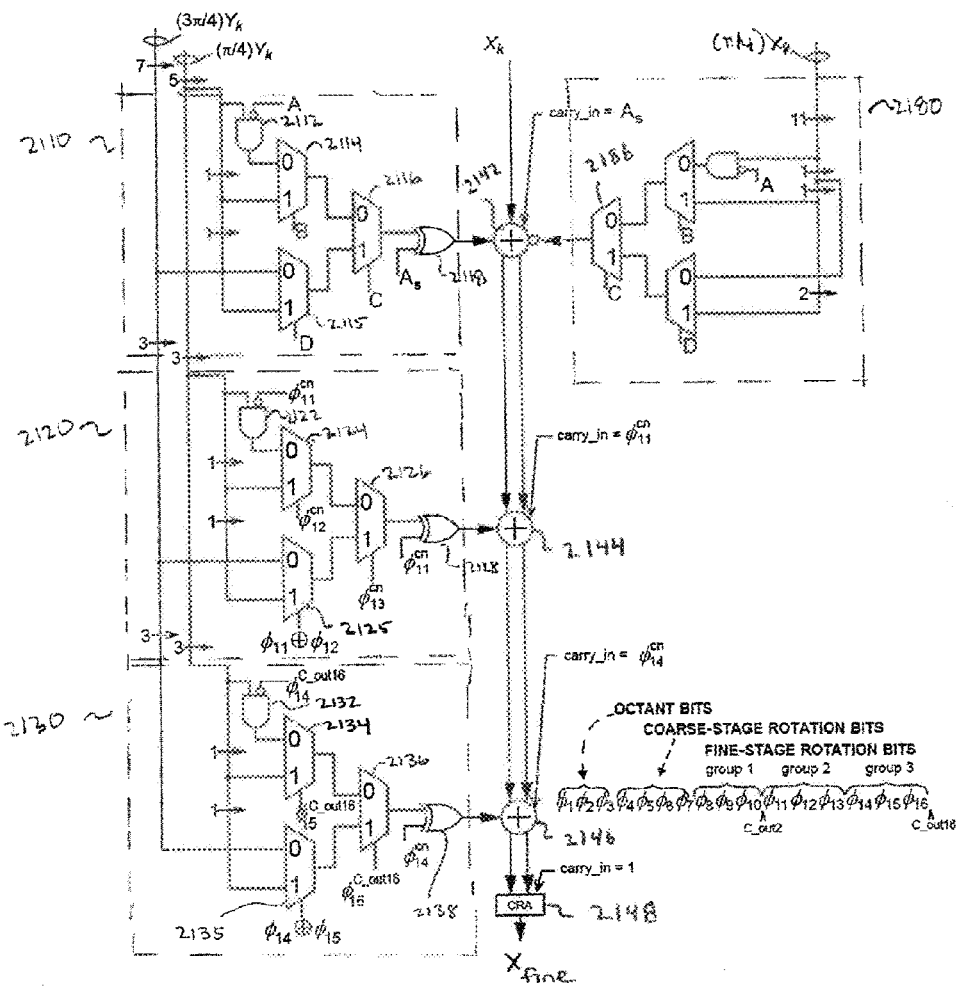
FIGS. 21A and 21B depict an exemplary fine rotation stage 2000 for an excess fours DDS of FIG. 19 having a three-part split phase accumulator, according to embodiments of the present invention.
Figure 21B:
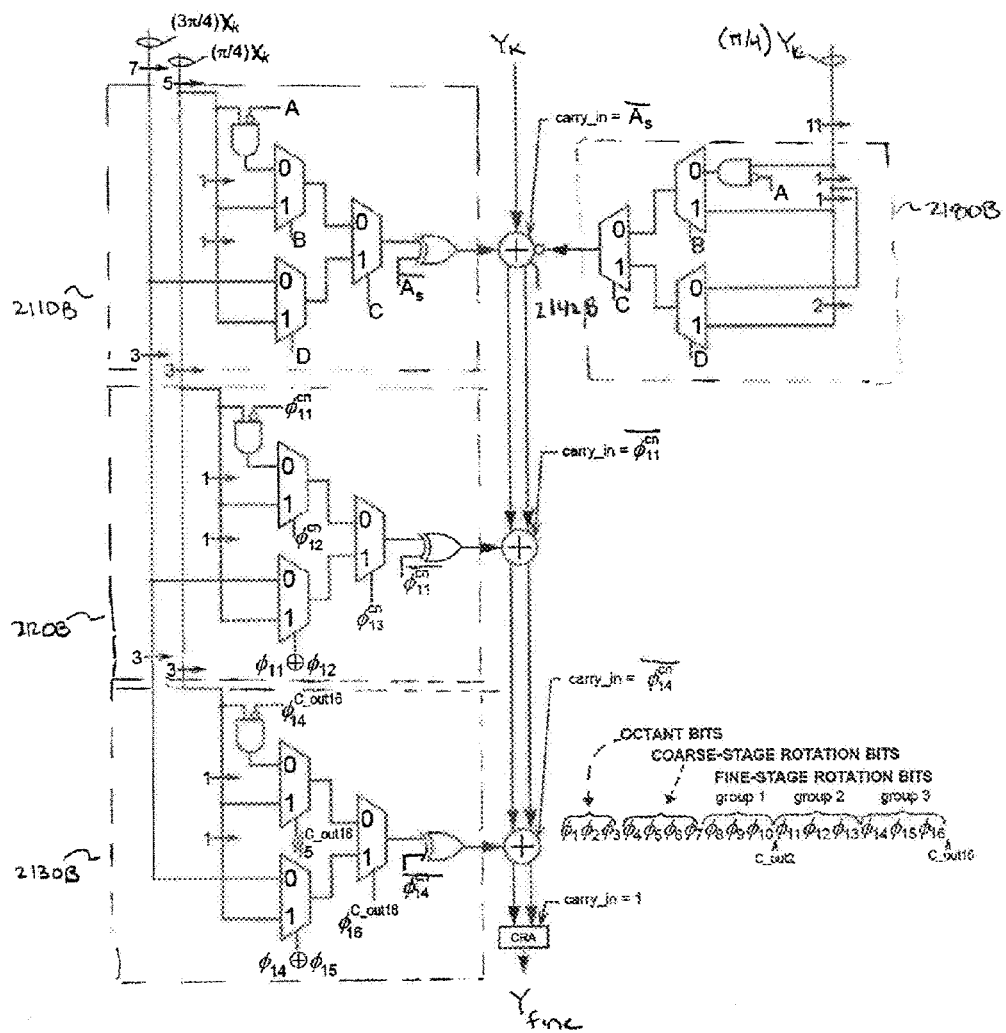

FIGS. 21A and 21B depict an exemplary fine rotation stage 2100 for an excess fours DDS of FIG. 19 having a three-part split phase accumulator, according to embodiments of the present invention. FIG. 21A is configured to generate $X_{fine}$ ($X_{datapath}$) and FIG. 21B is configured to generate $Y_{fine}$ ($Y_{datapath}$). Notice that for notational clarity all variables, $\hat{\phi}_k$ have been written as $\phi_k$. Exemplary fine rotation stage 2100 includes three subrotation modules 2110, 2120, and 2130.

Subrotation module 2110 receives the group 1, $\phi_8\phi_9\phi_{10}$, of the fine-stage rotation bits. There are interesting special issues that relate to the implementation of this most-significant $\phi_8\phi_9\phi_{10}$-driven sub-stage. The reason for this difference is that the way the phase accumulator has been split in this example causes a C_out2 bit to appear between the MSB fine-rotation sub-stage and the other two fine-rotation sub-stages. A need exists to accommodate the 0/1 possibilities of C_out2 as well as to accommodate the conditional negation that all three sub-stages must deal with. This presents four combinations of cases for this MSB sub-stage 2110, which is a somewhat similar situation to issues encountered in an embodiment described above. Several choices exist as to how the DDS fine stage can be designed, each with their own advantages and disadvantages.

In a first approach, normal excess-fours processing is employed for this sub-stage rotation. This approach is suggested by the treatment of bits $\phi_8\phi_9\phi_{10}$ in FIG. 19. Clearly, when C_out2=0, the type of straightforward conditional-negation (cn) processing that is employed for the middle ($\phi_{11}\phi_{12}\phi_{13}$-driven) sub-stage is required. When C_out2=1, then, in the $\hat{\phi}_3=0$ (no ones' complement negation) situation, a one-bit incrementation for the inclusion of the C_out2 bit is required. This can be done using the BIAS=1 processing of Table 3. It gets more complicated when $\hat{\phi}_3=1$. In this case, it can be shown that processing that would be described as the negation of that shown in the BIAS=2 column of Table 3 is required. (Increment bit pattern; take ones' complement; interpret results for excess four offset.)

Another approach is to use an excess-three stage for this sub-rotation. Then, when $\hat{\phi}_3=1$, Table 3, BIAS=0 processing is required when C_out2=0 and BIAS=1 processing is required when C_out2=1. In both cases, the output result must be negated. Similarly, when $\hat{\phi}_3=0$ Table 3, BIAS=1 processing is required when C_out2=0, and Table 3, BIAS=2 processing is required when C_out2=1. Thus, the "+5" result is needed when $\phi_8\phi_9\phi_{10}=111$ and C_out2=1. In the previous encounter with a similar situation, the technique was used wherein 5 was represented as "8−3" and a higher-order fine-stage processor (i.e., the middle processor in the FIG. 15 example) was utilized. However, in the present embodiment, no higher-order fine-stage processor is available. The stage above this stage is the coarse-stage processor.

One solution to the DDS design problem would require a slight increase in coarse-stage ROM storage. Effectively, the ROM would provide the extra "8" rotation when needed. There is actually no difficulty in simply increasing the ROM address (specified by bits $\phi_4\phi_5\phi_6\phi_7$) by "0001" to get the extra "8" value needed except for the case when these bits happen to have the value "1111" and in this case we would perhaps be reluctant to modify the octant bits $\phi_1\phi_2\phi_3$. But this one situation, where C_out2=1, $\hat{\phi}_3=1$, $\phi_8\phi_9\phi_{10}=111$, and $\phi_4\phi_5\phi_6\phi_7=1111$, could be accommodated by simply having one alternate ROM entry for both X and Y ROMs that would have an appropriate additional offset value incorporated into it that would account for the extra rotation needed due to the C_out2=1 bit. There would be several possible ways to organize the ROM-aided rotation details, but the price, in terms of additional ROM storage, would be minimal and no extra computation in the fine stage would be needed. This would possibly be the best solution for this implementation.

Figure 22:
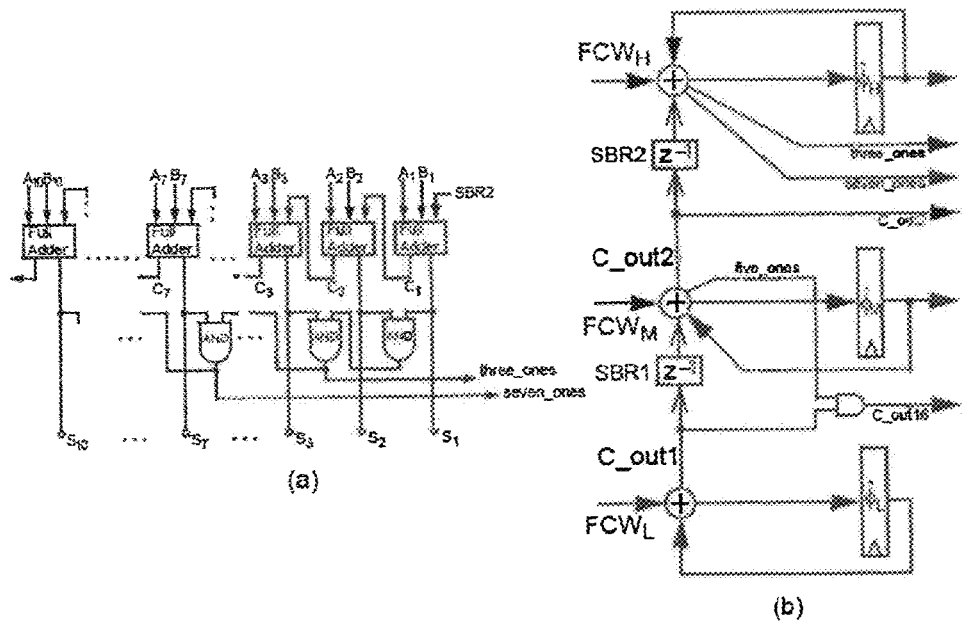
FIG. 22A depicts an augmentation of top adder in FIG. 19 (adder 1912) with two AND-gate chains and 22B depicts routing of various "all ones" phase accumulator descriptor outputs to fine stage for special processing, according to embodiments of the present invention.

A second approach to solving the problem involves adding extra hardware outside the fine-stage processor. In a manner similar to the generation of the five_ones output of the middle phase accumulator adder, both three_ones and seven_ones outputs for 1912A, the top adder of FIG. 19, are created. FIG. 22 shows the simple AND-gate chain that gives both of these output signals. With the help of these signals, the necessary information to handle all troublesome situations is available. It only happens that normal fine-stage processing is inadequate when both "three-ones=1" and "C_out2=1." Otherwise, the fine-stage processor can successfully handle the $\hat{\phi}_8\hat{\phi}_9\hat{\phi}_{10}$-driven driven rotation. When, however, three_ones∩C_out2=1, the inputs must be treated as $\phi_8\phi_9\phi_{10}=000$, and C_out2=0. Incrementing of $\phi_8\phi_9\phi_{10}$ by 001 also produces a carry into the coarse-stage address. This too is a simple matter that can be addressed by incrementing by 0001 the version of $\phi_4\phi_5\phi_6\phi_7$ that generates a coarse ROM address. Even in the case when $\phi_4\phi_5\phi_6\phi_7=1111$, and hence the incrementation causes $\hat{\phi}_4\hat{\phi}_5\hat{\phi}_6\hat{\phi}_7=0000$, this wrap-around is not a problem insofar as the coarse-stage rotation is concerned. However, the special situation, where the signal seven_ones∩C_out2=1 indicates that the octant bits $\hat{\phi}_1\hat{\phi}_2\hat{\phi}_3$ must also be incremented. The FIG. 19 system has been modified as shown in FIG. 23, with the addition of four multiplexers and simple address-bit changing circuitry that causes the required alterations in the coarse-stage and fine-stage inputs so as to eliminate the situations that are difficult for these stages to handle.

Figure 23:
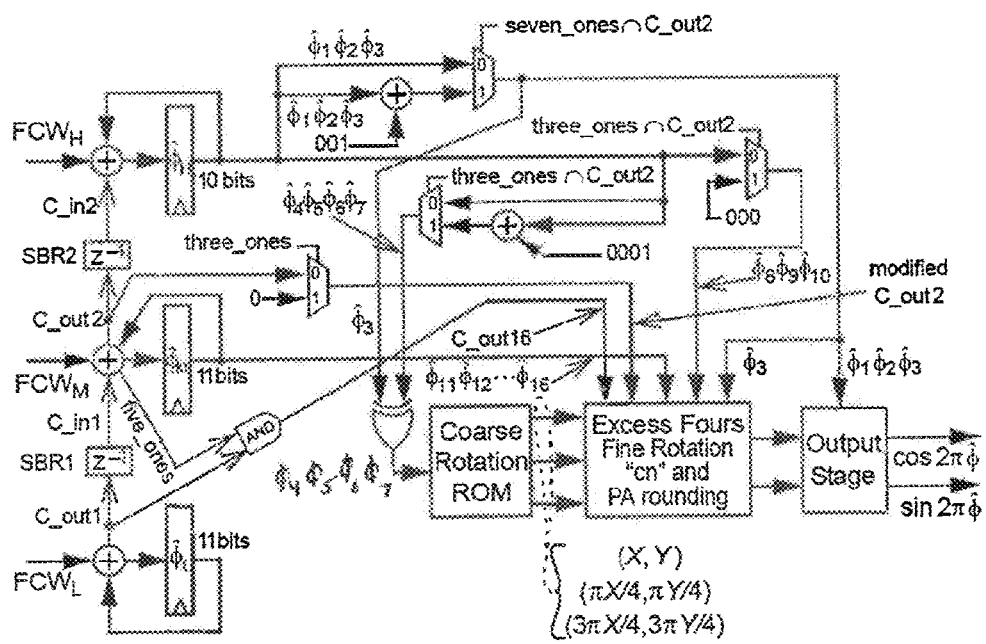
FIG. 23 depicts a modified case-2 excess-fours DDS (e.g., modifications to the FIG. 19 DDS) with a three-part phase accumulator, according to embodiments of the present invention.

With use of the modifications to FIG. 19 that appear in FIG. 23, the fine-rotation block never sees a $\hat{\phi}_8\hat{\phi}_9\hat{\phi}_{10}=111$ input unless it also sees C_out2=0. This removes the troublesome case from the previously-discussed excess-four or excess-three processing, and either approach can be employed to achieve a simple fine-stage implementation. Such an implementation is given for FIG. 21 where excess-four processing is used. Here the control signals are:

BIAS=0 applies when C_out2=0 and $\hat{\phi}_3=0$;

BIAS=1 applies when $\hat{\phi}_3 \oplus$ C_out2=1;

BIAS=2 applies when C_out2=1 and $\hat{\phi}_3=1$.

and $$A = \begin{cases} \phi_a & \text{for BIAS} = 0 \\ \overline{\phi}_a & \text{for BIAS} = 1 \\ \phi_a \oplus \phi_b & \text{for BIAS} = 2 \end{cases}$$

$$B = \begin{cases} \phi_b & \text{for BIAS} = 0 \\ \overline{\phi}_b & \text{for BIAS} = 1 \\ \overline{\phi}_b & \text{for BIAS} = 2 \end{cases}$$

$$C = \begin{cases} \phi_c & \text{for BIAS} = 0 \\ \overline{\phi}_c & \text{for BIAS} = 1 \\ \phi_c & \text{for BIAS} = 2 \end{cases}$$

$$D = \begin{cases} \phi_a \oplus \phi_b & \text{for BIAS} = 0 \\ \phi_a \oplus \phi_b & \text{for BIAS} = 1 \\ \overline{\phi}_a & \text{for BIAS} = 2 \end{cases}$$

$$A_s = \begin{cases} \phi_a & \text{for BIAS} = 0 \\ \hat{\phi}_3 \oplus \phi_a & \text{for BIAS} = 1 \\ \phi_a \cup \phi_b & \text{for BIAS} = 2 \end{cases}$$

Notice that for BIAS=2, this specifies that all rotations in the rightmost column of Table 3 are now positive (counter-clockwise) except for the top two entries. (And also recognize that the bottom entry in the column is actually a "don't care" for the FIG. 23 system because the system alterations prevent the appearance of $\hat{\phi}_8\hat{\phi}_9\hat{\phi}_{10}=111$ when BIAS=2.)

Subrotation module 2120 includes an AND gate 2122, three 2-to-1 multiplexers 2124, 2125, and 2126, and an exclusive-or gate 2128. Subrotation module 2120 receives group 2, $\phi_{11}\phi_{12}\phi_{13}$, of the fine-stage rotation bits. AND gate 2122 receives as a first input, $(\pi/4)Y_k$ shifted by 8 and as a second conditionally negated input, $\phi_{11}{}^{cn}$ which is negated at the input. The output of AND gate 2122 is provided at the 0 input to multiplexer 2124. Multiplexer 2124 receives $(\pi/4)Y_k$ shifted by 9 at its 1 input. Multiplexer 2124 is controlled by conditionally negated bit $\phi_{12}$ of Group 2, $\phi_{12}{}^{cn}$. Multiplexer 2125 receives $(3\pi/4)Y_k$ shifted by 10 at its 0 input and $(\pi/4)Y_k$ shifted by 10 at its 1 input. Multiplexer 2125 is controlled by the exclusive-OR of bits $\phi_{11}$ and $\phi_{12}$ of group 2 of the fine rotation bits. The output of multiplexer 2124 is provided at the 0 input of multiplexer 2126 and the output of multiplexer 2125 is provided at the 1 input of multiplexer 2126. In an alternative embodiment, multiplexer 2125 could be controlled by the 'cn' versions of the control signals (i.e., $\phi_{11}{}^{cn} \oplus \phi_{12}{}^{cn}$) since the XOR output would be unaffected by inverting both inputs.

Subrotation module 2130 includes an AND gate 2132, three 2-to-1 multiplexers 2134, 2135, and 2136, and an exclusive-OR gate 2138. Subrotation module 2130 receives group 3, $\phi_{14}\phi_{15}\phi_{16}$, of the fine-stage rotation bits. AND gate 2132 receives as a first input, $(\pi/4)Y_k$ shifted by 11 and as a second input, $\phi_{14}{}^{Cout16}$, which is negated at the input. The output of AND gate 2132 is provided at the 0 input to multiplexer 2134. Multiplexer 2134 receives $(\pi/4)Y_k$ shifted by 12 at its 1 input. Multiplexer 2134 is controlled by $\phi_{15}{}^{Cout16}$. Multiplexer 2135 receives $(3\pi/4)Y_k$ shifted by 13 at its 0 input and $(\pi/4)Y_k$ shifted by 13 at its 1 input. Multiplexer 2135 is controlled by the exclusive-OR of bits $\phi_{14}$ and $\phi_{15}$ of group 3. The output of multiplexer 2134 is provided at the 0 input of multiplexer 2136 and the output of multiplexer 2135 is provided at the 1 input of multiplexer 2136. Multiplexer 2136 is controlled by $\phi_{16}{}^{Cout16}$. The output of multiplexer 2136 is provided as a first input to exclusive-OR gate 2138. Exclusive-OR gate 2138 receives $\phi_{14}{}^{cn}$ as its second input.

Adder 2142 is configured to rotate input coordinate, $X_k$, by the value generated by first subrotation module 2110. Adder 2142 receives as inputs, $X_k$, the output of exclusive-OR gate 2118 of the first subrotation module 2110, and the negation of the output of multiplexer 2186 of the fine stage magnitude scaling module 2180. In an embodiment, adder 2142 is a carry-save adder (CSA). Adder 2142 may further receive $A_S$ as the carry_in value.

Adder 2144 receives the output from adder 2142 and the subrotation value generated by the second subrotation module 2120. Thus, adder 2144 rotates $X_k$ by the additional subrotation value generated by subrotation module 2120. In an embodiment, adder 2144 is also a carry-save adder (CSA). Adder 2144 may further receive $\phi_{11}{}^{cn}$ as the carry_in value. Similarly, adder 2146 receives the output from adder 2144 and the subrotation value generated by the third subrotation module 2130. Thus, adder 2146 rotates $X_k$ by the additional subrotation value generated by subrotation module 2130. In an embodiment, adder 2146 is also a carry-save adder (CSA). Adder 2146 may further receive $\phi_{14}{}^{cn}$ as the carry_in value.

A final adder 2148 receives the output from adder 2146. In an embodiment, adder 2148 is a carry ripple adder. Adder 2148 receives a 1 value as a carry_in input. The carry_in=1 bit completes the ones'-complement negation of the correction value from the fine stage magnitude scaling module 2180, making it into a two's-complement correction. The output of adder 2148 is a coordinate, $X_{fine}$, of the rotated pair of output values.

The circuit 2100B of FIG. 21B is configured to generate $Y_{fine}$ ($Y_{datapath}$). The general operation of the $Y_{datapath}$ is the same as the $X_{datapath}$ of FIG. 21A with the following exceptions. The subrotation modules of FIG. 21B receive as input $(\pi^{3}/4)X_k$ and $(\pi/4)X_k$. Adder 2142B receives as inputs, the input coordinate $Y_k$, the output of subrotation module 2110B, and the inverted output of fine stage magnitude scaling module 2180B. The output of circuit 2100B is a coordinate, $Y_{fine}$, of the rotated pair of output values. Y-datapath computations require a negation of the $A_S$, $\phi_{11}{}^{cn}$, and $\phi_{14}{}^{cn}$ XOR inputs as well as negations of these values when used as carry_in values.

The issue of deciding which of the above solutions to employ when implementing a multi-part split phase accumulator system will necessarily be guided by the relative importance of considerations such as minimizing power consumption, maximizing processing speed, or meeting a combination of such design goals.

2.10 Tracking Phase Accumulator Overflows

While it is not necessary for normal DDS implementations to track phase accumulator overflows, one new issue must be considered if there is a special requirement that one must track the normal occurrence of phase accumulator overflows. It does not necessarily suffice to simply let each of the top two phase accumulator parts 1810A and B be represented by the phase accumulator value ($\hat{\phi}_H$ or $\hat{\phi}_M$) and the contents of an associated SBR input. One situation can occur in which the C_out1 value fed to SBR1 1818 can cause a carry ripple that goes completely through the center part k yielding a carry-out bit into the upper SBR2 1819. This happens when (and only when) $\hat{\phi}_M$ has a value of all ones and when the bit being sent to SBR1, 1818, is a one.

Consider the example in FIG. 24, where $\hat{\phi}_M$ and $\hat{\phi}_L$ are both 3-bit registers: if both registers contain "111" and if "000" is added to $\hat{\phi}_M$ while "111" is added to $\hat{\phi}_L$ then the results would be as shown in FIG. 24(a). The 6-bit sum that would have been split to obtain these three-bit registers, however, behaves as shown in FIG. 24(b). Clearly, whenever the $\hat{\phi}_M$ value contains all ones while SBR1 1818 contains the value "1," the $\hat{\phi}_M$ sum should overflow. To track the "carry-rippling operation," the SBR2 1819 would become 1 (and the $\hat{\phi}_M$ values would become all zeros, and SBR1 1818 would become "0"). Again, these actions need not actually take place for the normal operation of the excess fours fine stage.

The special "five_ones" output bit of the adder for $\hat{\phi}_M$ in FIGS. 19 and 20 could be extended to the full length of the $\hat{\phi}_H$ and/or $\hat{\phi}_M$ registers and with such an "all ones" augmentation the normal timing of phase accumulation overflows can be tracked, as would be evident to one of ordinary skill in the art.

2.11 Using a Carry-Save Phase Accumulator

One way to speed up the (possibly long) carry-ripple-limited phase-accumulator updating is to use a carry-save adder. If the phase-accumulator value is maintained in carry-save form, then each update, which produces another carry-save result, will involve a delay of just a single one-bit addition. The excess-fours system can be useful in such a system, as will be recognized by one of ordinary skill in the art. In doing this, it may happen that as much, or more, extra time could be required to implement the desired computation of the DDS outputs as might have been saved in the faster phase-updating but the excess-fours processing could help to reduce this time. Various compromises between carry-save, carry-ripple, and excess-fours phase accumulator systems can also be employed.

2.12 Excess-Two and Excess-One Stages

For example, a five-bit stage can be split it into a three-bit stage and a two-bit stage. The two-bit part can be dealt with in the following manner. An excess two system can be used for processing just two fine-stage bits. In this environment, the two-bit group is driven by a two-bit part of the phase accumulator word that coincides with an excess-two coarse-rotation operation—i.e., part of the coarse-stage rotation would include (possibly among other offsets) a position-weighted "10" (two) value in the rotation result stored in the ROM. Then, when processing the relevant two fine-stage bits, the "Excess Two" processing specified in Table 4 can be used.

TABLE 4

Excess Two System

| bit pattern $\phi_a \phi_b$ | if BIAS = 0 treated as | if BIAS = 1 treated as |
|---|---|---|
| 00 (0) | −10 (−2) | −01 (−1) |
| 01 (1) | −01 (−1) | 00 (0) |
| 10 (2) | 00 (0) | 01 (1) |
| 11 (3) | 01 (1) | 10 (2) |

In a further example, a four-bit stage can be split into two two-bit sub-stages, or can be split into one three-bit sub-stage and another one-bit sub-stage. For the one-bit sub-stage an excess one system can be employed that can use the "Excess One" processing, specified in Table 5, in a manner similar to the other (excess four, three, and two) systems.

TABLE 5

Excess One System

| bit pattern $\phi_a$ | if BIAS = 0 treated as | if BIAS = 1 treated as |
|---|---|---|
| 0 (0) | −1 (−1) | 0 (0) |
| 1 (1) | 0 (0) | 1 (1) |

Examples of the processing circuits for an excess-two and an excess-one stage are shown in FIG. 25. FIG. 25A depicts an excess two sub-stage processor 2500A. FIG. 25B depicts an excess one sub-stage processor 2500B. Notice that the BIAS=1 processing for these new circuits retain similar properties to those of the excess-four processor. In particular, only building the BIAS=0 circuit is needed, as shown in FIGS. 24 (a) and (b). Then, to perform BIAS=1 processing, it suffices to address the processors with ones' complemented control bits, and negate the processor's output.

2.13 Avoiding the Addition of Zero

In the excess-n processors (for n=4, 3, 2, 1) presented herein, there are cases in which an AND gate having an inverted control input is employed to provide the possibility of obtaining a zero output—such output then being added or subtracted from the signal proceeding down the center path in the fine-stage processor circuit (e.g., as in FIG. 6). As will be understood by one having ordinary skill in the art, other means of handling this "zero processing" case exist. Using such other means may achieve some amount of overall hardware reduction and/or reduction in power consumption by, for example, allowing the elimination of this AND gate. One such alternate means of doing the "zero processing" would be to simply bypass the addition of the excess-n processor output in all such cases. One way of doing this is explained in A. N. Willson, Jr. and L. S. Wasserman, "Bypassable adder," U.S. Pat. No. 7,228,325 issued Jun. 5, 2007, which is hereby incorporated by reference in its entirety.

3.0 MODIFIED COARSE-ROTATION ROM VALUES

In the DDS implementation described above, a person of ordinary skill in the art would recognize that the values of the contents of the coarse-rotation ROM could be altered such that they somewhat compensate for approximation errors that occur elsewhere in the system—e.g., within the fine-stage. To make such alterations, various techniques have been employed by DDS designers. As would be known to a person of skill in the art, embodiments disclosed herein could include not just excess-fours DDS in which the "ideal" coarse ROM data are used, but also such DDS in which altered ROM values are used to improve the output accuracy.

4.0 EMBODIMENTS OF EXCESS FOURS PROCESSING IN SOFTWARE

The examples shown above have focused on hardware embodiments. Such focus serves well to explain the working details of the new systems. Nonetheless, it is certainly possible to advantageously employ the invention in a software embodiment, as will be recognized by one of ordinary skill in the art. Presently existing DDS technology employing such embodiments would be good candidates for improvements to their operating speed and/or power consumption by use of the methods for DDS improvement explained above. Examples of software platforms in which the above-described invention may be employed are general purpose digital processors and programmable hardware such as field programmable gate arrays (FPGA). The scope and spirit of this disclosure is intended to cover all such software methods of implementation.

Figure 26:
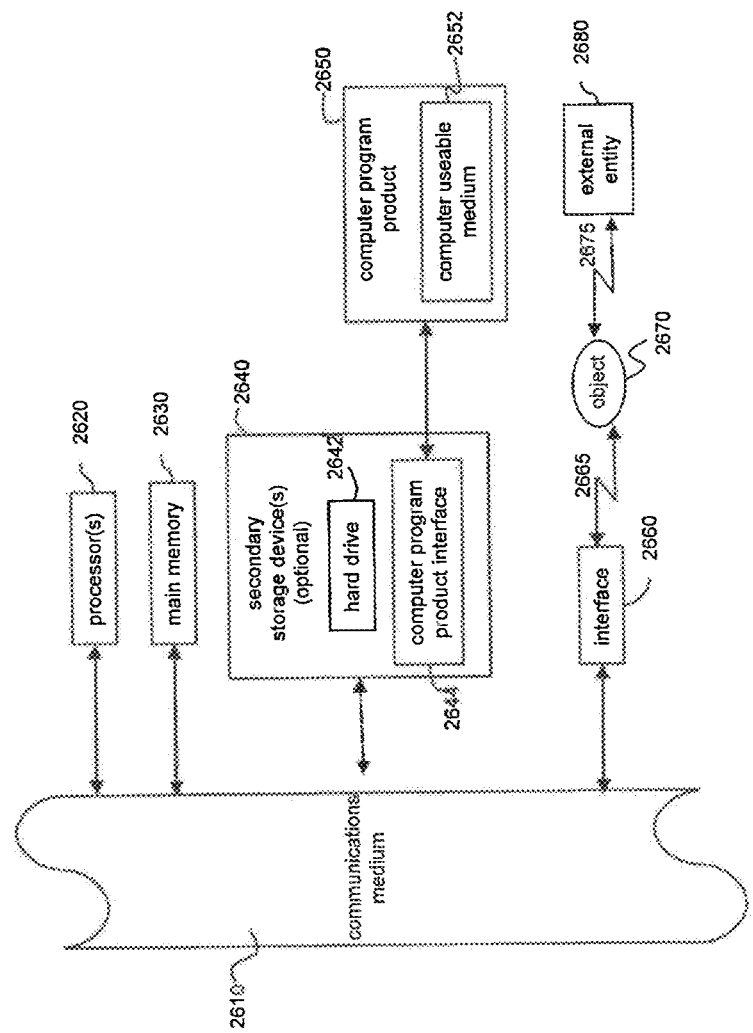
FIG. 26 depicts a block diagram of a processing unit that can be used to implement entities described herein, according to an embodiment of the invention.

FIG. 26 illustrates a block diagram of a processing unit 2603 that can be used to implement embodiments described herein. It is noted that the embodiments above may be implemented using any number of processing units 2603, and the configuration actually used is implementation specific.

Processing unit 2603 may represent a computer, a handheld computer, a lap top computer, a personal digital assistant, a mobile phone, and/or any other type of data processing device. The type of processing device used to implement the embodiments above is implementation specific.

Processing unit 2603 includes a communications medium 2610 (such as a bus, for example) to which other modules are attached.

Processing unit 2603 also includes one or more processors 2620 and a main memory 2630. Main memory 2630 may be RAM, ROM, or any other memory type, or combinations thereof.

Processing unit 2603 may also include secondary storage devices 2640 such as but not limited to hard drives 2642 or computer program product interfaces 2644. Computer program product interfaces 2644 are devices that access objects (such as information and/or software) stored in computer program products 2650. Examples of computer program product interfaces 2644 include, but are not limited to, floppy drives, CD drives, DVD drives, ZIP drives, JAZ drives, optical storage devices, etc. Examples of computer program products 2650 include, but are not limited to, floppy disks, CDs, DVDs, ZIP and JAZ disks, memory sticks, memory cards, or any other medium on which objects may be stored.

The computer program products 2650 include a computer useable medium 2652 on which objects may be stored, such as but not limited to optical mediums, magnetic mediums, etc.

Control logic or software may be stored in main memory 2630, second storage device(s) 2640, and/or computer program products 2650.

More generally, the term "computer program product" refers to any device in which control logic (software) is stored, so in this context a computer program product could be any memory device having control logic stored therein. The invention is directed to computer program products having stored therein software that enables a computer/processor to perform functions of the invention as described herein.

Processing unit 2603 may also include an interface 2660 which may receive objects (such as data, applications, software, images, etc.) from external entities 2680 via any communications media including wired and wireless communications media. In such cases, objects 2670 are transported between external entities 2680 and interface 2660 via signals 2665, 2675. In other words, signals 2665, 2675 include or represent control logic for enabling a processor or computer to perform the functions of the invention. According to embodiments of the invention, such signals 2665, 2675 are also considered to be computer program products, and the invention is directed to such computer program products.

5.0 CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system comprising:
   a phase accumulator configured to receive a frequency control word as an input, the phase accumulator comprising:
   a first accumulator including a first register, the first accumulator configured to receive a first portion of the frequency control word, and
   a second accumulator configured to receive a second portion of the frequency control word, wherein the second accumulator includes a second register and an overflow register,
   wherein the phase accumulator is configured to produce a sequence of normalized rotation angles, each normalized rotation angle being based on a current value of the first accumulator and a current value of the second accumulator, and
   wherein the first accumulator and the second accumulator operate simultaneously in a first output data cycle, and
   a fine rotation stage, coupled to the phase accumulator, wherein the overflow register delays a carry-in to the first accumulator until a second output data cycle and wherein the fine rotation stage is responsive to the carry-in during the first output data cycle.

2. The system of claim 1, wherein the first register has the same number of bits as the first portion of the frequency control word.

3. The system of claim 1, wherein the second register has the same number of bits as the second portion of the frequency control word.

4. The system of claim 1, wherein the overflow register is a single-bit overflow register.

5. A circuit comprising:
   a first accumulator comprising a first register, the first accumulator configured to receive a first portion of a frequency control word; and
   a second accumulator configured to receive a second portion of the frequency control word, wherein the second accumulator includes a second register and an overflow register,
   wherein the first accumulator and the second accumulator receive the first and second portions of the frequency control word approximately simultaneously,
   wherein the first accumulator is configured to perform during contiguous output data cycles,
   wherein output data of the second accumulator comprises a carry-in to the first accumulator,
   wherein the overflow register is configured to perform by delaying the carry-in to the first accumulator from the second accumulator for a duration of one output data cycle,
   wherein the overflow register is configured to deliver the carry-in to a rotation stage after a delay of less than one output data cycle, and
   wherein the overflow register is configured to perform during each of the contiguous data cycles.

6. The circuit of claim 5, further comprising a Mapping function circuit responsive to at least the first accumulator, wherein the mapping function circuit is configured to produce one or more digital output signals.

7. The circuit of claim 6, wherein the one or more digital output signals includes a sequence of values representing a sine or cosine function of a sequence of rotation angles related to the frequency control word input.

8. The circuit of claim 6, wherein a value of the one or more digital output signals is computed from a current value of the first accumulator, a current value of the second accumulator, and the overflow register.

9. The circuit of claim 6, wherein the mapping function circuit includes a coarse rotation stage coupled to a fine rotation stage.

10. The circuit of claim 9, wherein the coarse rotation stage includes a read only memory.

11. The circuit of claim 9, wherein the fine rotation stage is configured to perform rounding.

12. The circuit of claim 5, wherein outputs of the first accumulator, the second accumulator and the overflow register represent a sequence of normalized rotation angles.

13. The circuit of claim 12, wherein the frequency control word comprises bits.

14. The circuit of claim 13, further comprising:
   a module for truncating each normalized rotation angle in the sequence of normalized rotation angles to have a length of W bits, where W<M.

15. The circuit of claim 12, further comprising an output stage module configured to identify an octant associated with each normalized rotation angle in the sequence of normalized rotation angles based on the three most significant bits of the normalized rotation angle.

16. The circuit of claim 5, wherein the first register has the same number of bits as the first portion of the frequency control word.

17. The circuit of claim 5, wherein the second register has the same number of bits as the second portion of the frequency control word.

18. The circuit of claim 5, wherein the overflow register is a single-bit overflow register.

19. A method of converting a value of a frequency control word having a first portion and a second portion into a sequence of phase accumulator values, comprising:
   accumulating the first portion in a first accumulator in a first output data cycle;

accumulating the second portion in a second accumulator in the first output data cycle;

delivering a carry-in to the first accumulator from the second accumulator after a delay of approximately one output data cycle; and delivering the carry-in to a rotation stage after a delay of less than one output data cycle, wherein the first and second accumulators are implemented in hardware.

20. The method of claim 19, wherein the first accumulator has the same number of bits as the first portion.

21. The method of claim 19, wherein the delivering to the first accumulator is performed by a register holding a single overflow bit.

22. The method of claim 19, further comprising:

mapping the accumulator values into digital output signals by using a mapping function configured to produce one or more digital output signals.

23. The method of claim 22, wherein the one or more digital output signals includes a sequence of values representing a sine function of a sequence of rotation angles related to the frequency control word input.

24. The method of claim 22, wherein the one or more digital output signals includes a sequence of values representing a cosine function of a sequence of rotation angles related to the frequency control word input.

25. The method of claim 23, wherein the one or more digital output signals further includes a sequence of values representing a cosine function of a sequence of rotation angles related to the frequency control word input.

* * * * *